US010215648B1

(12) United States Patent
Pillars et al.

(10) Patent No.: US 10,215,648 B1
(45) Date of Patent: Feb. 26, 2019

(54) ELECTRODEPOSITION PROCESSES FOR MAGNETOSTRICTIVE RESONATORS

(71) Applicant: National Technology & Engineering Solutions of Sandia, LLC, Albuquerque, NM (US)

(72) Inventors: Jamin Ryan Pillars, Albuquerque, NM (US); Eric Langlois, Albuquerque, NM (US); Christian Lew Arrington, Albuquerque, NM (US); Todd Monson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/996,147

(22) Filed: Jun. 1, 2018

Related U.S. Application Data

(62) Division of application No. 14/876,652, filed on Oct. 6, 2015, now Pat. No. 10,132,699.

(60) Provisional application No. 62/060,275, filed on Oct. 6, 2014.

(51) Int. Cl.
| | |
|---|---|
| *G01P 15/125* | (2006.01) |
| *G01L 1/12* | (2006.01) |
| *C25D 7/00* | (2006.01) |
| *C25D 5/02* | (2006.01) |
| *C25D 5/18* | (2006.01) |
| *C25D 3/56* | (2006.01) |

(52) U.S. Cl.
CPC .............. *G01L 1/125* (2013.01); *C25D 3/562* (2013.01); *C25D 5/02* (2013.01); *C25D 5/18* (2013.01); *C25D 7/00* (2013.01)

(58) Field of Classification Search
CPC .......... G01L 1/125; C25D 3/562; C25D 5/02; C25D 5/18; C25D 7/00
USPC ........................................................ 257/417
See application file for complete search history.

(56) References Cited

U.S. PATENT DOCUMENTS

| | | | |
|---|---|---|---|
| 3,399,122 A * | 8/1968 | Rocher .................. | C25D 3/562 205/150 |
| 4,053,373 A | 10/1977 | McMullen et al. | |
| 4,208,254 A | 6/1980 | Mitsumoto et al. | |
| 4,523,482 A * | 6/1985 | Barkhoudarian ....... | G01L 3/103 324/209 |
| 4,756,816 A * | 7/1988 | Liao ....................... | C25D 3/562 205/260 |

(Continued)

OTHER PUBLICATIONS

U.S. Appl. No. 14/340,012, filed Jul. 24, 2014, Langlois et al.

(Continued)

*Primary Examiner* — Viet Q Nguyen
(74) *Attorney, Agent, or Firm* — Martin I. Finston; Helen S. Baca

(57) ABSTRACT

The present invention relates to magnetoelastic resonators, sensors, and tunable devices, as well as methods for making such components. The resonators can be used as tags and/or sensors. In general, the resonators include one or more micron-sized resonator portions affixed on a substrate. For use as a tag, each tag includes a plurality of resonator portions that allow for multiplexed coding, and methods for making tags and arrays of such tags include use of electrodeposition processes. In particular embodiments, these components include an electrodeposited material that exhibits magnetostrictive properties.

8 Claims, 17 Drawing Sheets

(56) References Cited

U.S. PATENT DOCUMENTS

| | | | | |
|---|---|---|---|---|
| 4,960,651 A * | 10/1990 | Pettigrew | ............... | G01V 15/00 |
| | | | | 340/551 |
| 5,020,378 A | 6/1991 | Hesthamer et al. | | |
| 5,150,617 A * | 9/1992 | Schwarz | ............... | G01H 13/00 |
| | | | | 73/579 |
| 5,297,439 A | 3/1994 | Tyren et al. | | |
| 5,313,845 A * | 5/1994 | Hayashi | ............... | G01L 3/102 |
| | | | | 324/209 |
| 5,317,223 A | 5/1994 | Kiesewetter et al. | | |
| 5,551,158 A | 9/1996 | Tyren et al. | | |
| 5,557,085 A | 9/1996 | Tyren et al. | | |
| 5,576,693 A | 11/1996 | Tyren et al. | | |
| 5,739,752 A | 4/1998 | Tyren | | |
| 5,760,580 A | 6/1998 | Tyren | | |
| 5,969,610 A | 10/1999 | Tyren | | |
| 5,990,792 A | 11/1999 | Tyren | | |
| 6,018,297 A | 1/2000 | Tyren | | |
| 6,100,821 A * | 8/2000 | Tanji | ............... | G08G 1/01 |
| | | | | 180/168 |
| 6,137,411 A | 10/2000 | Tyren | | |
| 6,153,020 A * | 11/2000 | Chen | ............... | C22C 19/07 |
| | | | | 148/120 |
| 6,218,944 B1 | 4/2001 | Kiesewetter et al. | | |
| 6,225,905 B1 | 5/2001 | Tyren et al. | | |
| 6,232,879 B1 | 5/2001 | Tyren | | |
| 6,285,286 B1 | 9/2001 | Tyren et al. | | |
| 6,417,771 B1 | 7/2002 | Tyren | | |
| 6,688,162 B2 * | 2/2004 | Bachas | ............... | G01N 33/4905 |
| | | | | 73/54.26 |
| 6,855,240 B2 | 2/2005 | Cooper et al. | | |
| 7,075,439 B2 | 7/2006 | Tyren et al. | | |
| 7,179,338 B2 * | 2/2007 | Guruswamy | ............... | B01J 23/89 |
| | | | | 148/108 |
| 7,210,332 B2 * | 5/2007 | Kolosov | ............... | G01N 29/022 |
| | | | | 73/24.06 |
| 7,345,866 B1 | 3/2008 | Hsu et al. | | |
| 7,933,112 B2 | 4/2011 | Ayazi et al. | | |
| 7,943,116 B1 | 5/2011 | Huber et al. | | |
| 8,276,451 B2 | 10/2012 | Tyren | | |
| 8,414,772 B2 | 4/2013 | Tyren et al. | | |
| 8,425,749 B1 | 4/2013 | Ravula et al. | | |
| 8,570,705 B2 | 10/2013 | DeReus | | |
| 8,674,689 B1 | 3/2014 | Nielson et al. | | |
| 8,726,730 B1 | 5/2014 | Nielson et al. | | |
| 8,783,106 B1 | 7/2014 | Nielson et al. | | |
| 8,814,622 B1 | 8/2014 | Resnick et al. | | |
| 9,660,349 B2 * | 5/2017 | Keller | ............... | H01Q 11/02 |
| 10,132,699 B1 * | 11/2018 | Pillars | ............... | G01L 1/125 |
| 2001/0023661 A1 * | 9/2001 | Hiroki | ............... | H01L 51/0004 |
| | | | | 118/300 |
| 2002/0021054 A1 * | 2/2002 | Nguyen | ............... | H03H 3/0078 |
| | | | | 310/309 |
| 2002/0078765 A1 * | 6/2002 | Shinoura | ............... | G01L 3/102 |
| | | | | 73/862.333 |
| 2003/0047505 A1 * | 3/2003 | Grimes | ............... | B01D 63/16 |
| | | | | 210/483 |
| 2004/0150939 A1 | 8/2004 | Huff | | |
| 2005/0045585 A1 * | 3/2005 | Zhang | ............... | C25D 5/022 |
| | | | | 216/58 |
| 2005/0074904 A1 * | 4/2005 | Chin | ............... | G01N 27/745 |
| | | | | 436/526 |
| 2005/0079132 A1 * | 4/2005 | Wang | ............... | A61L 31/082 |
| | | | | 424/1.11 |
| 2005/0161338 A1 | 7/2005 | Fang et al. | | |
| 2006/0238281 A1 * | 10/2006 | Steinberg | ............... | H01H 36/0013 |
| | | | | 335/207 |
| 2009/0242405 A1 * | 10/2009 | Mayer | ............... | B81C 1/00214 |
| | | | | 204/435 |
| 2010/0200417 A1 * | 8/2010 | Callahan | ............... | C25D 3/54 |
| | | | | 205/210 |
| 2010/0243133 A1 | 9/2010 | Kunishi et al. | | |
| 2011/0038093 A1 | 2/2011 | Furukawa et al. | | |
| 2012/0144918 A1 * | 6/2012 | Korpi | ............... | G01G 3/16 |
| | | | | 73/580 |
| 2013/0333820 A1 * | 12/2013 | Sherrer | ............... | C25D 5/02 |
| | | | | 156/60 |
| 2018/0160529 A1 * | 6/2018 | Arai | ............... | H05K 1/09 |

OTHER PUBLICATIONS

U.S. Appl. No. 14/531,075, filed Nov. 3, 2014, Monson et al.

Amiri S et al., "The role of cobalt ferrite magnetic nanoparticles in medical science," *Mater. Sci. Eng. C* 2013;33(1):1-8.

Arndt M et al., "Coded labels with amorphous magnetoelastic resonators," *IEEE Trans. Magn.* 2002;38(5):3374-6.

Bedenbecker M et al., "Electroplated CoFe thin films for electromagnetic microactuators," *J. Appl. Phys.* 2006;99:08M308 (3 pp.).

Bonini M et al., "Nanostructures for magnetically triggered release of drugs and biomolecules," *Curr. Op. Colloid Interface Sci.* 2013;18(5):459-67.

Bozorth RM et al., "Anisotropy and magnetostriction of some ferrites," *Phys. Rev.* 1955;99:1788-98.

Brankovic SR et al., "The effect of $Fe^{3+}$ on magnetic moment of electrodeposited CoFe alloys—experimental study and analytical model," *Electrochim. Acta* 2008;53(20):5934-40.

Chen LQ, "Phase-field models for microstructure evolution," *Annu. Rev. Mater. Res.* 2002;32:113-40.

Clark AE et al., "Extraordinary magnetoelasticity and lattice softening in bcc Fe—Ga alloys," *J. Appl. Phys.* 2003;93(10):8621-3.

Du Trémolet de Lacheisserie et al., "Magnetostriction and internal stresses in thin films: the cantilever method revisited," *J. Magn. Magnetic Mater.* 1994;136(1-2):189-96.

Elhalawaty S et al., "Oxygen incorporation into electrodeposited CoFe films: consequences for structure and magnetic properties," *J. Electrochem. Soc.* 2011;158(11):D641-6.

Estrine EC et al., "Electrodeposition and characterization of magnetostrictive galfenol (FeGa) thin films for use in microelectromechanical systems," *J. Appl. Phys.* 2013;113:17A937 (3 pp.).

George J et al., "Oxide/hydroxide incorporation into electrodeposited CoFe alloys—consequences for magnetic softness," *Electrochim. Acta* 2013;110:411-7.

Gibbs MRJ et al., "Magnetic materials for MEMS applications." *J. Phys. D: Appl. Phys.* 2004;37(22): R237-44.

Grimes C et al., "Wireless magnetoelastic resonance sensors: a critical review," *Sensors* 2002;2:294 313.

Grimes CA et al., "Theory, instrumentation and applications of magnetoelastic resonance sensors: a review," *Sensors (Basel)* 2011;11(3):2809 44.

Hunter D et al., "Giant magnetostriction in annealed $Co_{1-x}Fe_x$ thin-films," *Nat. Commun.* 2011;2:article 518 (7 pp.).

Iannotti V et al., "Improved model for the magnetostrictive deflection of a clamped film-substrate system," *J. Magnetism Magnetic Mater.* 1999;202(1):191-6.

Ibarra MR et al., "Giant volume magnetostriction in the FeRh alloy," *Phys. Rev. B* Aug. 1994;50(6):4196-9.

Iselt D et al., "Electrodeposition and characterization of $Fe_{80}Ga_{20}$ alloy films," *Electrochim. Acta* 2011;56(14):5178-83.

Kakeshita T et al., "Magnetic field-induced martensitic transformation and giant magnetostrictions in Fe—Ni—Co—Ti and ordered $Fe_3Pt$ shape memory alloys," *Mater. Trans. JIM* 2000;41(8):882-7.

Kakuno EM et al., "Structure, composition, and morphology of electrodeposited $Co_xFe_{1-x}$ alloys," *J. Electrochem. Soc.* 1997;144(9):3222-6.

Koza JA et al., "The effect of magnetic fields on the electrodeposition of CoFe alloys," *Magnetohydrodynamics* 2009;45(2):259-66.

Koza JA et al., "The effect of magnetic fields on the electrodeposition of CoFe alloys," *J. Magnetism Magnetic Mater.* 2009;321:2265-8.

Lai Y et al., "Fabrication of patterned $CdS/TiO_2$ heterojunction by wettability template-assisted electrodeposition," *Mater. Lett.* 2010;64(11):1309-12.

(56) References Cited

OTHER PUBLICATIONS

Lallemand F et al., "Effects of the structure of organic additives in the electrochemical preparation and characterization of CoFe film," *Electrochim. Acta* 2002;47(26):4149-56.

Lallemand F et al., "Electrodeposition of cobalt-iron alloys in pulsed current from electrolytes containing organic additives," *Surf. Coatings Technol.* 2005;197(1):10-7.

Lallemand F et al., "Kinetic and morphological investigation of CoFe alloy electrodeposition in the presence of organic additives," *Surf. Coatings Technol.* 2004;179(2-3):314-23.

Liao SH, "High moment CoFe thin films by electrodeposition,"*IEEE Trans. Mag.* 1987;23(5):2981-3.

Liu X et al., "Electrodeposited Co—Fe and Co—Fe—Ni alloy films for magnetic recording write heads," *IEEE Trans. Mag.* 2000;36(5):3479-81.

Liu X, "Electrodeposition of soft, high moment Co—Fe—Ni thin films," *J. Appl. Phys.* 2000;87(9):5410-2.

Luharuka R et al., "Improved manufacturability and characterization of a corrugated Parylene diaphragm pressure transducer," *J. Micromech. Microeng.* 2006;16:1468-74.

Meeks SW et al., "Piezomagnetic and elastic properties of metallic glass alloys $Fe_{67}CO_{18}B_{14}Si_1$ and $Fe_{81}B_{13.5}Si_{3.5}C_2$," *J. Appl. Phys.* 1983;54(11):6584-93.

Mishra AC, "Microstructure, magnetic and magnetoimpedance properties in electrodeposited NiFe/Cu and CoNiFe/Cu wire with thiourea additive in plating bath," *Physica B-Condensed Matter* 2012;407(6):923-34.

Osaka T et al., "A high moment CoFe soft magnetic thin film prepared by electrodeposition," *Electrochem. Solid State Lett.* 2003;6(4):C53-5.

Pillars JR et al., "Controlling CoFe electrodeposited film properties for improved magnetostriction," *ECS and SMEQ Joint International Meeting*, held on Oct. 4-9 at Cancun, Mexico, presentation (21 pp.).

Pillars JR et al., "Controlling crystal structure and stoichiometry in Co/Fe electrodeposited films for improved magnetostriction," *ECS and SMEQ Joint International Meeting*, held on Oct. 4-9 at Cancun, Mexico, abstract No. MA2014-02 920 (2 pp.).

Quandt E et al., "Preparation and applications of magnetostrictive thin films," *J. Appl. Phys.* 1994;76:7000-2.

Quandt E, "Giant magnetostrictive thin film materials and applications," *J. Alloys Compounds* 1997;258(1-2):126-32.

Sartale SD et al., "Electrochemical synthesis of nanocrystalline $CuFe_2O_4$ thin films from non-aqueous (ethylene glycol) medium." *Mater. Chem. Phys.* 2003;80(1):120-8.

Schmuki P et al., "Selective electrodeposition of micropatterns on predefined surface defects on p-Si(100)," *J. Electrochem. Soc.* 2001;148(3):C177-182.

Shao I et al., "Stress in electrodeposited high moment CoFe films," *ECS Trans.* 2010;25(34):35-43.

Snodgrass JD et al., "Optimized Terfenol-D manufacturing processes," *J. Alloys Compounds* 1997;258(1-2):24-9.

Tam AC et al., "A new high-precision optical technique to measure magnetostriction of a thin magnetic-film deposited on a substrate," *IEEE Trans. Magnet.* 1989;25(3):2629-38.

Tang J et al., "Miniaturized magnetoelastic tags using frame-suspended hexagonal resonators," 27th Int. Conf. on Microelectromechanical Systems, held on Jan. 26-30, 2014 in San Francisco, CA, pp. 76-79.

Tang J et al., "Scalable, high-performance magnetoelastic tags using frame-suspended hexagonal resonators," *J. Micromech. Microeng.* 2014;24:065006 (8 pp.).

Wang L et al., "Facile synthesis and electromagnetic wave absorption properties of magnetic carbon fiber coated with Fe—Co alloy by electroplating," *J. Alloys Compounds* 2011;509(14):4726-30.

Yokoshima Y et al., "Micropattern formation for magnetic recording head using electroless CoFeB deposition," *J. Electrochem. Soc.* 2002;149(8):C375-82.

Zeng KF et al., "Time domain characterization of oscillating sensors: application of frequency counting to resonance frequency determination," *Rev. Sci. Inst.* Dec. 2002;73:4375-80.

Zhang JX et al., "Phase-field microelasticity theory and micromagnetic simulations of domain structures in giant magnetostrictive materials," *Acta Materialia* 2005;53:2845-55.

Zong BY et al., "Ultrasoft and high magnetic moment NiFe film electrodeposited from a $Cu^{2+}$ contained solution," *IEEE Trans. Magnet.* 2006;42(10):2775-7.

\* cited by examiner

ELECTRODEPOSITION PROCESSES FOR MAGNETOSTRICTIVE RESONATORS

CROSS-REFERENCE TO RELATED APPLICATIONS

This application is a divisional of the commonly owned prior application Ser. No. 14/876,652, filed Oct. 6, 2015 under the title Electrodeposition Processes for Magnetostrictive Resonators, which application claims the benefit of U.S. Provisional Application No. 62/060,275, filed Oct. 6, 2014. The entirety of each of the above said application Ser. No. 14/876,652 and 62/060,275 are hereby incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to magnetoelastic resonators for use as tags or sensors, as well as method for making resonators and arrays thereof.

BACKGROUND OF THE INVENTION

Radiofrequency (RF) tags and sensors are frequently used in national security applications, but radiofrequency sensing has numerous limitations. For instance, RF cannot penetrate metallic barriers and cannot be used in harsh environments (e.g., in water, in underground repositories, or in the presence of shelving). For safety reasons, RF cannot be used in the presence of high explosives. There are also operational hurdles, where RF tags and sensors can interfere with communications and are vulnerable to long-range interrogation by adversaries. Thus, the use of RF-based technologies can be limited for various technological, operational, or safety reasons.

Magnetoelastic tags are an alternative technology and are a familiar security measure used in stores to prevent theft. Current magnetoelastic tags are large, single frequency devices, cut from strips of an amorphous magnetic material, such as, Metglas® with low magnetostriction (about 12 to 30 ppm, based on its composition). They only convey information that a tag is magnetically activated, e.g., when passing through a portal, limiting their utility. These tags have limited frequency response and offer only "on" or "off" responses. In addition, these sensors must be machined and mounted to use, thereby increasing cost and decreasing utility.

Such magnetoelastic materials can be used to sense one or more conditions, such as a structural flaw or defect in buildings or aircraft s. Again, such sensors are limited by the lack of commercially available materials having high magnetostriction and capable of providing multiplexed signals.

Accordingly, there is a need for tags and sensors that can operate in various harsh or enclosed environments, as well as providing multiplexed responses. Alternatives to present RF and magnetoelastic technologies having enhanced functionality and lower manufacturing costs would greatly advance tagging and sensing modalities.

SUMMARY OF THE INVENTION

The present invention relates to microfabricated magnetic resonators for tagging and sensor applications. In some embodiments, these resonators respond with a unique combination of multiple resonance frequencies. Recently, giant magnetostriction has been observed in CoFe thin films fabricated by sputter deposition (Hunter D et al., "Giant magnetostriction in annealed $Co_{1-x}Fe_x$ thin-films," *Nat. Commun.* 2011; 2: article 518), a technique often used in microfabrication. Unfortunately, deposition by sputtering suffers from a high degree of intrinsic material stress, slow deposition rates, and a lack of anisotropic patterning etch processes.

The resonators of the present invention can provide numerous benefits. The resonator may be safely interrogated near high explosives and through barriers, where RF-based tags and sensors cannot be used. Further, these resonators have high potential impact on various national security missions in which radiation hardness, tamper resistance, immunity to long-range interrogation by adversaries, zero on-board power (passive), and uniqueness of codes are important. In addition, signal frequencies can be controlled and designed because the electrodeposition process herein allows for micropatterning of resonator dimensions, where such dimensions dictate the resonance frequencies of the resonator.

When employed as a tag, the resonator tag can allow for sensing at multiple frequencies, thereby providing millions of possible codes, uniquely identifying each resonator structure (e.g., each resonator tag). Such tags can allow for unique identification of materials in a closed container without requiring such containers to be opened, as well as for assessing whether changes in temperature, pH, pressure, etc. can be detected in the enclosed container.

When employed as a sensor (e.g., a defect sensor), the resonator sensor can provide mechanical and structural stability assessments of deeply embedded structures (e.g., a base structure embedded in a complicated apparatus or machine). Such sensors can allow for long-range (e.g., wireless) stability assessments without expensive tear downs or inspections, as well as in situ state of the health monitoring of defects or strain in sensitive apparatuses (e.g., building, aircraft s, as well as other structural systems). In one instance, the defect sensor can include a magnetostrictive material (e.g., any herein) embedded between composite layers of a base structure.

Accordingly, in a first aspect, the present invention features microfabricated magnetoelastic resonators made from electroformed magnetostrictive alloy films (e.g., CoFe alloy films). These resonators can be used in applications requiring wireless interrogation of magnetically coded tags for identification and authentication and requiring sensors for measuring on or more quantities (e.g., temperature, pressure, viscosity, and chemical signatures, or any described herein). In one embodiment, these resonators can be used for wireless interrogation of defect sensors within deeply embedded base structures. In another embodiment, the resonator includes one or more micron-sized resonator portions. In a further embodiment, at least one resonator portion, or even all resonator portions, includes an electrodeposited material (e.g., any herein).

In a second aspect, the present invention features a plating solution (e.g., an aqueous plating solution). The plating solution can include one or more useful chemical agents to provide a magnetostrictive material. Exemplary agents include a cobalt source (e.g., including cobalt sulfamate, cobalt sulfate, and/or cobalt chloride, as well as salts or hydrates thereof); an iron source (e.g., including iron tetrafluoroborate, ammonium ferrous sulfate, iron sulfate, iron chloride, iron sulfamate, as well as salts or hydrates thereof);

one or more oxygen scavengers (e.g., any herein, such as two or more such oxygen scavengers); one or more surfactants (e.g., any herein); one or more grain refiners (e.g., any herein); and/or one or more electrolytes (e.g., any herein). In some embodiments, the solution is maintained under a constant source of an inert gas (e.g., nitrogen or argon) and/or under constant agitation (e.g., of from about 100 rpm to 500 rpm). In other embodiments, the solution has a low pH (e.g., of from about 1 to 3), a high temperature (e.g., of from about 40° C. to 60° C.), and/or a high molar ration of cobalt to iron (e.g., a ratio of 4:1, 5:1, or 6:1).

In a third aspect, the present invention features methods of making resonators (e.g., tags or sensors) including an electrodeposited magnetostrictive material (e.g., a $Co_xFe_y$ alloy or any described herein). In some embodiments, the magnetostrictive material has a large magnetostriction value (e.g., $\lambda_{sat.}$ greater than about 100 ppm and/or $M_{sat.}$ greater than about $1.5\times10^{-6}$ A/m) and is capable of forming multifrequency tags and sensors. In particular, batch fabrication via electrodeposition can reduce cost and be more conducive towards developing chip-level sensor device architectures.

In some embodiments, the method includes electrodepositing one or more components of a magnetostrictive material on a surface, thereby providing one or more resonator portions of the microfabricated magnetic resonator. In some embodiments, the one or more resonator portions are micropatterned resonator portions.

In some embodiments, the electrodeposition step includes applying a plating solution (e.g., any herein) to the substrate and applying a galvanostatic pulse to the plating solution and the substrate. In further embodiments, the pulse has a duty cycle including a cathodic "on" portion and an "off" portion (e.g., each portion having a duration of from about 1 to 4 seconds). In yet other embodiments, the "on" portion includes a current density of equal to or more than about 30 mA/cm² (e.g., of from about 30 mA/cm² to 60 mA/cm²).

In some embodiments, the step of applying the plating solution includes adding the following agents in the following order: one or more electrolytes, one or more oxygen scavengers, one or more grain refiners, the cobalt source, and one or more surfactants; adjusting the pH to a desired pH level; and adding the iron source.

In other embodiments, the surface includes a micropatterned mold, where the micropatterned mold includes one or more interfaces (e.g., one or more posts) configured to affix one or more micropatterned resonator portions to the surface. A non-limiting example of a micropatterned mold is provided in FIG. 4B. In some embodiments, the micropatterned mold includes an array of a plurality of resonator portions. In other embodiments, the micropatterned mold includes an array of a plurality of microfabricated magnetic resonators. In some embodiments, the array includes about 2, 3, 4, 5, 6, 7, 8, 9, 10, 12, 15, 18, 20, 24, 26, 28, 30, 32, 34, 36, 38, 40, 50, 60, 100, or more resonator portions or resonators. In further embodiments, the micropatterned mold includes a sacrificial layer (e.g., a sacrificial $SiO_2$ layer).

In some embodiments, the electrodepositing step includes two or more components of the magnetostrictive material (e.g., 2, 3, 4, 5, 6, 7, 8, 9, or 10 components). In some embodiments, the first substrate includes an array of a plurality of resonator portions, thereby forming an array of microfabricated magnetic resonators on the first substrate.

In other embodiments, prior to the electrodepositing step, the method includes forming a micropattern on the surface, where the micropattern is configured to receive the one or more components of the magnetostrictive material. In some embodiments, the micropattern includes at least one length dimension L for the one or more micropatterned resonator portions. A non-limiting example of a micropattern on the surface is provided in FIG. 4A-4C, where the micropattern 135, 285, 330 can be filled with one or more components of the magnetostrictive material (e.g., filled with cobalt source and iron source components).

In other embodiments, the forming step includes depositing a photoresist on the surface, exposing the photoresist to a photomask including the micropattern, and developing the surface to provide a first area including the photoresist and a second area lacking the photoresist. In some embodiments, the electrodepositing step provides the magnetostrictive material on the second area of the surface, thereby forming the one or more micropatterned resonator portions.

The methods herein can include any number of other useful steps. Exemplary steps include removing at least a portion of the surface underlying the second area and removing the photoresist from the first area (e.g., thereby forming a micropatterned mold); etching the substrate to release the one or more resonator portions (e.g., a non-limiting example of releasing the resonator portions is provided in the last step in FIG. 4A); arranging the first substrate with one or more additional substrates, e.g., second and third substrates; and/or affixing the one or more resonator portions on the first, second, third, or more substrates.

In further embodiments, the method includes arranging the first substrate including a first microfabricated magnetic resonator with a second substrate including a second microfabricated magnetic resonator, thereby providing an array of resonators. In some embodiments, the first and second microfabricated magnetic resonators are different, where the first and second resonators are optionally arrayed to form a visual pattern in the substrate (e.g., as in FIG. 2A). In other embodiments, the first resonator includes a plurality of resonator portions, and where the second resonator includes one resonator portion.

In further embodiments, the method includes providing a third substrate including a third microfabricated magnetic resonator, and arranging the third substrate with the first and second substrates to form a further array. In some embodiments, the first and third resonators are different. In other embodiments, the second and third resonators are different.

In a fourth aspect, the present invention features an array including a plurality of resonators (e.g., any herein, where each resonator can be the same or different). For instance, microfabricated arrays can include a plurality of magnetoelastic longitudinal mode resonators. In some embodiments, each resonator (e.g., resonator tag) includes a suspended magnetostrictive $Co_xFe_y$ structure (e.g., resonator portion(s)) deposited and patterned by electrodeposition. In other embodiments, the resonator further is integrated with a permanent biasing magnet to achieve the optimal magnetoelastic operating point. The resonator arrays can be interrogated by any useful technique, e.g., by using an external loop antenna that generates an AC magnetic field, which causes the resonator to vibrate mechanically due to the Joule effect (i.e., the material strain induced by an applied magnetic field known as magnetostriction). Upon removal of the interrogation signal, the resonator can continue to vibrate, thereby generating its own AC magnetic response signal that is detectable by a receiving loop antenna, the same transmitting antenna switched to a receiving circuit, or any detector described herein.

In another aspect, the inventor features a microfabricated magnetic resonator manufactured by any of the methods described herein. In yet another aspect, each resonator includes a micron-sized resonator portion.

In yet another aspect, the invention features an array of a plurality of microfabricated magnetic resonators (e.g., manufactured by any of the methods described herein).

In a fifth aspect, the present invention features a tunable microfabricated device (e.g., a tunable capacitor, a tunable filter, an oscillator, or a tunable switch) including a substrate; a stationary anchor disposed on the substrate; a stationary electrode disposed on the substrate; a stationary actuation electrode disposed on the substrate and located between the stationary anchor and the stationary electrode; and a cantilever, where a top surface of the cantilever includes a layer of an electrodeposited material including cobalt and iron (e.g., any alloy described herein). In certain embodiments, the cantilever includes an extended arm having a first end and a second end, where the first end is affixed to the stationary anchor, the second end is suspended over the stationary electrode, and a center portion of the extended arm is suspended over the stationary actuation electrode.

In some embodiment, the device includes a movable electrode (e.g., a movable actuation electrode). In one instance, a movable actuation electrode is disposed on a surface of the cantilever and located across from the stationary actuation electrode disposed on the substrate. In another instance, a movable electrode is disposed on a surface of the cantilever (e.g., located in proximity to the second end) and located across from the stationary electrode disposed on the substrate.

In yet another aspect, the present invention features a method of making or operating a tunable microfabricated device (e.g., s described herein).

In any of the embodiments herein, the material (e.g., the electrodeposited or electroformed material) is a magnetostrictive material (e.g., any herein). In some embodiments, the material includes $Co_xFe_y$ and one or more optional additives (e.g., any herein), where x is of from about 60 atomic % (at. %) to 80 wt. % and y is of from about 20 at. % to 40 at. %. In other embodiments, the electrodeposited material comprises an alloy having of from about 70 to 80 at. % cobalt and about 20 to 30 at. % iron.

In any of the embodiments herein, the microfabricated magnetic resonator (e.g., resonator tag) includes n resonator portions, where n is 2 or more, and where each resonator portion has a different length dimension $L_n$. In some embodiments, each resonator portion has an orientation angle $\alpha_n$, and each an is different.

Definitions

As used herein, the terms "top," "bottom," "upper," "lower," "above," "beneath," and "below" are used to provide a relative relationship between structures. The use of these terms does not indicate or require that a particular structure must be located at a particular location in the apparatus, resonator, resonator array, or system.

As used herein, the term "about" means+/−10% of any recited value. As used herein, this term modifies any recited value, range of values, or endpoints of one or more ranges.

As used herein, the prefix "micro" or the term "micronsized" means that the structure includes at least one feature that is less than 1000 μm. Exemplary features include one or more length, width, height, thickness, circumference, etc.

As used herein, the term "resonator portion" means a resonating structure having a length $L_n$ along an axis n. As described herein, the resonator of the invention can have one or more resonator portions in any useful geometry or configuration. When a plurality of resonator portions is present, each portion may be a free-standing structure. In addition, each portion may be a planar film disposed on a surface. Alternatively, each portion can be integrated into a single structure sharing one or more common vertices. Additional descriptions of resonator portions are described herein.

By "hydrate" is meant a compound having one or more water molecules (e.g., integral to its crystal structure). Any useful molar amounts of hydrate may be present in the compound.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," J. Pharm. Sci. 1977 January; 66(1):1-19; and in "Handbook of Pharmaceutical Salts: Properties, Selection, and Use," Wiley-VCH, April 2011 (2nd rev. ed., eds. P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine.

Other features and advantages of the invention will be apparent from the following description and the claims.

BRIEF DESCRIPTION OF THE DRAWINGS

In FIG. 1B, angles $\alpha_2$ and $\alpha_3$ describe the radial position of axes 2 and 3, respectively, as compared to main axis 1.

DETAILED DESCRIPTION OF THE INVENTION

The present invention relates to microfabricated magnetoelastic resonators, sensors, and tunable devices, as well electrodeposition methods for making such components. In particular embodiments, the resonator includes one or more resonator portions and a substrate. Characteristics of these resonators, sensors, and tunable devices, as well as methods thereof, are described below.

Magnetoelastic Resonators

Figure 1A:
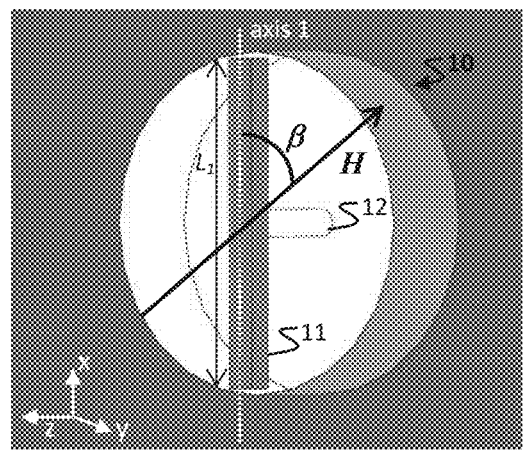
FIG. 1A-1C shows a schematic of (A) a single frequency resonator 10 having a resonator portion 11 with length $L_1$ along axis 1, where H is the magnetic field vector and β is the angle between the resonator main axis (i.e., axis 1 in the xy plane for this figure) and H; (B) a multi-frequency resonator 20 having three resonator portions 21 having lengths $L_1$, $L_2$, and $L_3$ along axes 1, 2, and 3, respectively, in the xy plane, where three possible frequencies can be detected in this exemplary resonator; and (C) a substrate 30 lacking a resonator but optionally including a post 32. The resonator portions can be of any useful size (e.g., from microns to centimeters in diameter) and geometry.

A magnetoelastic resonator generates an AC magnetic response signal when subjected to an externally applied AC magnetic interrogation signal. The resonating structure can include a planar film. Alternatively, the resonating structure can include one or more resonating structures (e.g., resonator portions). Such resonating structures respond to an applied magnetic field. In FIG. 1A, the resonator portion 11 is a rectangular prism whose length L and magnetic bias angle β determines its resonance frequency. When activated by an externally applied AC magnetic field, the resonating structures vibrate mechanically due to the Joule effect (i.e., the material strain induced by an applied magnetic field known as magnetostriction). Upon removal of the interrogation signal, the resonator continues to vibrate, generating its own AC magnetic response signal detectable by the same external loop antenna.

Figure 1B:
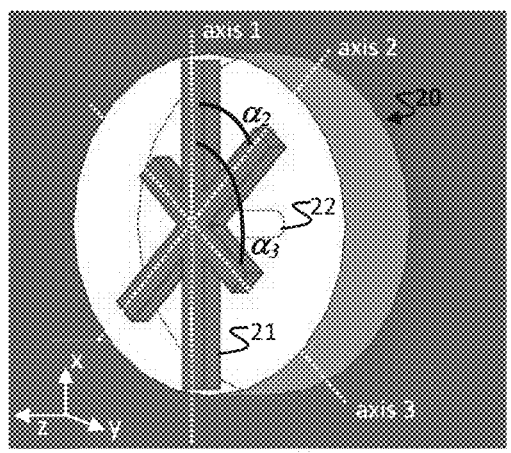

In one embodiment, the resonator includes one or more resonator portions and a substrate to affix each portion in a particular orientation. Each portion can be a free-standing structure. For instance, as shown in FIG. JA, the resonator portion 11 is an elongated bar having length $L_1$, and this structure is free-standing (albeit connected to a substrate via a post 12). Alternatively, each portion can be integrated into a single structure sharing one or more common vertices. For instance, as shown in FIG. 1B, the resonator 20 has three resonator portions 21, each along axis 1, 2, and 3 in the xy plane. Each of the portions has a length $L_n$ along an axis n (e.g., portion 1 has length $L_1$ along axis 1, portion 2 has length $L_2$ along axis 2, etc.). In addition, each portion intersects at the midpoint of each $L_n$ at a common vertex. As shown in FIG. 1B, this intersection provides a single structure having a star-shaped, multi-pronged shape. The center of this structure is then connected to a substrate in any useful manner, e.g., via a post 22 (as seen in FIG. 1B).

Each resonator portion can have any useful shape having one or more length dimensions $L_n$ along axis n. Exemplary shapes include an elongated bar, a square (e.g., a square film), a rectangle (e.g., a rectangular bar), a toroid, a circle, a cylinder, an annulus, a ring, an ellipsoid, a cone, a planar thin film, etc. In some embodiments, the resonator portion is a rectangular bar. Without wishing to be limited by mechanism, a rectangular bar may be particular useful to maintain the desired shape anisotropy for the resonator.

Each resonator portion can have any useful dimensions, including length $L_n$ having any useful value (e.g., from about 0.1 µm to about 10 cm). Exemplary values for length $L_n$ include from about 10 µm to 1000 mm (i.e., 100 cm), such as from about 10 µm to 50 µm, 10 µm to 100 µm, 10 µm to 250 µm, 10 µm to 500 µm, 10 µm to 750 µm, 10 µm to 1 mm, 10 µm to 5 mm, 10 µm to 10 mm, 10 µm to 25 mm, 10 µm to 50 mm, 10 µm to 75 mm, 10 µm to 100 mm, 10 µm to 250 mm, 10 µm to 500 mm, 10 µm to 750 mm, 25 µm to 50 µm, 25 µm to 100 µm, 25 µm to 250 µm, 25 µm to 500 µm, 25 µm to 750 µm, 25 µm to 1 mm, 25 µm to 5 mm, 25 µm to 10 mm, 25 µm to 25 mm, 25 µm to 50 mm, 25 µm to 75 mm, 25 µm to 100 mm, 25 µm to 250 mm, 25 µm to 500 mm, 25 µm to 750 mm, 25 µm to 1000 mm, 50 µm to 100 µm, 50 µm to 250 µm, 50 µm to 500 µm, 50 µm to 750 µm, 50 µm to 1 mm, 50 µm to 5 mm, 50 µm to 10 mm, 50 µm to 25 mm, 50 µm to 50 mm, 50 µm to 75 mm, 50 µm to 100 mm, 50 µm to 250 mm, 50 µm to 500 mm, 50 µm to 750 mm, 50 µm to 1000 mm, 75 µm to 100 µm, 75 µm to 250 µm, 75 µm to 500 µm, 75 µm to 750 µm, 75 µm to 1 mm, 75 µm to 5 mm, 75 µm to 10 mm, 75 µm to 25 mm, 75 µm to 50 mm, 75 µm to 75 mm, 75 µm to 100 mm, 75 µm to 250 mm, 75 µm to 500 mm, 75 µm to 750 mm, 75 µm to 1000 mm, 100 µm to 250 µm, 100 µm to 500 µm, 100 µm to 750 µm, 100 µm to 1 mm, 100 µm to 5 mm, 100 µm to 10 mm, 100 µm to 25 mm, 100 µm to 50 mm, 100 µm to 75 mm, 100 µm to 100 mm, 100 µm to 250 mm, 100 µm to 500 mm, 100 µm to 750 mm, 100 µm to 1000 mm, 250 µm to 500 µm, 250 µm to 750 µm, 250 µm to 1 mm, 250 µm to 5 mm, 250 µm to 10 mm, 250 µm to 25 mm, 250 µm to 50 mm, 250 µm to 75 mm, 250 µm to 100 mm, 250 µm to 250 mm, 250 µm to 500 mm, 250 µm to 750 mm, 250 µm to 1000 mm, 500 µm to 750 µm, 500 µm to 1 mm, 500 µm to 5 mm, 500 µm to 10 mm, 500 µm to 25 mm, 500 µm to 50 mm, 500 µm to 75 mm, 500 µm to 100 mm, 500 µm to 250 mm, 500 µm to 500 mm, 500 µm to 750 mm, 500 µm to 1000 mm, 750 µm to 1 mm, 750 µm to 5 mm, 750 µm to 10 mm, 750 µm to 25 mm, 750 µm to 50 mm, 750 µm to 75 mm, 750 µm to 100 mm, 750 µm to 250 mm, 750 µm to 500 mm, 750 µm to 750 mm, 750 µm to 1000 mm, 1 mm to 5 mm, 1 mm to 10 mm, 1 mm to 25 mm, 1 mm to 50 mm, 1 mm to 75 mm, 1 mm to 100 mm, 1 mm to 250 mm, 1 mm to 500 mm, 1 mm to 750 mm, 1 mm to 1000 mm, 5 mm to 10 mm, 5 mm to 25 mm, 5 mm to 50 mm, 5 mm to 75 mm, 5 mm to 100 mm, 5 mm to 250 mm, 5 mm to 500 mm, 5 mm to 750 mm, or 5 mm to 1000 mm.

The number of each resonator portion n can be of any useful value, such as from about 1 to about 25 (e.g., from about 1 to 5, 1 to 8, 1 to 10, 1 to 12, 1 to 15, 1 to 18, 1 to 20, 2 to 5, 2 to 8, 2 to 10, 2 to 12, 2 to 15, 2 to 18, 2 to 20, 2 to 25, 3 to 5, 3 to 8, 3 to 10, 3 to 12, 3 to 15, 3 to 18, 3 to 20, 3 to 25, 4 to 8, 4 to 10, 4 to 12, 4 to 15, 4 to 18, 4 to 20, 4 to 25, 5 to 8, 5 to 10, 5 to 12, 5 to 15, 5 to 18, 5 to 20, 5 to 25, 6 to 8, 6 to 10, 6 to 12, 6 to 15, 6 to 18, 6 to 20, 6 to 25, 8 to 10, 8 to 12, 8 to 15, 8 to 18, 8 to 20, 8 to 25, 10 to 12, 10 to 15, 10 to 18, 10 to 20, or 10 to 25). The resonator portion can have any useful thickness (i.e., in the z-direction), such as more than about 5 µm, 10 µm, 15 µm, 20 µm, 25 µm, 30 µm, 40 µm, 50 µm, 75 µm, 100 µm, 150 µm, or 200 µm; or from about 5 µm to 250 µm (e.g., from about 5 µm to 10 µm, 5 µm to 25 µm, 5 µm to 50 µm, 5 µm to 75 µm, 5 µm to 100 µm, 5 µm to 200 µm, 10 µm to 25 µm, 10 µm to 50 µm, 10 µm to 75 µm, 10 µm to 100 µm, 10 µm to 200 µm, 10 µm to 250 µm, 25 µm to 50 µm, 25 µm to 75 µm, 25 µm to 100 µm, 25 µm to 200 µm, 25 µm to 250 µm, 50 µm to 75 µm, 50 µm to 100 µm, 50 µm to 200 µm, 50 µm to 250 µm, 75 µm to 100 µm, 75 µm to 200 µm, 75 µm to 250 µm, 100 µm to 200 µm, 100 µm to 250 µm, 150 µm to 200 µm, 150 µm to 250 µm, or 200 µm to 250 µm).

In addition, each of n resonator portions can have any useful configuration. For instance, as shown in the FIG. 1B, each $n^{th}$ resonator portion is configured to have a particular angle $\alpha_n$, and each resonator portion is arranged in a radial pattern. The resonator portion along axis 1 is considered the main axis, and the angle $\alpha_n$ is set to 0°. The angles for the remaining resonator portions are determined using main axis 1 as the reference axis. Thus, $\alpha_2$ is the angle between axes 2 and 1, and $\alpha_3$ is the angle between axes 3 and 1. In some embodiments, the difference between each angle $\alpha_n$ are fixed integer multiples of a constant value $\Delta\alpha$. In other embodiments, the difference is irregular multiples of value $\Delta\alpha$. Exemplary values for $\Delta\alpha$ include from about 10° to about 180° (e.g., about 10°, 15°, 20°, 25°, 30°, 45°, 60°, 80°, 90°, 100°, 105°, 120°, 135°, 150°, or 180°). In some embodiments, the resonator portions include free standing patterned structures with multiple resonator frequencies. Exemplary resonance frequencies include from about 20 to about 80 kHz.

Figure 13A:
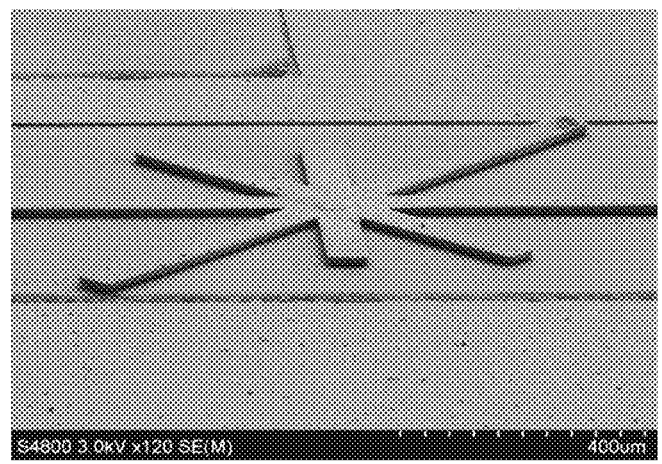
FIG. 13A-13C shows scanning electron microphotographs of an exemplary microfabricated magnetic resonator. Provided are (A) a top view, (B) side view, and (C) magnified side view of the resonator.
Figure 13B:
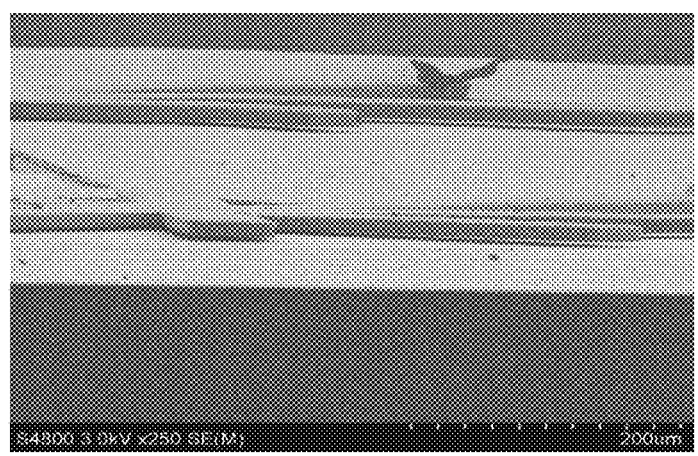
Figure 13C:
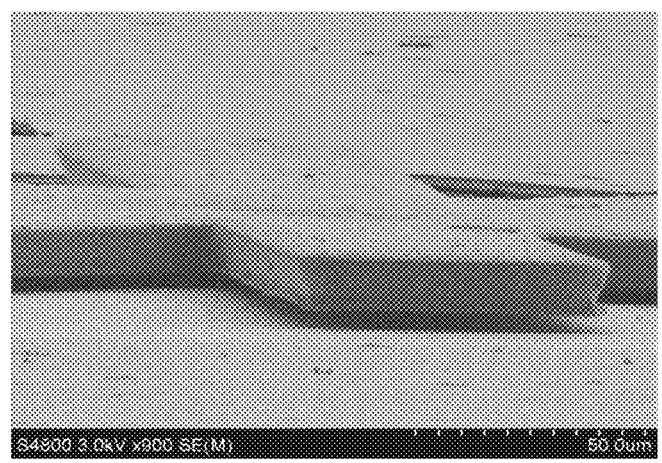

Furthermore, the resonators can include a plurality of resonating portions or resonators. The presence of multiple resonators of varying lengths and magnetic bias angles result in a multi-frequency signal that becomes the resonator's identity. Intentional randomness introduced by design variations enable the generation of millions of unique signature combinations. FIG. 13A-13C provides microphotographs of exemplary multiple frequency microresonators.

The shape, dimension, and configuration of the resonator portions can be used for multiplexed coding of the resonator tag or sensor. In one instance, the resonator tags of the invention have the potential to encode millions of unique code labels. For example, the number of code labels ($N_K$) can be determined as follows:

$$N_K = \frac{N_T!(N_W - 1)!}{2N_R!(N_T - N_R)!(N_W - N_R)!}, \quad \text{(Eq. 1)}$$

where $N_T$ is the number of resonator types having length $L_n$, $N_W$ is the number of possible angles $\alpha_n$, and $N_R$ (or n as used above) is the number of resonators. Assuming that $\Delta\beta \approx 10°$ and $\Delta f \approx 1$ kHz could be resolved, $N_R$ can be 5, $N_T$ can be 12, and $N_W$ can be 18, then $N_K$ is 22,619,520 different codes. Accordingly, the resonators of the invention can allow for encoding numerous code labels.

Figure 1C:
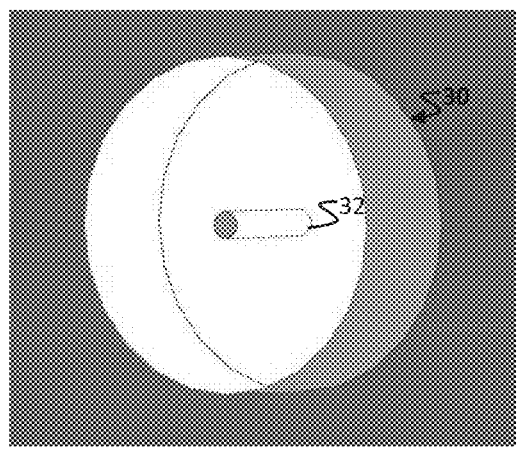

Each resonator can be present in any useful format, e.g., an array format or a multilayered laminate format. Multi-frequency resonator arrays also allow an additional layer of variability by randomizing the resonator positions and imparting an additional visual detection mechanism for detection of tampering. While robust to operational shock and vibration, they are fragile with respect to physical contact providing a means by which this additional detection can be easily erased, e.g., shearing blade, crushing, etc. This mechanism makes the resonators difficult, if not impossible, to counterfeit. FIG. 1A-C shows a 3-D model of (A) a single frequency resonator 10, (B) a multi-frequency resonator 20, and (C) a resonator post 32, where the CoFe resonators have been sheared off.

Figure 2A:
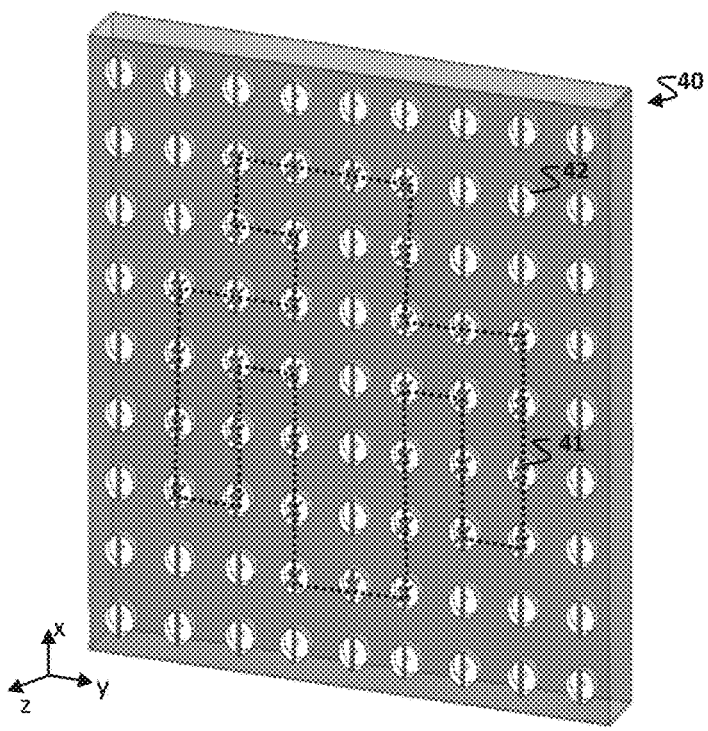
FIG. 2A-2B shows an array of resonators, including (A) an array 40 including both single resonators 42 and multi-frequency resonators 41, which provides a visual pattern (dotted lines connecting the location of the multi-frequency resonators) and (B) an array 45 with resonators sheared off to indicate tampering by loss of the visual pattern.
Figure 2B:
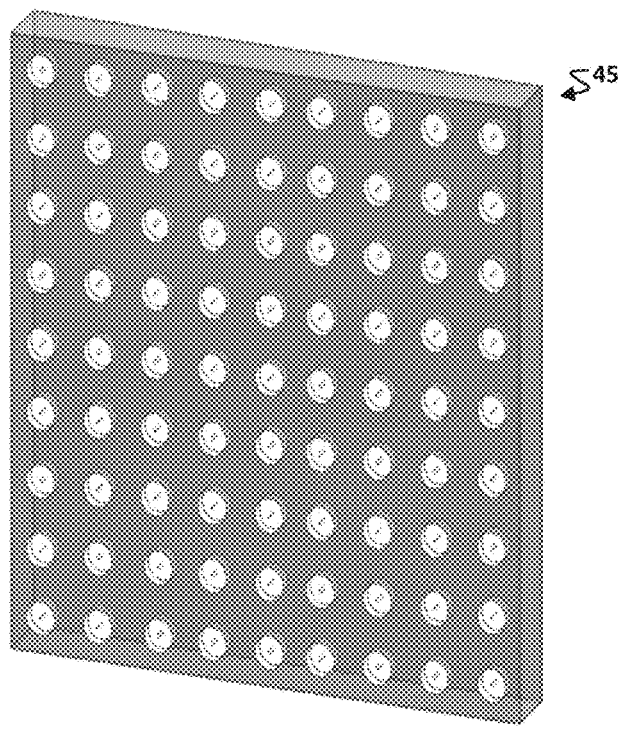

In some embodiments, as shown in FIG. 2A, two sets of resonators 41,42 can be provided in an array 40. Such arrays can be useful for use of resonator tags and sensors. For use as tags, the first set includes resonator tags having one resonator portion (similar to the resonator in FIG. 1A), where the array 40 in FIG. 2A includes mostly tags from this first set. The second set includes resonator tags having three resonator portions (similar to the resonator in FIG. 1B), where these tags are connected by the dotted line in FIG. 2A. In this manner, the array can be configured to provide one or more visual patterns (e.g., the dotted line in FIG. 2A).

In other embodiments, the resonator, sensor, or device is provided in a multilayered laminate format. For instance, the resonator (e.g., a thin film of a magnetostrictive material) is disposed on a surface of a substrate or a base substrate. In another instance, the resonator is disposed between two substrates, thereby forming a stack. One or more fillers (e.g., epoxy) may be present between the substrates.

The resonators, sensors, or devices can be formed from any useful magnetostrictive material, e.g., having a saturation magnetostriction $\lambda_{sat.}$ more than about 10 ppm, 20 ppm, 30 ppm, 40 ppm, 50 ppm, 60 ppm, 70 ppm, 80 ppm, 90 ppm, 100 ppm, 125 ppm, 150 ppm, 175 ppm, 200 ppm, 225 ppm, 250 ppm, 275 ppm, or more. Exemplary magnetostrictive materials include CoFe alloys (e.g., $Co_{1-x}Fe_x$ alloys, where $0.1 \leq x \leq 0.9$, such as $Co_{0.66}Fe_{0.34}$, $Co_{0.7}Fe_{0.3}$, $Co_{0.8}Fe_{0.2}$, or $Co_xFe_y$ alloys, as described herein); FeGa alloys (e.g., $Fe_{1-x}Ga_x$ alloys, where $0<x\leq0.35$, $0.04<x<0.35$, or $0.04<x<0.27$, such as in Galfenol); FeGaAl alloys (e.g., Fe—(20−y) at. % Ga— y at. % Al, where $0<y\leq15$; and Fe—(27.5−y) at. % Ga— y at. % Al, where $0\leq y\leq 14$); FeAl alloys (e.g., $Fe_{1-x}Al_x$, where $0<x\leq 0.35$, such as in Alfenol); FeSiB alloys (e.g., alloys having 85-95 wt. % Fe, 5-10 wt. % Si, and 1-5 wt. % B, such as Metglas® 2605SA1 and 2605HB1M having $\lambda_{sat.}$ of about 27 ppm, available from Metglas®, Inc., Conway, S.C.); FeCrSiB alloys (e.g., alloys having 85-95 wt. % Fe, 1-5 wt. % Cr, 1-5 wt. % Si, and 1-5 wt. % B, such as Metglas® 2605S3A having $\lambda_{sat.}$ of about 20 ppm, available from Metglas®, Inc.); NiFeMoB alloys (e.g., alloys having 40-50 wt. % Ni, 40-50 wt. % Fe, 5-10 wt. % Mo, and 1-5 wt. % B, such as Metglas® 2826 MB having $\lambda_{sat.}$ of about 12 ppm, available from Metglas®, Inc.); FeSiBC alloys (e.g., alloys having about 81 wt. % Fe, about 3.5 wt. % Si, about 13.5 wt. % B, and about 2 wt. % C, such as Metglas® 2605SC ($Fe_{81}Si_{3.5}B_{13.5}C_2$)); FeSeBC alloys; SmFe$_2$-based alloys (e.g., $Sm_xDy_{1-x}Fe_y$, where $0.14<x<0.9$ and $1.9<y\leq2$, such as $Sm_{0.86}Dy_{0.14}Fe_2$ in Samfenol-D; or $Sm_xEr_{1-x}Fe_y$, where $0.14<x<0.9$ and $1.9<y\leq2$, such as in Samfenol-E); FeRh alloys (e.g., such as that described in Ibarra M R et al., "Giant volume magnetostriction in the FeRh alloy," *Phys. Rev. B* 1994 August; 50(6):4196-9); DyFe$_2$-based alloys (e.g., $(Dy_{0.33}Fe_{0.67})_{1-x}B_x$, where $0\leq x\leq 0.1$); TbFe$_2$-based alloys (e.g., $Tb_xDy_{1-x}Fe_y$, where $0.27<x<0.3$ and $1.9<y\leq2$, such as $Tb_{0.3}Dy_{0.7}Fe_{1.92}$ in Terfenol-D® having $\lambda_{sat.}$ of about 1000-2000 ppm), as well as other NiFeCo-based alloys (e.g., a FeNiCoTi-based alloys, such as $Fe_{31.9}Ni_{9.8}Co_{4.1}Ti$, where subscripts refer to atomic %, as described in Kakeshita T et al., "Magnetic field-induced martensitic transformation and giant magnetostrictions in Fe—Ni—Co—Ti and ordered Fe$_3$Pt shape memory alloys," *Mater. Trans. JIM* 2000; 41(8):882-7). In particular embodiments, the magnetostrictive material is any alloy having $\lambda_{sat.}$ of more than about 10 ppm, 20 ppm, 30 ppm, 40 ppm, 50 ppm, 60 ppm, 70 ppm, 80 ppm, 90 ppm, 100 ppm, 125 ppm, 150 ppm, 175 ppm, 200 ppm, 225 ppm, 250 ppm, 275 ppm, or more.

Other magnetostrictive materials and stoichiometries can be determined by any useful process. For instance, chemical stoichiometries can be explored using hull cell tests. These tests vary the applied current density across a substrate through the geometry of the plating systems. The quality of the deposited film can then be quickly analyzed using Energy Dispersive Spectroscopy (EDS) or X-ray diffraction (XRD) across the substrate to correlate the effect of different chemistries and current densities on film quality and stoichiometry. The chemical compositions and deposition parameters found to yield the desired stoichiometries can then undergo cyclic voltammetry to map the reduction potentials of the electro-active species along with rotating disk electrode experiments to characterize the mass transport of the reaction. Finally, ECD conditions can be optimized, including pulse, periodic reverse, or traditional AC/DC plating to yield low stress films with optimum magnetostrictive properties.

In particular embodiments, the magnetostrictive material includes metastable martensitic clusters. Such materials can be determined by any useful method. For instance, microstructural analysis through XRD can be used to identify metastable martensitic clusters, which, without being limited by mechanism, are believed to be the source of magnetostriction in electrodeposited films. In addition, Superconducting Quantum Interference Device (SQUID) magnetometry can be used to determine magnetic properties such as coercive field and saturation magnetization that are important towards minimizing device input power while maximizing device output power.

Magnetostriction, $\lambda_{sat.}$, and magnetomechanical coupling factor, k, for thin films can also be measured using strain gauge methods (Clark A E et al., "Extraordinary magnetoelasticity and lattice soft ening in bcc Fe—Ga alloys," *J. Appl. Phys.* 2003; 93(10):8621-3) or by fabricating capacitive MEMS cantilever structures, where a change in capacitance can be directly related to a change in length with magnetic field (Iannotti V et al., "Improved model for the magnetostrictive deflection of a clamped film-substrate system," *J. Magnetism Magnetic Mater.* 1999; 202(1):191-6). The SQUID magnetometer can be used for temperature and field dependence of magnetostriction up to 7 T. The parameters $\lambda_{sat.}$ and k can be used as feedback for the electrodeposition process as a higher value of magnetostriction corresponds to a larger magnetomechanical response signal. In addition, phase-field modeling can be applied to examine the effects of microstructure on magnetostriction including the effects of grain orientation, size, and shape. The stability of these structures over time can be analyzed in accelerated lifetime tests through exposure to elevated temperatures and magnetic fields while measuring their output during operation and intermittently between dormant periods. One or more of these methods can be used to guide a skilled artisan towards optimal properties, as well as providing insight into the source of giant magnetostriction in these and similar materials. Other methods of making and characterizing such alloys are described, e.g., in Clark A E et al., "Extraordinary magnetoelasticity and lattice soft ening in bcc Fe—Ga alloys," *J. Appl. Phys.* 2003; 93(10):8621-3; and Elhalawaty S et al., "Oxygen incorporation into electrodeposited CoFe films: consequences for structure and magnetic properties," *J. Electrochem. Soc.* 2011; 158(11):D641-6, each of which is incorporated herein by reference.

The substrate for the resonator, sensor, or device can be any useful material. In particular embodiments, the substrate is configured to support the resonator portion(s) in a particular configuration, while permitting mechanical oscillations with limited dampening. In other embodiments, the substrate includes an interface (e.g., a post) configured to attach to the resonator portion(s) and to allow vibration of the resonator portion(s). Exemplary materials for the substrate include a polymer (e.g., polystyrene), a metal (e.g., Si), or glass, optionally including one or more damping layers (e.g., an electrostatic coating, a polymer coating, and/or a coating include one or more particles or fibers). In other embodiments, the substrate can include a seeding layer (e.g., a copper layer) to assist in electrodeposition of the magnetostrictive material.

In some embodiments, the invention includes a microfabricated, patterned array of suspended magnetoelastic longitudinal mode resonators integrated with a permanent biasing magnet to achieve the optimal magnetoelastic operating point.

The resonators can be configured to detect or sense any useful condition. The resonance frequency of a magnetoelastic material changes based on the surrounding medium. For instance, physical changes in the surrounding medium (e.g., pressure, temperature, density, viscosity, flow velocity, or elastic modulus), mechanical changes to the substrate or base structure, or mass loading of the resonator can act to dampen vibrations, thereby shifting the resonance frequency. This shift in frequency can be detected by any useful means (e.g., by magnetic, acoustic, and/or optical techniques, or any described herein). Accordingly, the resonators can be used to detect one or more of the following parameters: pressure (e.g., by detecting out-of-plane vibrations and/or basal plane vibrations of a resonator having one or more geometries that induce stress on the magnetostrictive material, such as by a resonator having a dimple, a folded surface, and/or a curved surface), temperature (e.g., by using a DC magnetic field interrogation signal having a constant amplitude and monitoring the change in resonance frequency and/or the amplitude changes in higher order harmonics of the response signal), density (e.g., by using two or more resonators having different surface roughness (e.g., by using different coatings, including $TiO_2$, or no coating), as measured by the volume of a liquid trapped by the surface roughness, and measuring the change in frequency shift), viscosity (e.g., by using two or more resonators having different surface roughness (e.g., by using different coatings, including $TiO_2$, or no coating), as measured by the volume of a liquid trapped by the surface roughness, and measuring the change in frequency shift), flow velocity (e.g., by measuring the change in resonance frequency upon exposure to changes in flow velocity of air or a liquid), elastic modulus (e.g., of a thin film coated on the resonator), a structural defect (e.g., a flaw of a base structure upon which the resonator is disposed), or mass. Additional modes for measuring parameters are described in Grimes C A et al., "Theory, instrumentation and applications of magnetoelastic resonance sensors: a review," *Sensors* (*Basel*) 2011; 11(3): 2809-44, which is incorporated herein by reference in its entirety.

In addition, the sensitivity of the resonators to mass loading can be used to detect other targets. For instance, the resonator can include a layer having one or more capture agents that bind to the target, where binding results in a change in mass of the layer. In use, the target binds to the capture agent, thereby mass loading the resonator. This results in shifting the resonance frequency of the resonator, where this shift can be detected in order to indicate the presence of the target. In this manner, the resonator can be used to detect any number of targets or conditions, including pH (e.g., by including a pH-sensitive coating), humidity (e.g., by including a humidity-sensitive coating, as described herein), carbon dioxide, an analyte (e.g., ammonia, ethylene, polycyclic aromatic hydrocarbons (PAHs) such as anthracene, etc.), a biological or biochemical agent (including proteins, peptides, enzymes, cofactors, pathogens, bacteria, and viruses, such as, e.g., lipoprotein particles, glucose, avidin, ricin, lactose, trypsin, endotoxin, enterotoxin, *E. coli*, *S. aureus, P. aeruginosa, M tuberculosis*, acid phosphatase, amylase, and pesticides), a drug (e.g., an antibiotic), pressure, temperature, density, viscosity, flow velocity, or elastic modulus.

The resonators, sensors, or devices can include one or more coatings. Such coatings can be useful for altering the physical properties of the resonator and/or trapping one or more targets. Exemplary coatings include a surface coating (e.g., having a particular roughness that traps water), a pH-sensitive coating (e.g., including one or more polymers that are pH-sensitive, thereby swelling and shrinking based on the changing pH, such as a poly(acrylic acid-co-isooctylacrylate), poly(vinylbenzylchloride-co-2,4,5-trichlorophenyl acrylate), as well as combinations thereof), a humidity-sensitive coating (e.g., to adsorb water, thereby allowing for mass loading of the resonator in humid conditions, such as coating having a moisture adsorbing layer, e.g., $TiO_2$ or $Al_2O_3$), a gas-sensitive coating (e.g., having particular reactivity to gaseous analytes, such as a sol-gel coating includes particles (e.g., $TiO_2$ particles)), a polymeric coating (e.g., acrylate- and/or acrylamide-based polymers, polyurethane-based polymers, poly(ethylene glycol) (PEG)-based polymers, polyvinyl alcohol (PVA), polycarbonate, as well as copolymers thereof, such as an acrylamide and isooctylacrylate polymer, an acrylic acid and iso-octyl acrylate polymer, poly(acrylic acid-co-isooctylacrylate), etc.), a sol-gel coating, a biocompatible coating (e.g., a PEG coating), a metal coating (e.g., ZnO, $TiO_2$, etc.), etc. For multiplexed detection, each resonator can include multiple coatings to enable detection of multiple parameters and/or analytes. Alternatively, an array can include multiple resonators, where each resonator can include a particular coating.

Such coatings can include one or more particles (e.g., nanoparticles, nanotubes, and/or microparticles of any useful material, such as metals, polymers, carbon black, etc.), capture agents (e.g., such as a protein that binds to or detects one or more targets (e.g., an antibody, a sugar, or an enzyme), a globulin protein (e.g., bovine serum albumin), a nanoparticle, a microparticle, a sandwich assay reagent, a catalyst (e.g., that reacts with one or more targets), or an enzyme (e.g., that reacts with one or more targets)), enzymes (e.g., horseradish peroxidase or glucose oxidase), detection agents (e.g., a dye, such as an electroactive detection agent, a fluorescent dye, a luminescent dye, a chemiluminescent dye, a colorimetric dye, a radioactive agent, etc.; or a particle, such as a microparticle, a nanoparticle, a latex bead, a colloidal particle, a magnetic particle, a fluorescent particle, etc.), and/or labels (e.g., an electroactive label, an electrocatalytic label, a fluorescent label, a colorimetric label, a quantum dot, a nanoparticle, a microparticle, a barcode, a radio label (e.g., an RF label or barcode), avidin, biotin, a tag, a dye, a marker, or an enzyme that can optionally include one or more linking agents and/or one or more dyes).

The resonators of the invention can also be configured to exploit tamper detection. For instance, and without limitation, resonator contact fragility, bias angle variability, and/or random process defects can be exploited for tamper indication.

The resonators of the invention can possess any useful characteristic or property. In one non-limiting example, the resonator penetrates metallic, non-ferrous barriers. In yet other embodiments, the resonator operates in harsh environments, includes zero on-board power (passive), can safely interrogated around high explosives, are immune to long-range interrogation, and/or can be robust to operational shock and vibration.

Cobalt and Iron Alloys

The present invention relates to $Co_xFe_y$ films, as well as methods for preparing and using such films. The film can possess any useful stoichiometric ratio of x and y. For instance, in some embodiments, x is of from about 60 at. % to 85 at. %, and y is of from about 15 at. % to 40 at. %. In another instance, x is of from about 70 at. % to 80 at. %, and y is of from about 20 at. % to 30 at. %.

The $Co_xFe_y$ films herein can comprise cobalt and iron, as well as any other useful additive. Thus, the use of the term "$Co_xFe_y$" does not preclude the presence of any useful additive in the film. Exemplary additives include one or more oxygen scavengers (e.g., ascorbic acid, borane, diborane, trimethylamine borane (TMAB), dimethylamine borane (DMAB), tert-butylamine borane, tetrahydrofuran borane, pyridine borane, ammonia borane, N,N-diethylhydroxylamine, glutathione, erythorbic acid, methyl ethyl ketoxime, carbohydrazide, as well as derivatives thereof), grain refiners (e.g., saccharin, phthalimide, o-toluene sulfonamide, or an alkylsulfonamide, including salts thereof, such as a sodium salt, such as saccharine sodium or sodium alkane sulfonate), surfactants (e.g., ANTI-PIT Y-17 (available from Technic, Inc., Cranston, R.I.), a glycol ether based surfactant, polyethylene glycol, sodium naphthalene sulfonate/formaldehyde condensate, a 2-butyne-1,4-diol/formaldehyde condensate, sodium lauryl sulfate, or sodium dodecyl sulfate), a complexing agent (e.g., an acid, citric acid, ethylenediaminetetraacetic acid (EDTA), ethylenediamine (EDA), glycine, other carboxylic acids, and amines, as well as salts, derivatives, and combinations thereof), a pH adjuster (e.g., an acid, such as fluoroboric acid or sulfuric acid), a brightener (e.g., heterocyclic amines, nitriles, and acetylenic alcohols), and/or other organic compounds (e.g., sorbitol, nitric acid, oxalic acid, malonic acid, acetic acid, adipic acid, succinic acid, and/or methanesulfonic acid). Additional agents and additives are described in U.S. Pub. No. 2005/0161338 and 2010/0243133, as well as U.S. Pat. Nos. 4,053,373 and 4,208,254, each of which is incorporated herein by reference in its entirety.

The cobalt and iron in the film can be provided from any useful source. For instance, a cobalt source includes any Co(II) reagent, including cobalt (II) sulfamate or $Co(SO_3NH_2)_2$, e.g., cobalt (II) sulfamate hydrate; cobalt sulfate; cobalt fluoroborate; or cobalt chloride, including derivatives and hydrates thereof. In another instance, an iron source includes any Fe(II) reagent, including iron (II) tetrafluoroborate or $Fe(BF_4)_2$, e.g., iron (II) tetrafluoroborate hexahydrate; iron sulfate; iron chloride; iron sulfamate; or ammonium iron sulfate or $Fe(II)(NH_4)_2(SO_4)_2$, e.g., ammonium iron (II) sulfate hexahydrate, including salts, derivatives, and hydrates thereof. In some embodiments, the cobalt and/or iron sources do not include sulfate.

The components of the film can be provided as a plating solution (e.g., an aqueous plating solution). The solution may further include one or more electrolytes (e.g., boric acid). The components (e.g., cobalt sources, iron sources, or additives) can be added in any useful manner. In one instance, the components are added sequentially, where the electrolyte is added first, and then the cobalt source is added with any desired additive. Then, the pH is adjusted, and the iron source is added as the last component. In some embodiments, the pH is maintained at a low value (e.g., less than about 3). Although use of low pH can result in iron oxidation and increased deposit stress, we have discovered that the continual use of an inert gas in combination with an oxygen scavenger provides films with low oxygen content. In addition, we could reduce the formation of iron deposits by maintaining a long enough "off" duration in the duty cycle to ensure sufficient oxygen scavenging.

Methods of Making and Testing Resonators, Sensors, and Devices

The resonators, sensors, and devices of the invention can be made and tested with any useful technique. In some embodiments, the method includes electrodepositing one or more components of a magnetostrictive material. Electrodepositing the magnetic resonators eliminates the need for custom assembling and allows for batch processing of multi-frequency arrays in a cost-effective manner. Electrodeposition of CoFe alloys have been extensively researched for other properties, however no one has yet considered its implications for giant magnetostriction, see, e.g., Elhalawaty S et al., "Oxygen incorporation into electrodeposited CoFe films: consequences for structure and magnetic properties," *J. Electrochem. Soc.* 2011; 158(11): D641-6; Koza J A et al., "The effect of magnetic fields on the electrodeposition of CoFe alloys," *Magnetohydrodynamics* 2009; 45(2):259-66; Koza J A et al., "The effect of magnetic fields on the electrodeposition of CoFe alloys," *J. Magnetism Magnetic Mater.* 2009; 321:2265-8; Mishra A C, "Microstructure, magnetic and magnetoimpedance properties in electrodeposited NiFe/Cu and CoNiFe/Cu wire with thiourea additive in plating bath," *Physica B-Condensed Matter* 2012; 407(6): 923-34; Osaka T et al., "A high moment CoFe soft magnetic thin film prepared by electrodeposition," *Electrochem. Solid State Lett.* 2003; 6(4):C53-5; Sartale S D et al., "Electrochemical synthesis of nanocrystalline $CuFe_2O_4$ thin films from non-aqueous (ethylene glycol) medium." *Mater. Chem. Phys.* 2003; 80(1):120-8; Wang L et al., "Facile synthesis and electromagnetic wave absorption properties of magnetic carbon fiber coated with Fe—Co alloy by electroplating," *J. Alloys Compounds* 2011; 509 (14):4726-30; and Zong B Y et al., "Ultrasoft and high magnetic moment NiFe film electrodeposited from a $Cu^{2+}$ contained solution," *IEEE Trans. Magnet.* 2006; 42(10): 2775-7, each of which is incorporated herein by reference in its entirety.

In one embodiment, the method includes electrodepositing films with the highest degree of magnetostriction or "giant magnetostriction" (e.g., $\lambda_{sat.}$ of more than about 100 ppm or 200 ppm). In other embodiments, the film is a $Co_{0.66}Fe_{0.34}$ film that was annealed for 1 hour at 800° C. and water-quenched. In yet other embodiments, the film is a $Co_xFe_y$ film (e.g., any herein) that is not annealed but still possess $\lambda_{sat.}$ of more than about 100 ppm. Without wishing to be limited by mechanism, the film can include a magnetic reorientation of Co-rich precipitates, which can be formed via the high temperature anneal and water quenching process, giving rise to this giant magnetostriction in films deposited near the (fcc+bcc)/bcc phase boundary for the Co/Fe system.

The electrodeposition process can include any number of useful steps. This process generally includes immersing a surface in plating solutions under particular operating conditions, such as temperature, bath pH, counter electrode selection, agitation, current mode, and current density. Exemplary conditions include use of one or more Co-containing compounds (e.g., $CoSO_4 \cdot 7H_2O$ or $Co(SO_3N-H_2)_2$), one or more Fe-containing compounds (e.g., $FeSO_4 \cdot 7H_2O$, $Fe(NH_4)_2(SO_4)_2$, or $FeCl_3$), one or more buffers (e.g., $H_3BO_3$, 2-picoline, 2,6-lutidine, or acetic acid), one or more salts (e.g., calcium salts (e.g., $CaCl_2$), alkali salt (e.g., NaCl), or vanadium salts (e.g., $VOSO_4$)), one or more acids (e.g., acetic acid, succinic acid, glutaric acid, methylsuccinic acid, mannitol, or sorbitol), one or more additives (e.g., saccharin, thiourea, thiodiglycolic acid, and/or an aromatic sulfinic acid or salt thereof, such as a benzenesulfinate salt), one or more reducing agents (e.g., ascorbic acid or trimethylamineborane or any other oxygen scavenger described herein), one or more surfactants (e.g., sodium lauryl sulfate or any herein), one or more electrodes (e.g., vertical electrodes of pure Co, one or more counterelectrodes (e.g., a Pt counterelectrode), one or more working electrodes (e.g., Cu plates), and/or one or more reference electrodes (e.g., Ag/AgCl saturated reference electrodes)), constant bath temperature (e.g., of from about 25° C. to 60° C., such as about 50° C.), optimal pH (e.g., from about 2.0 to 3.5), agitation (e.g., of from about 100 rpm to 400 rpm), a magnetic field (e.g., to induce uniaxial anisotropy in the deposition plane), a rotating cathode (e.g., rotating Cu disks), a non-nucleating plate surface (e.g., a Cu/NiP surface, a glass/Ti surface, a Cu/Si surface, Cu foil, NiFe/NiCr/glass surface, or an NiFe/Si surface having one or more of amorphous NiP, NiFe, or Cu to prevent nucleation), optimal current density (e.g., from about 4 $mA/cm^2$ to 50 $mA/cm^2$, such as about 40 $mA/cm^2$), use of a dual cell system including separate cathode and anode cells with a salt bridge, optimal frequency (e.g., about 1000 Hz), and/or optimal current mode (e.g., continuous dc mode or pulsed mode, as described herein). After electrodeposition, the resultant material can undergo further processing, such as annealing (e.g., magnetic annealing in a vacuum), furnace cooling (e.g., at a rate of about 10° C./minute), directional solidifying, and/or rapid quenching (e.g., with water at room temperature).

In other embodiments, the electrodeposition process can include using a Hull cell (e.g., an electrochemical cell containing cobalt and iron cations in solution), which can be optimized by varying current density, stress, film quality, and stoichiometry found using EDS varying chemistry concentrations, current densities, operating conditions. A rotating disc electrode can be used to characterize mass transport of the reaction, determine stress, film quality. Cyclic voltammetry can be used to determine reduction potentials of the electro-active species and to optimize the AC/DC plating conditions. Beaker electroplating can be used to optimize AC/DC conditions, pulse plating, periodic reverse plating, and to determine lithography process compatibility. These processes can be optimized for wafer uniformity and for use in large wafer sized (e.g., 6" wafer size or more). In some embodiments, the method results in cost-effective batch manufacturing process; high magnetostriction alloy films; thick, free-standing patterned structures; and/or low stress gradient.

Such electrodeposition processes could allow for micropatterning by any useful manner. Exemplary non-limiting processes and micropatterns are provided in FIGS. 4A-4C, 10, 11, and 12.

In some embodiments, the process includes forming the resonator portion(s) on a substrate, and then etching the substrate around the resonator portion(s). An exemplary process 100 is provided in FIG. 4A. First, a surface 110 is provided to deposit 101 a layer of seed metal 120 (e.g., Cu). Then, a layer of photoresist 130 is deposited 102 on the seed metal. Next, the photoresist is patterned 103 (e.g., by any useful method, such as those provided herein) to include a micropattern 135 configured to receive one or more components of the magnetostrictive material (e.g., a cobalt source, an iron source, and any optional additive). One or more such components are electrodeposited 104 in the micropattern to form the resonator portions 140 (e.g., by placing the substrate in a plate solution containing such components). Then, the seed metal layer is etched 105, thereby providing a residual metal layer 150 beneath the resonator portions 140. Finally, the substrate is etched 106 to provide an opening 160 (e.g., by any useful method, such as those provided herein), thereby releasing the resonator and allowing the resonator portions to vibrate freely. In some instances, the etching process releases the resonators but maintains an interface configured to affix the resonator portions to the substrate. Non-limiting interfaces include an etched post that affixes the resonator portions to the substrate.

In other embodiments, the substrate is first patterned to include one or more microstructures, and then the resonator portion(s) are formed on the substrate. An exemplary process 200 is provided in FIG. 4B. First, a layer of photoresist 230 is deposited 201 on the surface 215. Next, the photoresist is patterned 202 (e.g., by any useful method, such as those provided herein) to include a micropattern 240 configured to provide a micromold on the surface. The pattern is etched 203 into the substrate, and then photoresist is removed 203 to provide a substrate 250 (e.g., a micromold) optionally having an interface configured to attach to the resonator portion(s) (e.g., a post 255).

Then, the micromold is filled 204 with a sacrificial layer 260 (e.g., an $SiO_2$ layer) to overcoat the substrate. The sacrificial layer is polished back 205 to leave the patterned surface filled with the sacrificial layer 265 but to expose the surface of the post 255. A layer of seed metal 270 is deposited 206, and then a second layer of photoresist 280 is deposited 207 on the seed metal. The photoresist is patterned 208 (e.g., by any useful method, such as those provided herein) to include a micropattern 285 configured to receive one or more components of the magnetostrictive material (e.g., a Co cation source and an Fe cation source). One or more such components are electrodeposited 209 in the micropattern to form the resonator portions 290. Then, the seed metal layer is etched 210 to expose the underlying sacrificial layer. Finally, the surface is etched (e.g., by any useful method, such as those provided herein) to remove 211 the sacrificial layer and to release 211 the resonator, thereby allowing the resonator portions to vibrate freely. In some instances, the etching process releases the resonators but maintains an interface configured to affix the resonator portions to the substrate.

The methods of the invention also include any methods including electrodeposition to form the resonator portion(s). As seen in the process 300 of FIG. 4C, first, a surface 315 having a layer of photoresist 320 is exposed 301 to a photomask 350 including a micropattern (the white portion of the photomask) that allows for UV transmission. In particular, the micropattern defines the geometry and configuration of the resonator portion(s) in the xy plane of the resonator (see FIG. 1A for the definition of the xy plane). UV light is then transmitted through the micropattern to crosslink the photoresist.

Figure 4A:
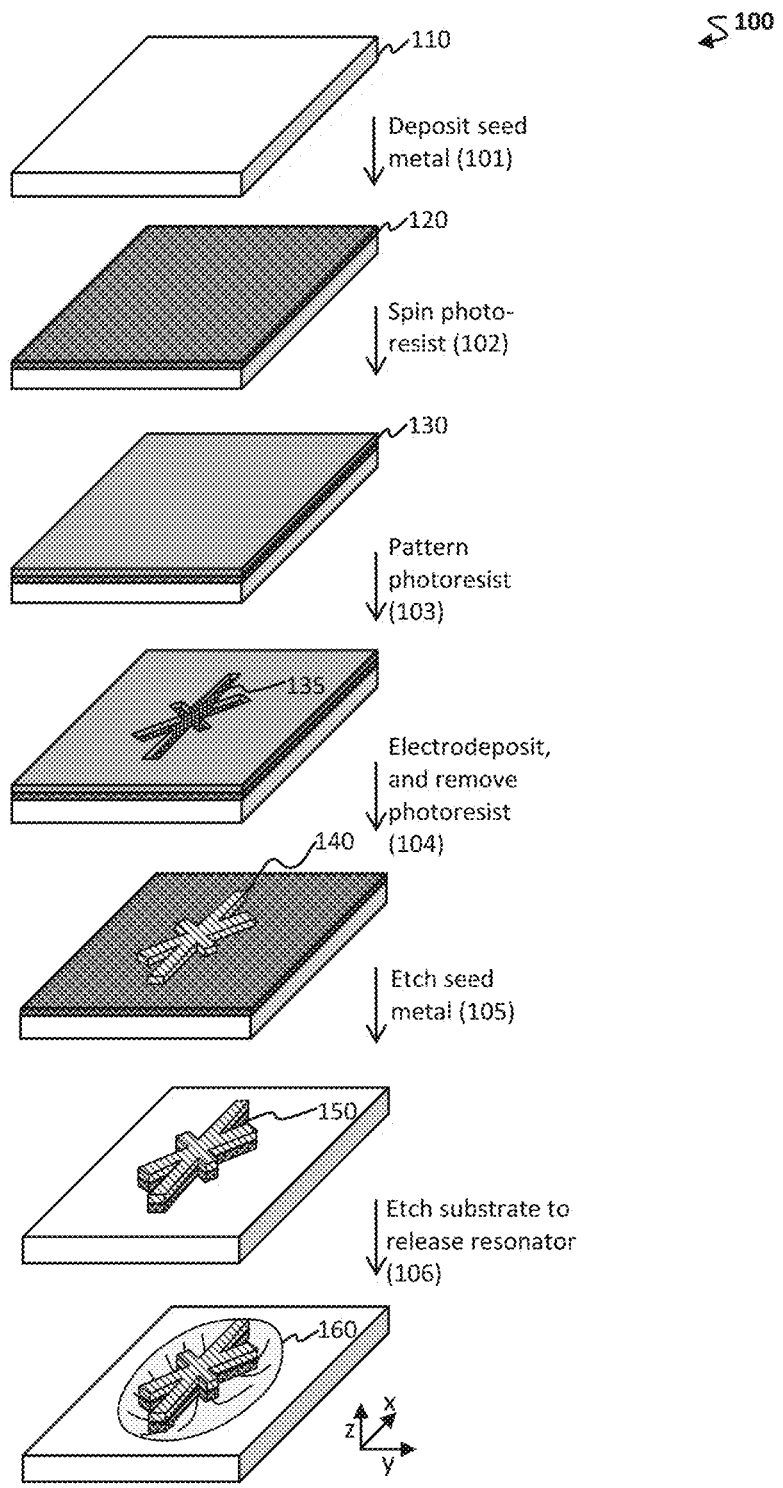
FIG. 4A-4C shows schematics of exemplary methods to form resonator portions of a microfabricated magnetic resonator. (A) One exemplary method 100 includes an etch step 106 to release the resonator. (B) Another exemplary method 200 includes separate steps to etch 203 a post and then to pattern the resonator 208. (C) Yet another exemplary method 300 includes steps to electrodeposit 303,307 a material to form the resonator portion and then to optionally affix 310 the resonator to a substrate.
Figure 4B:
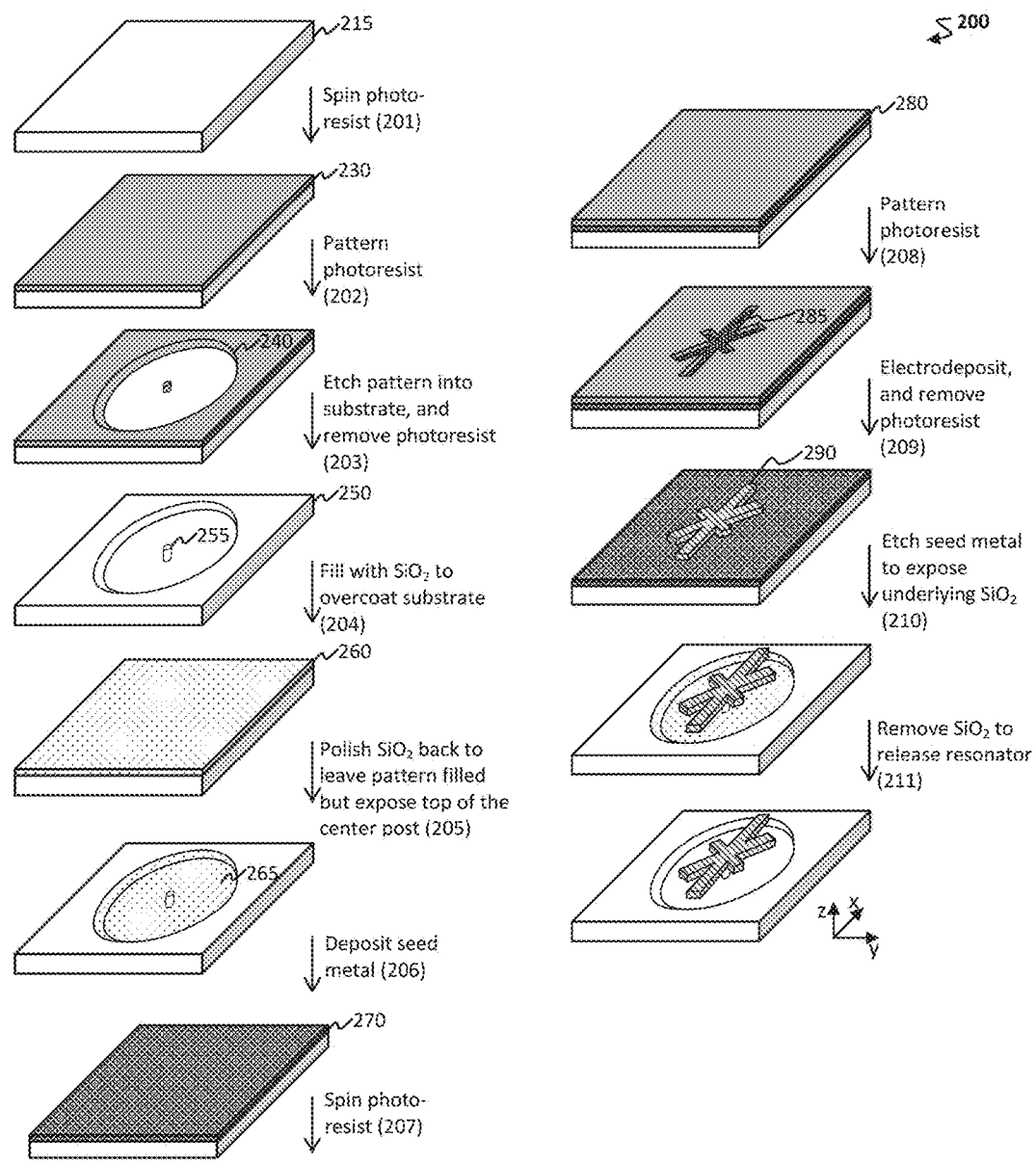
Figure 4C:
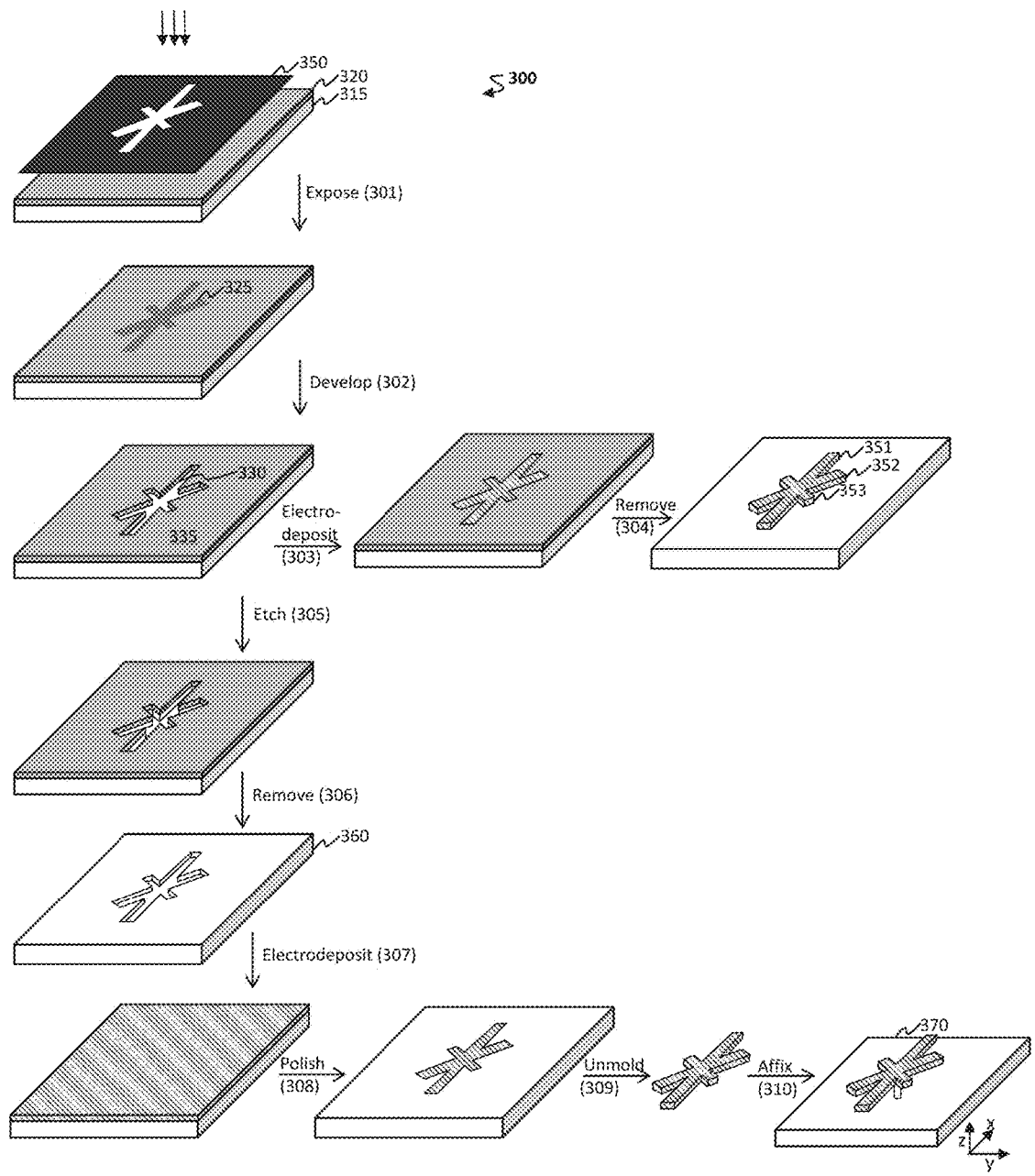

Next, the exposed surface is developed 302. As seen in FIG. 4C, the photoresist is a positive tone resist, where the UV-exposed portion 325 of the resist is more soluble to the developing solvent, as compared to the masked portion of the resist. Thus, aft er developing, the resulting surface includes a first area including photoresist 335 and a second area lacking the photoresist 330. Although FIG. 4C describes use with a positive tone resist, a skilled artisan would understand that negative tone resists can also be employed. Such negative tone resists, aft er UV exposure, are less soluble to the developing solution, as compared to before UV exposure. Thus, the photomask can be adapted to provide the micropattern as a negative image (i.e., where the portion of the photomask including the micropattern blocks UV transmission).

In one embodiment, the developed surface is then used for the electrodeposition process 303 (see, e.g., the top portion of FIG. 4C). The magnetostrictive material is deposited within the second area (or micropattern) 330, and then the photoresist is removed 304. Optionally, the surface can be polished or machined to remove excess magnetostrictive material. The resultant resonator portions 351, 352, 353 can optionally be removed from the surface 315 and affixed to another substrate. Alternatively, the resonator portions can be maintained on the surface 315, and the surface can serve as the substrate for the resonator. For instance, the substrate can be etched to allow release the resonator portions, thereby allowing these portions to vibrate freely. In some instances, the etching process releases the resonators but maintains an interface configured to affix the resonator portions to the substrate.

In another embodiment, the developed surface is then further processed to form a micromold (see e.g., bottom portion of FIG. 4C). The second area 330 is etched 305 (e.g., by a DRIE process) to remove a portion of the surface underlying this second area. Then, the photoresist layer 335 is removed 306, thereby providing a micropatterned mold (micromold) 360. Optionally, the surface of the micromold is polished by thermally growing $SiO_2$, thereby providing a surface that facilitates removal of the electrodeposited layer. Alternatively, one or more sacrificial layers or release layers may be used as well.

Then, one or more components of the magnetostrictive material is electrodeposited 307 on the micromold. Optionally, the electrodeposited surface can be micromachined or micropolished 308 to remove excess material. Next, the micropatterned resonator portions can be unmolded 309 (alternatively, as described herein, the substrate can be etched to release the resonator portions). Finally, if desired, the resonator portions can be affixed 310 on a substrate 370 to form the resonator.

Figure 10:
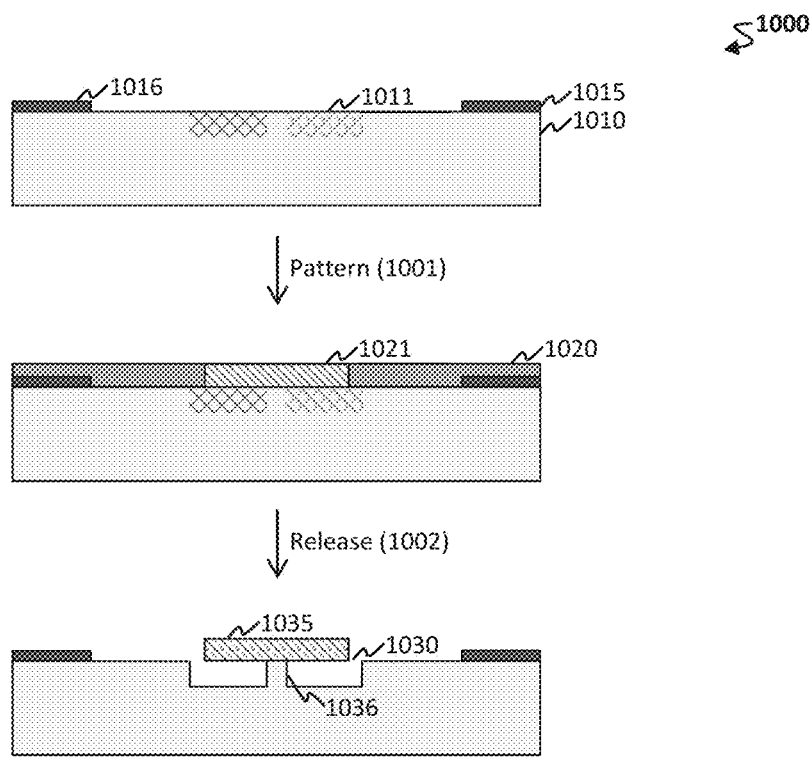
FIG. 10 shows a schematic of an exemplary method 1000 to form a microfabricated magnetic resonator disposed on an etchable substrate 1010.
Figure 11:
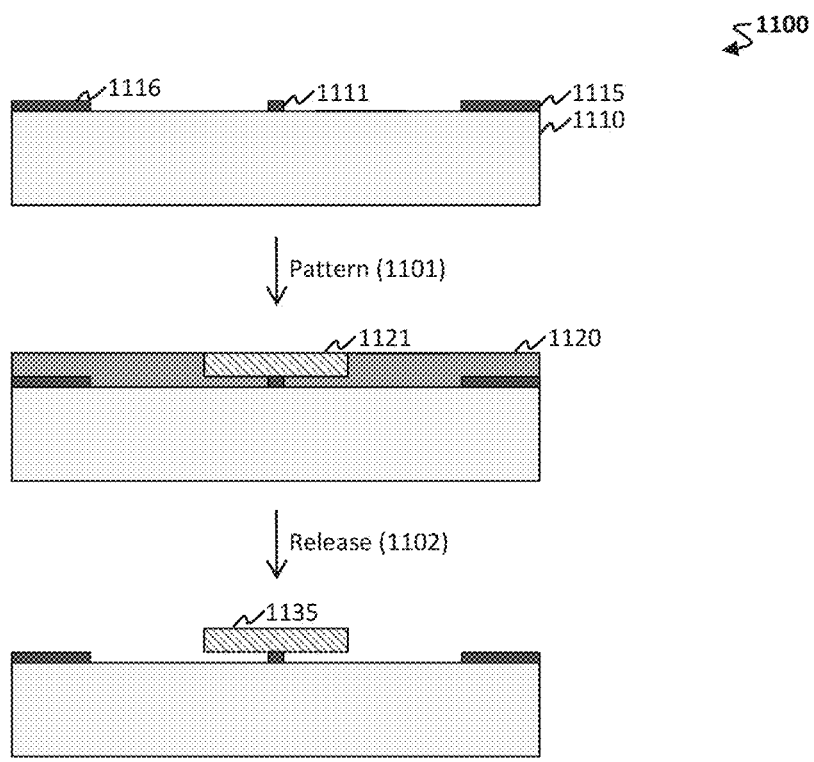
FIG. 11 shows a schematic of another exemplary method 1100 to form a microfabricated magnetic resonator disposed on a non-etched substrate 1110.
Figure 12:
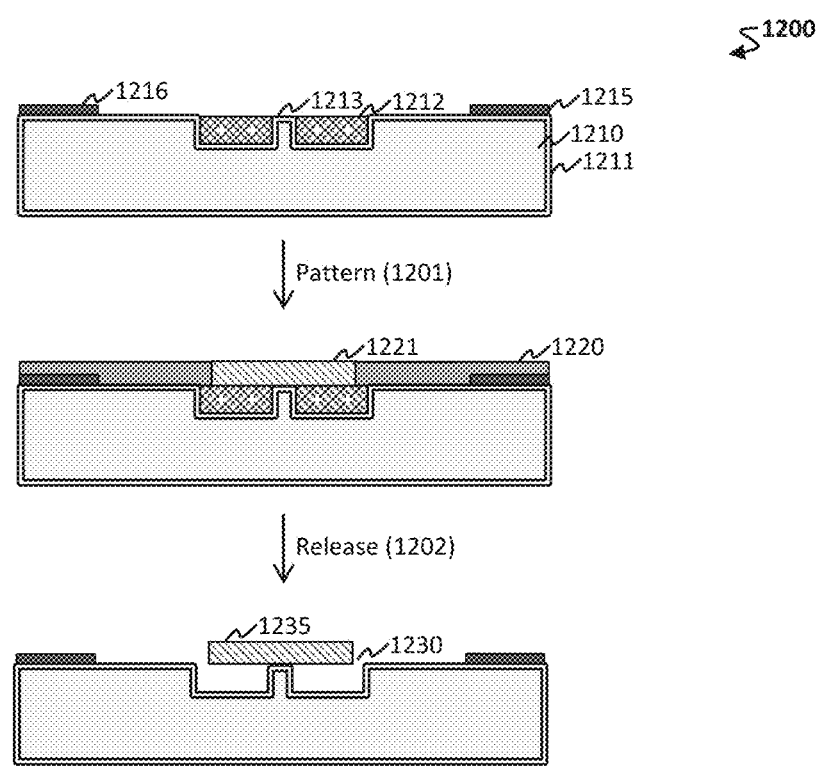
FIG. 12 shows a schematic of yet another exemplary method 1200 to form a microfabricated magnetic resonator disposed on a substrate 1210 having an oxidized layer 1211.

Further exemplary non-limiting processes are provided in FIGS. 10, 11, and 12. As seen in FIG. 10, one exemplary process 1000 includes forming the resonator portion(s) on a substrate, and then etching the substrate around the resonator portion(s). First, a surface of a substrate 1010 having one or more electrical contacts 1015,1016 is provided. If the substrate is composed of a photoetchable material, then one or more opening patterns 1011 can be photopatterned into the substrate 1010. For instance, this step can be conducted by spinning a layer of photoresist and patterning the electrical contacts, depositing (e.g., by way of electron beam evaporation) one or more conductive materials, and removing the photoresist layer, thereby forming the electrical contact(s). Then, the opening can be patterned by spinning a layer of photoresist on a surface of the substrate and developing the photoresist to from a mask having the opening pattern, and the opening can be formed by exposing the photoetchable material of the substrate and etching away the exposed regions.

Then, the resonator portion is patterned 1001. In one instance, an optional seed layer is deposited, and a layer of photoresist 1020 is deposited on the seed metal. Next, the photoresist is patterned (e.g., by any useful method, such as those provided herein) to include a micropattern configured to receive one or more components of the magnetostrictive material (e.g., a cobalt source, an iron source, and any optional additive). One or more such components 1021 are electrodeposited in the micropattern to form the resonator portions (e.g., by placing the substrate in a plate solution containing such components).

Finally, the resonator portion 1035 is released 1002 by removing any remaining material (e.g., photoresist, seed layers, etc.) and etching the substrate to provide an opening 1030. Optionally, the structure can include a post 1036 that supports the resonator portion. The substrate can be composed of any useful material, such as a photosensitive glass ceramic material (e.g., Apex® glass). Upon exposure to a light source (e.g., an ultraviolet light source) and subsequent baking, the exposed and baked photosensitive material is converted into a ceramic material. This ceramic material is more easily etched, as compared to the non-exposed material that is more akin to glass. In this way, photolithography can be employed to provide an opening pattern, and subsequent etching then provides the opening.

As seen in FIG. 11, another exemplary process 1100 includes patterning a post and forming the resonator portion(s) on the post. First, a surface of a substrate 1110 having one or more electrical contacts 1115,1116 is provided. A post 1111 is disposed on this substrate 1110, which can be patterned and deposited in any useful manner.

Then, the resonator portion is patterned 1101. In one instance, an optional seed layer is deposited, and a layer of photoresist 1120 is deposited on the seed metal. Next, the photoresist is patterned (e.g., by any useful method, such as those provided herein) to include a micropattern configured to receive one or more components of the magnetostrictive material (e.g., a cobalt source, an iron source, and any optional additive). One or more such components 1121 are electrodeposited in the micropattern to form the resonator portions (e.g., by placing the substrate in a plate solution containing such components). Finally, the resonator portion 1135 is released 1102 by removing any remaining material (e.g., photoresist, seed layers, etc.).

As seen in FIG. 12, yet another exemplary process 1200 includes patterning a post and forming the resonator portion(s) on the post. The substrate 1210 can include an oxidized layer 1211 (e.g., a conformal oxidized layer). First, an oxidized surface 1211 of a substrate 1210 having one or more electrical contacts 1215,1216 is provided. A post 1213 is disposed on this substrate 1210, and the opening surrounding the post 1213 can be filled with a sacrificial material 1212 (e.g., a dielectric, a polysilicon, etc.).

Then, the resonator portion is patterned 1201. In one instance, an optional seed layer is deposited, and a layer of photoresist 1220 is deposited on the seed metal. Next, the photoresist is patterned (e.g., by any useful method, such as those provided herein) to include a micropattern configured to receive one or more components of the magnetostrictive material (e.g., a cobalt source, an iron source, and any optional additive). One or more such components 1221 are electrodeposited in the micropattern to form the resonator portions (e.g., by placing the substrate in a plate solution containing such components). Finally, the resonator portion 1235 is released 1202 by removing any remaining material (e.g., photoresist, seed layers, etc.) and forming an opening 1230.

Electrodeposition conditions can include any useful parameters. In one instance, plating can be conducted in pulsed mode (e.g., employing a galvanostatic pulse) or in direct current mode. When pulsing is used, the time duration of each pulse and the current density of the pulse can be optimized. For instance, the pulse can be characterized by an "on" state and an "off" state, and the time duration of the "on" state can be used to promote the kinetically controlled reaction within the plating bath and to minimize the mass transfer limited reaction. In some embodiments, the time duration of the "on" state is of from about 1 to 5 seconds (e.g., of from about 2 to 3 seconds). The time duration of the "off" state can be chosen to ensure that the bulk concentrations of the cobalt and iron sources are restored. For instance, the time duration of the "off" state is of from about 1 to 5 seconds (e.g., about 3 seconds).

The current density of the pulsed or direct current can be chosen to provide the desired stoichiometric ratio, or range of ratios, of the final film. For instance, one or more kinetic and mass transfer studies can be performed to understand the kinetics of the metal deposition. In one instance, the desired ratio is about 70 at. % to 80 at. % cobalt and about 20 at. % to 30 at. % iron, and the current density is more than about 30 $mA/cm^2$ (e.g., of from about 30 $mA/cm^2$ to 80 $mA/cm^2$, such as of from about 40 $mA/cm^2$ to 60 $mA/cm^2$).

The plating bath and its chemical reagents (including additives), either before and/or during electrodeposition, can have any useful experimental conditions. Such conditions include constant bubbling or introduction of an inert gas to minimize oxygen contamination (e.g., inert gases such as argon or $N_2$), a low pH (e.g., of from about 1.5 to 3, such as about 2), and/or an increased temperature (e.g., of from about 30° C. to 60° C., such as about 50° C.).

Arrays of resonator portions and resonators could be formed by optimizing any of the processes described herein. For instance, a photomask can include a plurality of micropatterns in a particular a×b array (e.g., where each a and b is, independently, an integer from about 2 to about 50). Each micropattern can include a configuration of one or more resonator portions. For instance, the micropattern can include one resonator portion (e.g., to provide the resonator of FIG. 1A) or three resonator portions (e.g., to provide the resonator of FIG. 1B). In addition, each micropattern in the array can be the same or different. For instance, as shown in FIG. 2A, there are two types of resonators 41,42 in the array 40, where a first type includes one resonator portion and a second type includes three resonator portions. In a similar manner, the micropattern can be designed to provide a particular visual pattern. In some embodiments, an array of visual patterns can be provided in the array including a plurality of micropatterns.

Exemplary methods of micropatterning include micromolding (e.g., by defining the mold using photolithography patterning with photoresist on a surface, etching the surface (e.g., by deep reactive ion etch) to create the mold, polishing the mold (e.g., by stripping the patterned photoresist and growing thermal oxide), and cleaning the mold), microfabrication (e.g., by casting, injection molding, compression molding, embossing, ablation, thin-film deposition, and/or Computer Numerically Controlled (CNC) micromachining), wettability patterning (e.g., by controlling the wettability of a surface prior to electrodeposition), surface nucleating (e.g., by creating surface defects to promote sites of nucleating during the electrodeposition process), photolithography (e.g., by coating a surface with positive and/or negative photoresists, transferring patterns to the resist by using a photomask, developing the patterned resist, etching the substrate, and/or removing the photoresist), etching techniques (e.g., wet chemical etching, reactive ion etching, inductively coupled plasma deep silicon etching, laser ablation, or air abrasion techniques), rapid prototyping, etc.

Exemplary micropatterning processes are described in Luharuka R et al., "Improved manufacturability and characterization of a corrugated Parylene diaphragm pressure transducer," *J. Micromech. Microeng.* 2006; 16:1468-74; Yokoshima Y et al., "Micropattern formation for magnetic recording head using electroless CoFeB deposition," *J. Electrochem. Soc.* 2002; 149(8):C375-82; Lai Y et al., "Fabrication of patterned $CdS/TiO_2$ heterojunction by wettability template-assisted electrodeposition," *Mater. Lett.* 2010; 64(11):1309-12; and Schmuki P et al., "Selective electrodeposition of micropatterns on predefined surface defects on p-Si(100)," *J. Electrochem. Soc.* 2001; 148(3): C177-182, each of which is incorporated herein by reference in its entirety.

Further conditions for electrodeposition are described in U.S. Pat. No. 6,855,240; Liu X, "Electrodeposition of soft, high moment Co—Fe—Ni thin films," *J. Appl. Phys.* 2000; 87(9):5410-2; Liao S H, "High moment CoFe thin films by electrodeposition, "*IEEE Trans. Mag.* 1987; 23(5):2981-3; Liu X et al., "Electrodeposited Co—Fe and Co—Fe—Ni alloy films for magnetic recording write heads," *IEEE Trans. Mag.* 2000; 36(5):3479-81; Osaka T et al., "A high moment CoFe soft magnetic thin film prepared by electrodeposition," *Electrochem. Solid State Lett.* 2003; 6(4):C53-5; George J et al., "Oxide/hydroxide incorporation into electrodeposited CoFe alloys-consequences for magnetic soft ness," *Electrochim. Acta* 2013; 110:411-7; Shao I et al., "Stress in electrodeposited high moment CoFe films," *ECS Trans.* 2010; 25(34):35-43; Kakuno E M et al., "Structure, composition, and morphology of electrodeposited $Co_xFe_{1-x}$ alloys," *J. Electrochem. Soc.* 1997; 144(9):3222-6; Elhalawaty S et al., "Oxygen incorporation into electrodeposited CoFe films: consequences for structure and magnetic properties," *J. Electrochem. Soc.* 2011; 158(11):D641-6; Koza J A et al., "The effect of magnetic fields on the electrodeposition of CoFe alloys," *Magnetohydrodynamics* 2009; 45(2):259-66; Koza J A et al., "The effect of magnetic fields on the electrodeposition of CoFe alloys," *J. Magnetism Magnetic Mater.* 2009; 321:2265-8; Mishra A C, "Microstructure, magnetic and magnetoimpedance properties in electrodeposited NiFe/Cu and CoNiFe/Cu wire with thiourea additive in plating bath," *Physica B-Condensed Matter* 2012; 407(6): 923-34; Osaka T et al., "A high moment CoFe soft magnetic thin film prepared by electrodeposition," *Electrochem. Solid State Lett.* 2003; 6(4):C53-5; Sartale S D et al., "Electrochemical synthesis of nanocrystalline $CuFe_2O_4$ thin films from non-aqueous (ethylene glycol) medium." *Mater. Chem. Phys.* 2003; 80(1):120-8; Wang L et al., "Facile synthesis and electromagnetic wave absorption properties of magnetic carbon fiber coated with Fe—Co alloy by electroplating," *J. Alloys Compounds* 2011; 509(14):4726-30; and Zong B Y et al., "Ultrasoft and high magnetic moment NiFe film electrodeposited from a $Cu^{2+}$ contained solution," *IEEE Trans.*

*Magnet.* 2006; 42(10):2775-7, each of which is incorporated by reference herein in its entirety.

In other embodiments, the method includes sputter depositing a thin layer of a magnetostrictive material (e.g., a $Co_xFe_y$ material, such as any herein) through a shadow mask and sandwiching this layer between non-ferromagnetic electrodeposited metal layers for support. In yet other embodiments, the method includes bonding one or more magnetostrictive materials to a prefabricated surface (e.g., a silicon wafer), laser cutting the resonator array, and then releasing the structures via a sacrificial release layer etch.

Compared to other methods, there are numerous benefits for electrodeposition processes. For instance, electrodeposition allows for in situ patterning via photoresist mold processes; broad range of thickness are possible (e.g., from 1 μm to 1 mm), and order of magnitude faster deposition rate (as compared to sputtering); lower intrinsic material stress; and lower capital cost, as compared to sputtering.

The films can be characterized using any useful tests. The magnetostrictive material can be tested for any useful characteristic, e.g., magnetostriction, saturation magnetization, coercive field, temperature coefficient of expansion, Curie temperature, intrinsic stress, and electrical resistivity. Exemplary characteristics include magnetic characterization (e.g., by using SQUID magnetometry to determine the hysteresis curve), microstructure characterization (e.g., by using Energy Dispersive Spectroscopy (EDS), X-Ray Diffraction (XRD), Transmission Electron Microscopy (TEM), etc.), magnetostriction characterization (e.g., by using capacitance measurement for determination of magnetostriction), and/or functional characteristics (e.g., by using 3-axis Helmholtz coils and basic testing using a loop antenna and a transceiver circuit).

In addition, the temporal and structural stability of magnetic domains can be modeled with phase field modeling. Those domains exhibiting magnetostriction generally display complex structures that arise from various thermodynamic parameters. Computational models have been developed, which applies one or more macroscopic "order parameter" that varies in space (e.g., superconductivity, magnetism, etc.) and solves its evolution by a variational method. Such models are useful for understanding the coupling between new order parameters (e.g., magnetism with ferroelectricity, or species diffusion with elastic effects), as well as for simulating coarsening and domain dynamics. Exemplary computational models are described in Chen, "Phase-field models for microstructure evolution," *Annu. Rev. Mater. Res.* 2002; 32:113-40; and Zhang J X et al., "Phase-field microelasticity theory and micromagnetic simulations of domain structures in giant magnetostrictive materials," *Acta Materialia* 2005; 53:2845-55, each of which is incorporated by reference herein in its entirety.

Magnetoelastic Resonator Tags, and Methods of Coding and Decoding Such Tags

The resonator tags can be coded and decoded. Arndt and Kiesewetter proposed a magnetoelastic, multi-frequency tag capable of millions of different coded label combinations for conveying information that is far superior to a simple binary "on" or "off" (Arndt M et al., "Coded labels with amorphous magnetoelastic resonators," *IEEE Trans. Magn.* 2002; 38(5): 3374-6, which is incorporated herein by reference in its entirety). Unfortunately, this tag had to be hand assembled using large, Metglas® 2826 MB ($\lambda_{sat.}$=12 ppm) magnetostrictive alloy strips needing special custom mounting for mechanical support. The present invention includes the use of microfabricated tags.

Exemplary methods for coding and decoding tags are described in U.S. Pat. No. 6,018,297, which is incorporated herein by reference in its entirety.

The tags can be coded and then decoded by measuring the resonance frequency as a function of angle β. The frequency of the longitudinal vibration $f_r$ [Hz or $s^{-1}$] is determined by the following equation:

$$f_r = \frac{1}{2L}\left[\sqrt{\frac{\rho}{E_0} + \frac{9\lambda_{sat.}^2 \rho((|H_B|\cos(\beta)))^2}{J_S H_A^3}}\right]^{-1}, \quad \text{(Eq. 2)}$$

where L [m] is the length of the resonator, $E_0$ [Pa or $kg \cdot m^{-1} \cdot s^{-2}$] is the Young's modulus at zero field, ρ [$kg \cdot m^{-3}$] is the density, $H_A$ [$A \cdot m^{-1}$] is the anisotropy field, $J_s$ [T or $kg \cdot A^{-1} \cdot s^{-2}$] is the saturation polarization, $\lambda_{sat.}$ [ppm] is the saturation magnetostriction, $H_B$ [$A \cdot m^{-1}$] is the magnetic bias field vector, and β [°] is the angle between the resonator main axis and the magnetic bias field vector (H in FIG. 1A). As can be seen, Eq. 2 states that length L and orientation angle β subject to a rotating bias field vector can be determined from resonance frequency measurements. Accordingly, L and β can be used to code a label, and Eq. 2 can be used to decode response signals (i.e., resonance frequency measurements).

The presence of multiple resonator portions of varying lengths and magnetic bias angles β result in a multi-frequency signal that can be used as a coded tag with millions of possible code combinations or as a wireless sensor to detect any useful property, e.g., such as structural defects, mechanical stress, mechanical strain, temperature, pressure, pH, liquid viscosity and density, humidity, gas, and chem-bio agents, or any other described herein. The present resonators can be safely interrogated near high explosives and through barriers (e.g., enclosed or embedded structures), where RF tags cannot be used. These magnetic resonators could have high potential impact on various national security missions where radiation hardness, tamper resistance, immunity to long-range interrogation by adversaries, zero on-board power (passive), and uniqueness of codes are important.

Magnetoelastic Resonator Sensors

The present invention also relates to sensors employing a magnetoelastic resonator, e.g., a $Co_xFe_y$ film, such as any herein. The resonator can be a planar film with any useful geometry (e.g., including one or more resonator portions or, alternatively, including a planar, non-patterned layer). The $Co_xFe_y$ film can be located on top of a base structure or between two base structures, thereby forming a composite. The film can be deposited directly on a surface of the base structure. Alternatively, the film can be embedded within a matrix (e.g., an epoxy or polymer matrix), which in turn is in contact with at least a portion of the surface of the base structure. Thus, the sensor includes, at least, a magnetostrictive material (e.g., a $Co_xFe_y$ film) and a base structure. The sensor can have any useful form, such as a stack, a laminate structure, a monolithic structure, etc.

In use, when the base structure is strained or stressed, the film will respond to this external mechanical force by providing a change in magnetostriction, e.g., a change in displacement or saturation magnetostriction, as compared to the film lacking that strain or stress. This change can be detected by applying a magnetic field to the sensor and measuring its displacement at a particular magnetic field strength or as a function of various values of the magnetic field strength.

Signal Detection Systems and Telemetry Units

The resonator can be configured in any useful signal detection system, including those provided in telemetry units. The resonators herein including a magnetoelastic material respond to externally applied magnetic fields. Exposure of the resonators to a time-varying, externally applied magnetic interrogation signal (e.g., an AC magnetic interrogation signal) results in Joule magnetostriction, $\lambda=\Delta L/L$ (i.e., a physical deformation characterized by change in length $\Delta L$, where $\lambda_{sat.}$ is the value $\lambda$ at saturation). In addition, this exposure generates longitudinal vibrations, which in turn produces elastic waves that emit a magnetic response signal (e.g., an AC magnetic response signal). The emitted response signal can be detected in any useful way, e.g., by magnetic, acoustic, and/or optical systems. Conversely, exposure to an external mechanical stress or strain results in a change in magnetostriction, termed the Villari effect. Thus, a pristine surface and a structurally flawed surface exhibit different magnetostriction, $\lambda$, when exposed to an applied magnetic field.

Signal detection systems, including telemetry units, can include any useful components to provide and/or detect signals (e.g., interrogation signals and/or response signals). Exemplary components include an excitation circuit configured to provide one or more interrogation signals (e.g., including one or more of a frequency domain sine wave generator, a time domain pulse generator, an AC excitation circuit (e.g., including an input from a direct digital synthesis component, a potentiometer, and/or one or more amplifiers), and/or a DC excitation circuit (e.g., including a voltage source, a potentiometer, an inductor, and/or one or more amplifiers); an excitation coil to provide a magnetic interrogation signal (e.g., one or more of Helmholtz coils, pick-up coils, solenoid coils, AC coils, and/or DC coils, which can optionally also serve as the sensing coil); a bias coil to provide a rotating bias field (e.g., one or more of Helmholtz coils); one or more electronic switches (e.g., for use in combination with one coil capable of both providing an interrogation signal and receiving a response signal, where the electronic switch isolates excitation and receiving circuits); a permanent biasing magnet to achieve the optimal $\lambda_{sat.}$ operating point; a power supply (e.g., a supply to provide current to one or more coils); a multimeter; a laser emitter to detect magnetostriction of the resonator (e.g., a light-emitting diode or a laser that is aligned to reflect off of a surface of the resonator); a detector to detect one or more response signals (e.g., a microphone to detect an acoustic response signal, a sensing coil to detect a magnetic response signal (e.g., any coil described herein optionally in combination with a multiplexer), and/or a phototransistor to detect an optical response signal (e.g., optionally in combination with one or more mirrors, beam splitters, coarse sensors, fine sensors, piezoelectric translators, locked-in amplifiers, oscillators, and/or phase shifters); and/or a receiving circuit configured to process one or more response signals (e.g., including one or more of a microcontroller (e.g., to control any components described herein, such as one or more excitation circuits and one or more detectors), a multichannel analog-to-digital converter (ADC), a frequency domain lock in amplifier, a time domain digital oscilloscope, a network impedance analyzer, a phase detection circuit (e.g., including a comparator, an XOR gate, an ADC, and/or a filter), and/or an amplitude detection circuit (e.g., including on amplifier, an RMS-DC converter, and/or an ADC)).

Interrogation and response signals can be provided and detected in any useful format. In some embodiments, the signal detection system relies on a time-domain measurement technique, where the interrogation signal is a sinusoidal magnetic field impulse (e.g., using an excitation coil) and the response signal is a time-domain response that can be analyzed in any useful way. For example, the receiving circuit is configured to determine the resonance frequency by converting the response to a frequency spectrum and then identifying the peak in that spectrum (e.g., with a Fast Fourier Transform algorithm or with statistical fitting by a Poisson process) or by counting the number of oscillations for a given period (e.g., with frequency counting). In other embodiments, the signal detection system relies on a frequency-domain measurement technique, where the interrogation signal is a fixed-frequency, steady state signal, and the response signal is detected by sweeping a frequency range and by determining the frequency that provides the maximum amplitude signal. In yet another embodiment, the signal detection system relies on an impedance de-tuning method, where the resonator tag interacts with an inductive solenoid, and the response signal is the change in impedance of the solenoid measured as a function of frequency (e.g., by using a network impedance analyzer).

Exemplary systems and sensors, as well as method for coding, are described in U.S. Pat. Nos. 8,414,772; 8,276,451; 7,075,439; 6,417,771; 6,285,286; 6,232,879; 6,225,905; 6,218,944; 6,137,411; 6,018,297; 5,990,792; 5,969,610; 5,760,580; 5,739,752; 5,576,693; 5,557,085; 5,551,158; 5,317,223; 5,297,439; and 5,020,378; Tam A C et al., "A new high-precision optical technique to measure magnetostriction of a thin magnetic-film deposited on a substrate," *IEEE Trans. Magnet.* 1989; 25(3):2629-38; Zeng K F et al., "Time domain characterization of oscillating sensors: application of frequency counting to resonance frequency determination," *Rev. Sci. Inst.* 2002 December; 73:4375-80; Grimes C et al., "Wireless magnetoelastic resonance sensors: a critical review," *Sensors* 2002; 2:294-313; Tang J et al., "Miniaturized magnetoelastic tags using frame-suspended hexagonal resonators," 27th Int. Conf. on Microelectromechanical Systems, held on 26-30 Jan. 2014 in San Francisco, Calif., pp. 76-9; and Tang J et al., "Scalable, high-performance magnetoelastic tags using frame-suspended hexagonal resonators," *J. Micromech. Microeng.* 2014; 24:065006 (8 pp.), each of which is incorporated by reference in its entirety.

Uses

The present resonators can be used for any useful purpose. For instance, tags are critical technologies in treaty verification regimes to establish identity of items as accountable, maintain continuity of knowledge of the status of those items over time, and provide evidence of tampering. Such importance extends to the tracking of other high value assets such as radiological sources in commercial applications. Tagging technologies have been deployed, ranging from bar codes to radio-frequency devices, in varying degrees of sophistication. However, the unique needs and requirements of each situation necessitate a broader set of technology options that can satisfy multiple stakeholders such as the ability to provide identification through containers, in the vicinity of nuclear weapons, and in high radiation fields. The magnetomechanical nature of the resonator tags of the present invention can potentially address these needs.

Other uses include tagging in harsh environments (e.g., in water, in underground repositories, in the presence of shelving, or in the presence of high explosives), tagging of dangerous materials (e.g., nuclear materials through various stages of the nuclear fuel cycle, treaty monitored items in an Arms Control regime, and radiological sources in commercial applications), as well as any tagging of any materials requiring multiplexed coding and remote monitoring.

In yet other embodiments, any resonator herein can be employed as a sensor. For instance, magnetostrictive materials can be sensitive to physical defects or flaws, as well as mechanical stress or strain. A defect sensor can be formed, e.g., by placing a layer of a magnetostrictive material on a base structure or within a stack including that base structure. When that base structure has a defect, it will likely possess less mechanical rigidity. A magnetostrictive material (e.g., any herein, such as a CoFe material) in contact with such a flawed base structure will exhibit increased displacement, as compared to a pristine base structure, when exposed to the same applied magnetic field. Displacement may be measured in any useful manner, such as in a cantilever deflection method (see, e.g., Hunter D et al., *Nat. Commun.* 2011; 2: article 518 (7 pages) and du Trémolet de Lacheisserie E et al., "Magnetostriction and internal stresses in thin films: the cantilever method revisited," *J. Magn. Magnetic Mater.* 1994 September/136(1-2):189-96, each of which is incorporated herein by reference in its entirety).

MEMS Based Devices

The present invention relates to an electrodeposited material that is magnetostrictive. In particular embodiments, the material includes cobalt and iron (e.g., an alloy having of from about 70 to 80 at. % cobalt and about 20 to 30 at. % iron). Such materials are useful for many types of MEMS devices (e.g., tunable capacitors), and the present invention includes any magnetostrictive material described herein, as well as methods for their manufacture, for use in such MEMS devices.

In one embodiment, the device is a tunable microfabricated (e.g., MEMS) device. In one instance, the device includes a substrate; a stationary anchor disposed on the substrate; a stationary electrode disposed on the substrate; an actuation electrode (e.g., a stationary actuation electrode) disposed on the substrate and located between the stationary anchor and the stationary electrode; and a cantilever including an extended arm having a first end and a second end, where the first end is affixed to the stationary anchor, the second end is suspended over the stationary electrode, and a center portion of the extended arm is suspended over the actuation electrode; and where a top surface of the cantilever includes a layer of an electrodeposited material comprising cobalt and iron. Exemplary devices are provided in FIG. 9A-9C.

Figure 9A:
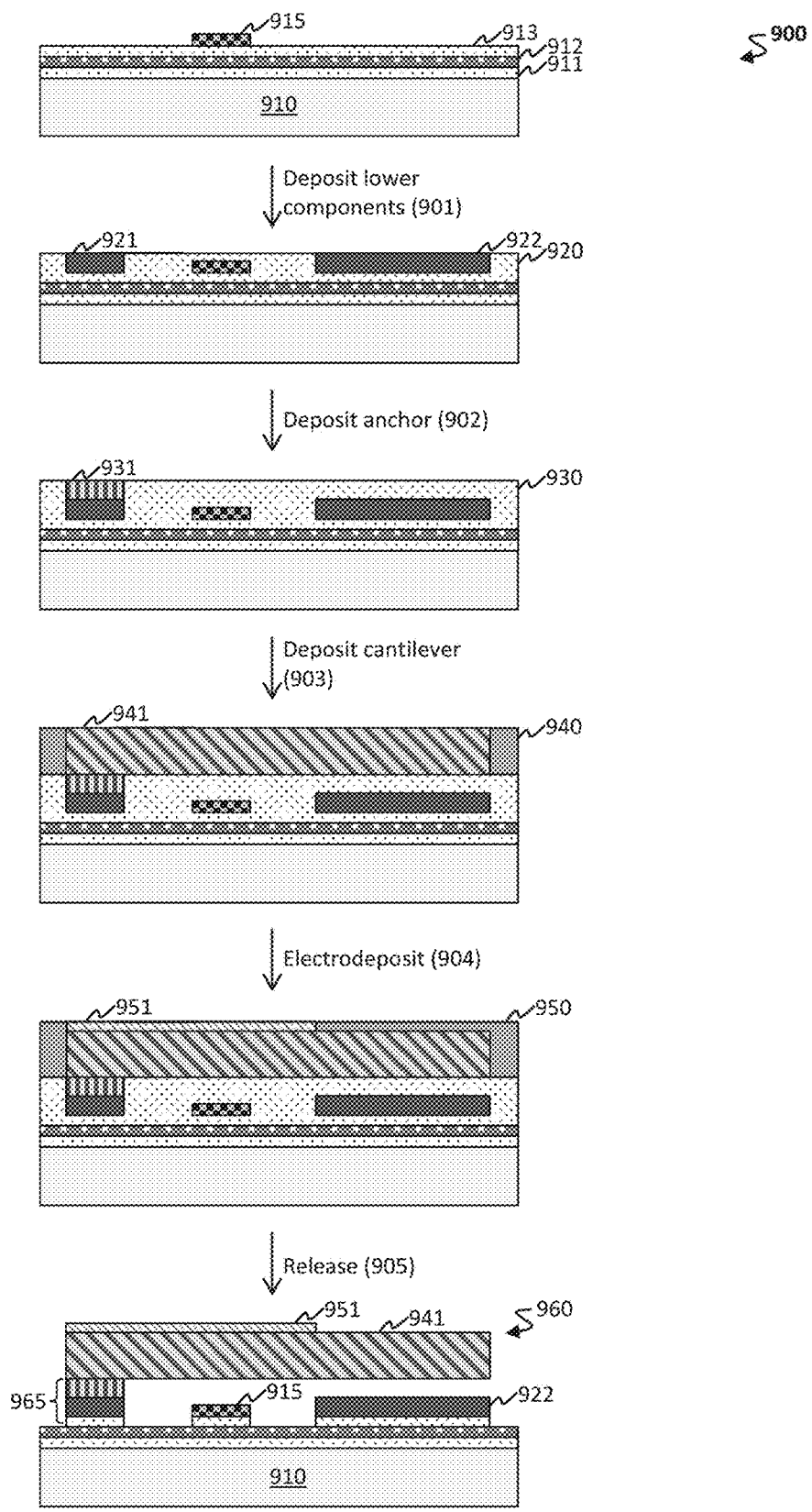
FIG. 9A-9D shows exemplary tunable microfabricated capacitors including an electrodeposited material. Provided are (A) an exemplary method 900 for forming a capacitor 960, as well as schematics of (B) an exemplary tunable capacitor 9000 having a cantilever 9041 and a stationary electrode 9022 forming a capacitive element, (C) another exemplary tunable capacitor 9100 having a movable electrode 9125 and a stationary electrode 9122 forming a capacitive element, and (D) yet another exemplary tunable capacitor 9200 having a movable actuation electrode 9216 and a stationary actuation electrode 9215.

The device can be manufactured in any useful manner. FIG. 9A shows an exemplary method 900 for fabricating a tunable device including an electrodeposited layer (e.g., composed of a material having magnetostrictive properties, such as any cobalt- and iron-containing material or alloy described herein). The method 900 includes providing a stack including a substrate 910 and one or more dielectric layers 911,912,913. Any useful dielectric layers can be included. On a top surface of one dielectric layer, a stationary actuation electrode 915 can be patterned.

The stack can be fabricated in any useful manner. In one instance, the stack is formed by depositing a first dielectric layer 911 (e.g., a silicon dioxide layer) on a top surface of a substrate 910 (e.g., a silicon substrate). Then, a second dielectric layer 912 (e.g., a silicon nitride layer) and a final dielectric layer 913 (e.g., a silicon dioxide layer, and which can optionally serve as a sacrificial layer) are deposited. In another instance, the stack includes one or two dielectric layers.

A stationary actuation electrode can be formed in any useful manner. In one instance, a layer of photoresist is deposited on the stack, and then a mask having a desired pattern for the stationary actuation electrode is aligned on the photoresist layer and then exposed to form the pattern. One or more deposition steps (e.g., by way of electron beam evaporation) can be applied to form the stationary actuation electrode 915. The photoresist layer can then be removed, and, optionally, one or more deposition steps can be conducted to provide a seed layer.

Next, further lower metal components are deposited 901, including an anchor portion 921 and a stationary electrode 922 surrounded by a further dielectric layer 920. In one instance, this deposition step 901 can include depositing a dielectric to form a further dielectric layer 920 (e.g., a silicon dioxide layer deposited by way of vapor deposition), spinning a photoresist layer on the dielectric layer, as well as micropatterning of regions that define the anchor portion and the stationary electrode in the photoresist layer. The dielectric layer can be etched (e.g., down to the seed layer) to open up the areas for the anchor portion and the stationary electrode. Then, electroplating of a material (e.g., one or more conductive materials) within that opened area provides the formed anchor portion 921 and the stationary electrode 922. Optionally, one or more polishing steps can be conducted to planarize the electroplated components to the dielectric surface. For instance, FIG. 9A provides a stack having electroplated components 921,922 that are planarized to the surface of the dielectric layer 920.

Then, a further pedestal portion 931 is deposited 902. In particular embodiments, the anchor portion and the pedestal portion, together, form the anchor for the cantilever. In one instance, this deposition step 902 can include depositing a dielectric to form another dielectric layer 930, spinning a photoresist layer on the dielectric layer, as well as micropatterning and exposing of the region or pattern for the pedestal portion in the photoresist layer. One or more deposition steps (e.g., by way of electron beam evaporation) can be applied to form the pedestal portion 931. The photoresist layer can then be removed (e.g., by way of one or more polishing steps to planarize the deposited components to the dielectric surface), and, optionally, one or more deposition steps can be conducted to provide a seed layer.

The cantilever can be patterned and disposed on a stationary anchor (e.g., including an anchor portion and the pedestal portion). In one instance, the method includes depositing 903 a cantilever 941 that is connected to the stationary anchor. In one instance, this deposition step 903 can include spinning a photoresist layer on the stack, as well as micropatterning and exposing of the cantilever pattern in a photoresist layer. One or more deposition steps (e.g., by way of electron beam evaporation) can be applied to form the cantilever 941. The photoresist layer can then be removed (e.g., by way of one or more polishing steps to planarize the electroplated components to the dielectric surface).

The electrodeposited material including cobalt and iron can be provided in any useful manner. In one instance, the electrodeposited material is provided on a top surface of the cantilever, thereby providing an actuation element that is connected to the movable cantilever. In one instance, the method includes spinning a photoresist layer 950, exposing a region of a top surface of the cantilever, and then electrodepositing 904 the electrodeposited material 951 in the region on that top surface of the cantilever. The electrodeposited material can be provided along the entire length of the cantilever or along a portion of the length of the cantilever. Furthermore, the electrodeposited material can be provided on any surface (e.g., a top surface of the cantilever or a portion of this top surface).

Finally, one or more photoresist layers and/or dielectric layers can be etched to release 905 the tunable device 960. The device 960 can include any useful arrangement of components, including a substrate 910, a stationary anchor 965 disposed on the substrate 910 and optionally including a portion of a dielectric layer, and a cantilever 941. The cantilever 941 can include an extended arm having a first end that is affixed to the stationary anchor 965. The second end of the cantilever can be configured to move in any useful direction.

The device can include any useful further components, including stationary components (e.g., disposed on the substrate) and movable component (e.g., disposed on the cantilever). For instance, the device can include a stationary actuation electrode 915 disposed on the substrate 910 and optionally including a portion of a dielectric layer, as well as a stationary electrode 922 disposed on the substrate 910 and optionally including a portion of a dielectric layer. The stationary actuation electrode 915 can be located between the stationary anchor 965 and the first stationary electrode 922.

Figure 9B:
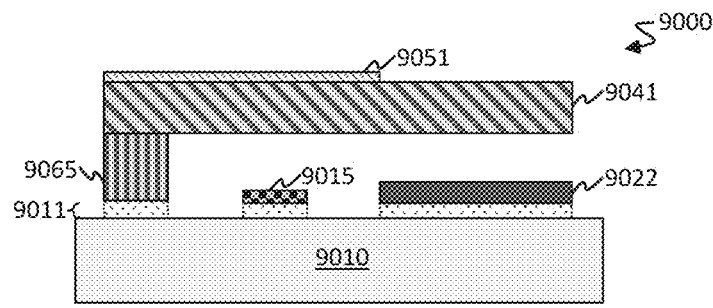
Figure 9C:
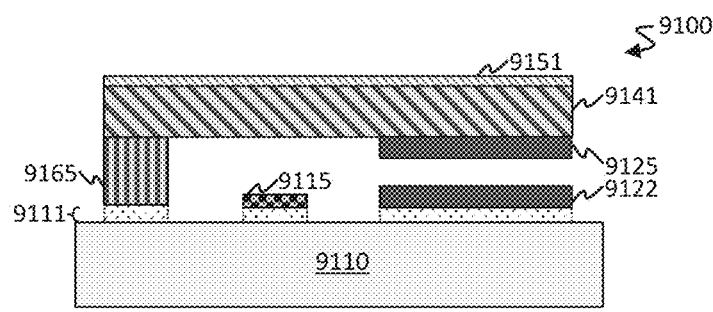
Figure 9D:
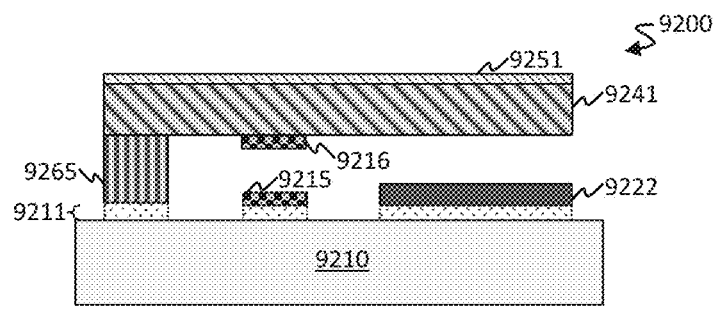

Other structures for tunable devices are provided in FIG. 9B-9D. In FIG. 9B, the device 9000 includes a stationary anchor 9065 disposed on a substrate 9010 and optionally including a dielectric layer 9011, as well as a cantilever 9041 having a first end affixed to the anchor 9065. The cantilever 9041 also supports a layer of an electrodeposited material 9051 having a magnetostrictive property. Additional electrodes include a stationary actuation electrode 9015 and a stationary electrode 9022, each of which is disposed on the substrate 9010. The stationary actuation electrode 9015 can be located in any useful location, such as between the stationary anchor 9065 and the first stationary electrode 9022. The anchor, including anchor portions and pedestal portions, can be formed of any useful material, e.g., a conductive material (e.g., any herein), a dielectric (e.g., any herein), as well as layers, laminates, or multilayers thereof.

In FIG. 9C, the device 9100 includes a stationary anchor 9165 disposed on a substrate 9110 and optionally including a dielectric layer 9111, as well as a cantilever 9141 having a first end affixed to the anchor 9165. The cantilever 9141 also supports a layer of an electrodeposited material 9151 having a magnetostrictive property. Additional electrodes include a stationary actuation electrode 9115, a stationary electrode 9122, and a movable electrode 9125. Each of these electrodes is disposed on the substrate 9010 or on the cantilever 9141. The movable electrode 9125 and the stationary electrode 9122 can be aligned (e.g., along a major plane of a conductive plate electrode for each of the movable and stationary electrodes) to provide a capacitive signal.

In FIG. 9D, the device 9200 includes a stationary anchor 9265 disposed on a substrate 9210 and optionally including a dielectric layer 9211, as well as a cantilever 9241 having a first end affixed to the anchor 9265. The cantilever 9241 also supports a layer of an electrodeposited material 9251 having a magnetostrictive property. Additional electrodes include a stationary actuation electrode 9215, a movable actuation electrode 9216, and a stationary electrode 9222. Each of these electrodes is disposed on the substrate 9210 or on the cantilever 9241. The stationary actuation electrode 9215 and the movable actuation electrode 9216 can be aligned to maximize an electric field between these electrodes.

In some embodiments, the cantilever includes a conductive material (e.g., an ohmic material, a metal, etc.), thereby forming a capacitive element between a portion of the second end of the cantilever and the stationary electrode. For instance, for the device 960 in FIG. 9A, the cantilever 941 can be composed of a conductive metal, which is positioned across from a stationary electrode 922 and separated by a gap. Exemplary, non-limiting conductive materials include a metal (e.g., silver, gold, aluminum, nickel, chromium, titanium, copper, as well as alloys and multilayers thereof).

In other embodiments, the cantilever includes a first movable electrode located in proximity to the second end of the cantilever, thereby forming a capacitive element between the first movable electrode and the stationary electrode. For instance, for the device 9100 in FIG. 9C, the cantilever 9141 can include a first movable electrode 9125, which is positioned across from a stationary electrode 9122 and separated by a gap.

In yet other embodiments, the cantilever includes any other useful electrical element. For instance, for the device 9200 in FIG. 9D, the cantilever 9241 can include a movable actuation electrode 9216, which is positioned across from a stationary actuation electrode 9215.

The cantilever can be configured to move in any useful direction (e.g., a horizontal direction or a vertical direction). Furthermore, the electrodeposited material (e.g., including cobalt and iron) can be any described herein. Finally, one or more dielectric layers can be present to electrically isolate any element (e.g., conductive elements, including one or more electrode(s) and the cantilever). Exemplary, non-limiting dielectric materials include a silicon oxide (e.g., $SiO_2$), silicon nitride (e.g., $Si_3N_4$), air, hafnium oxide, zirconium oxide, aluminum oxide, or a polymer.

The present invention also includes methods of making operating a tunable device. In one instance, the method of operating the tunable device includes applying a voltage signal to a stationary actuation electrode (e.g., applying a voltage difference between the stationary actuation electrode and a portion of the cantilever; or between the stationary actuation electrode and the movable actuation electrode disposed on a portion of the cantilever) and measuring a capacitance value at a stationary electrode (e.g., between a portion of the cantilever and a stationary electrode; or between a movable electrode disposed at an end of the cantilever and a stationary electrode). The method can further include exposing the device to a magnetic field, thereby altering a material strain of the electrodeposited material. In further embodiments, the alteration in material strain further alters the capacitance value, thereby providing a tunable capacitive element.

In some embodiments, the tunable device includes a tunable capacitor, a tunable filter, an oscillator, or a tunable switch. Further useful materials, uses, devices, and method of making and operating tunable devices are described in U.S. Pat. Nos. 7,345,866, 7,933,112, and 8,570,705, as well as U.S. Pat. Pub. Nos. 2004/0150939 and 2011/0038093, each of which is incorporated herein by reference in its entirety.

EXAMPLES

Example 1: Magnetoelastic Smart Sensors for Pressure, Temperature, and pH Detection We propose the development of wireless, zero power, radiation hard magnetoelastic or magnetostrictive resonant smart sensors that can detect variations in temperature, pressure and pH as well as provide information for identification and authentication of the article in question, i.e., "smart." These smart sensors can convey frequency information remotely by near field magnetic interrogation, as opposed to RF. The detected frequency is directly dependent on resonator geometry. Our proposed solution is to employ patterned electrochemical deposition (ECD) of cobalt iron (CoFe) alloy films that have demonstrated giant magnetostriction, i.e., a large change in material shape while under the influence of an applied magnetic field, through other deposition means. Sputter deposited CoFe has demonstrated giant magnetostriction, i.e., a large change in material shape while under the influence of an applied magnetic field, however this deposition method is not practical to realize the device geometries we propose.

Smart sensor arrays can be tuned to specific changes in the environment in which they are employed to monitor their status via this low cost fabrication method. They may be safely interrogated near high explosives and through certain metal barriers and aqueous environments where RF tags cannot be used.

Figure 3A:
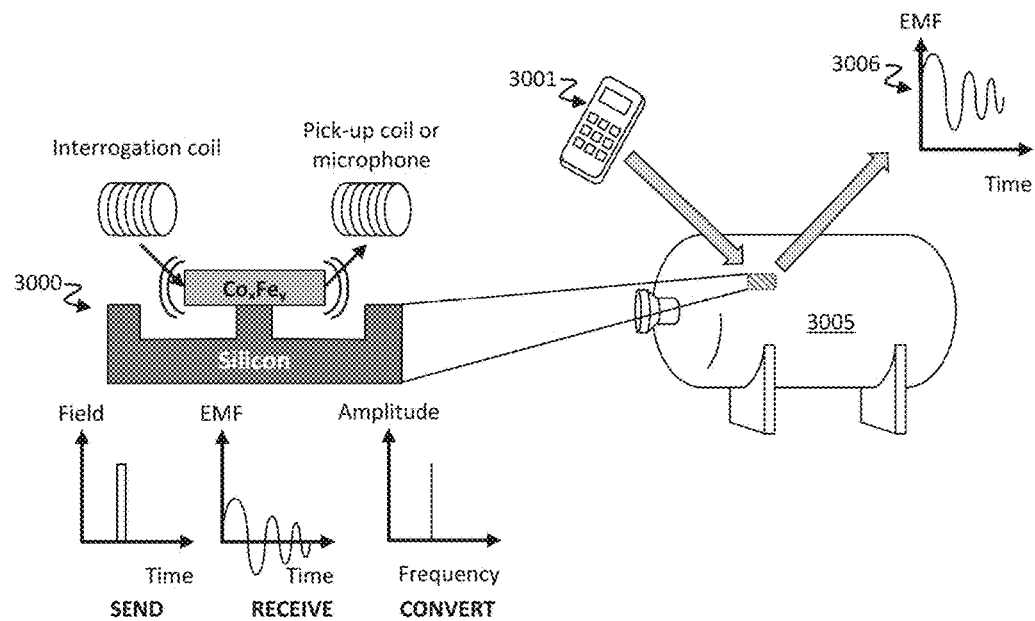
FIG. 3A-3B shows schematics of an exemplary resonator in use and an exemplary signal detection system. (A) Left: A wireless, zero power $Co_xFe_y$ sensor 3000 supported by a silicon post serves as the resonator tag. An interrogation coil sends a magnetic pulse to the tag or sensor, and a pick-up coil (or microphone) receives the emitted signal from the mechanical ring down. Right: In use, a pressure vessel 3005 with a $Co_xFe_y$ sensor 3000 is interrogated with a hand-held unit 3001, thereby emitting a response signal 3006. (B) A wireless $Co_xFe_y$ sensor 3010 can also serve as a defect sensor embedded in an aircraft 3015.

Magnetostrictive/Magnetoelastic Resonator Operation:

As shown in FIG. 3A, a near field, AC magnetic field signal is applied via a loop antenna coil to thin rectangular strips of magnetostrictive sensor 3000. This field signal can induce longitudinal mode vibrations in the magnetostrictive material that, in turn, emit their own oscillating magnetic field generated from the resonator mechanical ring down. The field signal can be transmitted by a hand held unit 3001 to the pressure vessel 3005 having the sensor 3000.

The emitted signal 3006 can be wirelessly detected by another pickup coil, a microphone, or by the same coil switched from a transmitting to a receiving circuit. Due to their magnetomechanical nature, on board power isn't needed, allowing these devices to be operated without batteries and enabling long lifetimes. Small changes in resonator geometry and magnetic biasing field allow for architectures capable of detecting many environmental parameters, such as temperature, pressure, and caustic environments (see, e.g., Grimes C A et al., "Theory, instrumentation and applications of magnetoelastic resonance sensors: a review," *Sensors* (*Basel*) 2011; 11(3):2809-44).

Differentiating Technical Approach:

Hunter et al. has demonstrated a 250 ppm magnetostrictive CoFe alloy via sputter deposition (Hunter D et al., *Nat. Commun.* 2011; 2: article 518 (7 pages)). While a significant step forward, sputter deposition is limited to film thicknesses on the order of a few microns limiting its applicability for sensors. Additionally the casting process in which commercially available magnetostrictive materials are fabricated limit the minimum feature size in which these materials can be machined and must be hand assembled for applications.

Our proposed ECD process would be capable of depositing thick (more than about 10 µm) CoFe films, targeting giant magnetostriction values of 100 ppm or greater, while being with traditional semiconductor processing techniques leading to high throughput and low cost.

Temperature and Pressure:

Temperature changes can be correlated to frequency changes in longitudinal mode vibrations. Pressure measurements are more challenging as longitudinal mode resonators are inherently immune to changes in pressure. However, by exploiting intrinsic stress in multilayered structures we can create resonators that will bend out of plane to take advantage of lateral vibration modes making them more sensitive to changes in ambient pressure. As the pressure increases or decreases, the resonance frequency of these modes will shift to higher or lower values that can be tracked and correlated to pressure.

pH:

Detection of pH or, alternatively, specific chemical constituents in the environment can be accomplished through multiple pathways. One way is through functionalized coatings on top of the resonators that absorb specific molecules that will increase the resonator mass and its natural frequency. An alternative approach is to coat the resonators with materials that are easily etched or removed by the corrosive action of particular chemicals, thereby increasing the resonance frequency.

The present invention relates to a first-of-its-kind ECD CoFe magnetostrictive alloy process. Released CoFe cantilever structures can be used to study the material's magnetomechanical properties and determine the degree of magnetostriction. Finally, resonator arrays with variable geometries can be fabricated and measured with regards to their frequency response.

Example 2: Electrodeposition Process for CoFe Magnetostrictive Resonators

We have developed a stable chemistry and process to electrodeposit an alloy film of cobalt and iron ($Co_xFe_y$) for use as a smart tag and sensor. Various strategies were employed to develop the chemistry (e.g., chemical reagents and composition of the plating bath) and deposition process (e.g., plating condition) that provided a film with a 70-80 atomic % (at. %) cobalt stoichiometry, which was optimal for magnetostrictive properties. Furthermore, these strategies minimized the inclusion of oxygen, controlled the phase of the alloy to improve the magnetostrictive properties, and increased the signal amplitude for magnetic resonance response.

Regarding the chemistry development, we chose particular chemical reagents and additives to control film properties. First, we selected cation sources and concentrations to achieve the desired stoichiometries and speciation. Second, we included oxygen scavengers to prevent the oxidation of iron and the incorporation of ferric hydroxide and oxygen into the films. Third, we implemented grain refiners and surfactants in order to control film properties.

Regarding the deposition process, we optimized plating parameters to achieve the desired stoichiometry and phase that are favorable for high magnetostrictive films. In particular, these parameters include chemistry composition (e.g., chemical reagents with one or more additives), pH (e.g., less than about 4, such as about 2), temperature (e.g., more than about 25° C., such as about 50° C.), current density (e.g., more than about 30 mA/cm$^2$, such as about 40 mA/cm$^2$), pulsing time durations (e.g., such as a duty cycle having an "on" and "off" phase that is each more than 1 second), agitation (e.g., of from about 100 to 500 rpm), and use of constant gas flow (e.g., constant bubbling of an inert gas, such as $N_2$). Additional details follow.

Chemical Reagents:

An iron tetrafluoroborate and cobalt sulfamate chemistry was chosen due to their stability and high stoichiometric ratio of cobalt. Various conditions were tested to study the diffusion and kinetics of CoFe deposition. These conditions included (i) iron tetrafluoroborate.$6H_2O$ (0.11 M), cobalt sulfamate (0.29 M), sodium citrate (0.5 M), and boric acid (0.5 M) (Co—Fe condition); (ii) iron tetrafluoroborate.$6H_2O$ (0.11 M), sodium citrate (0.5 M), and boric acid (0.5 M) (Fe only condition); (iii) cobalt sulfamate (0.29 M), sodium citrate (0.5 M), and boric acid (0.5 M) (Co only condition); and (iv) sodium citrate (0.5 M) and boric acid (0.5 M) (supporting electrolyte condition). All reagents were purged with $N_2$ before use for 30 minutes and maintained under $N_2$ while in use to minimize oxygen absorption that can be deposited into the alloy.

Electrochemical Studies:

Mass transfer studies were conducted with linear potential sweeps by sweeping potential cathodically at different rotation speeds of the rotating disk electrode. The mass transfer limited current was plotted versus the square root of the rotation speed to determine the diffusion coefficient, as derived from the Levich equation:

$$i_L = 0.620 \, nFD_0^{2/3} \omega^{1/2} \nu^{-1/6} C_0 \quad \text{(Eq. 3)},$$

where $i_L$ [A] is the Levich current, n [mol$^{-1}$] is the number of transferred electrons in the half reaction, F [C mol$^{-1}$] is Faraday constant, $D_0$ [cm$^2$ s$^{-1}$] is the diffusion coefficient, $\omega$ [rad s$^{-1}$] is the angular rotation rate of the electrode, $\nu$ [cm$^2$ s$^{-1}$] is the kinematic viscosity, and $C_0$ [mol cm$^{-3}$] is the analyte concentration. The diffusion layer thickness can be calculated from the diffusion coefficient and the relaxation time to restore the interfacial concentrations and diffusion layer thickness during "off" time in a pulsed deposition.

Deposition kinetic studies were conducted with cyclic voltammetry (CV) by sweeping the potential anodically and cathodically while recording the current. Scan rates were varied to calculate diffusion coefficient. In addition, kinetically controlled current and mass transfer limited current values were identified in order to calculate plating parameters. In particular, experiments with Fe only conditions provided an expected reduction peak, as understood using standard reduction potentials. In contrast, experiments with Co only conditions provided a shifted peak, indicating that a more cathodic potential would be required. These studies identified potentials for metal deposition, which in turn were helpful in designing a pulse regime that would incorporate more cobalt into the alloy.

Hull cell samples were tested with energy-dispersive X-ray spectroscopy (EDAX) to evaluate the stoichiometric ratio (x and y) of Co to Fe over a range of current densities. In one non-limiting example, hull cell samples were prepared using a 1 A current on brass substrates with a Cu counter electrode and under various agitation conditions (i.e., no agitation, 100 rpm, or 250 rpm). EDAX analysis provided atomic composition as a function of current density, which was further employed to formulate the plating parameters for different alloys.

In one set of experiments, agitation improved the appearance of the films and had a higher Co concentration at lower current densities. Based on hull cell testing, a pulsing regime using a current density of about 40 mA/cm$^2$ provided an appropriate at. % of Co of more than about 60 at. %. Based on these results, a current density of ≥40 mA/cm$^2$ was further evaluated to increase atomic % of cobalt to about 70 at. %, thereby providing a film with improved magnetostriction.

Stress analysis tests were also conducted. Samples were plated on Cu "tuning" forks designed for stress testing to evaluate the compressive or tensile stress in deposited films. In some of the films, the highest stress was measured at 30 mA/cm$^2$. Based on these stress measurement, as there is only a 1 cm separation on the fork tines at highest stress, this separation should not interfere with magnetic measurements.

Additives:

Additives were included to obtain a metallic film. For instance, while stoichiometry was controlled using the reagents and deposition parameters herein, the obtained films were not metallic. Thus, while the desired stoichiometry was obtained (e.g., 70 at. % of Co), the films were highly oxidized and powdery. To improve magnetostriction, the oxidation of $Fe^{2+}$ and the inclusion of oxygen were inhibited. In particular, two types of oxygen scavengers were employed to decrease or minimize Fe oxidation: ascorbic acid and trimethylamine borane (TMAB).

Figure 5:
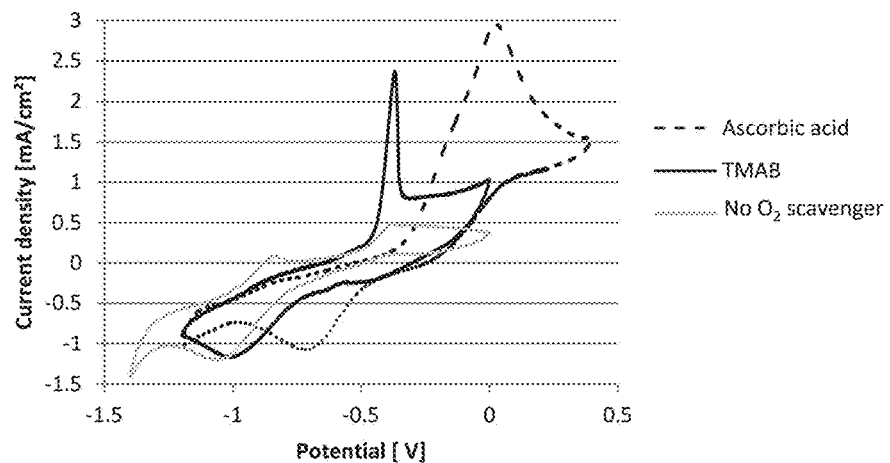
FIG. 5 shows cyclic voltammetry (CV) data for $Co_xFe_y$ films with or without oxygen ($O_2$) scavengers for CV scans at 10 mV/sec.

As shown in FIG. 5, films with either TMAB or ascorbic acid displayed less Fe oxidation, as compared to a control film lacking an oxygen scavenger. In particular, TMAB provided an optimal film with a sharp oxidation peak that is more cathodic than the ascorbic acid. In some embodiments, two or more oxygen scavengers (e.g., TMAB and ascorbic acid) can be employed in the plating solution.

Other additives were considered, such as a grain refiner and a surfactant. For instance, a grain refiner can be employed to control the morphology or grain size in the film (e.g., by reducing stress during deposition). In yet another instance, a surfactant can be employed to control pitting in the film.

Optimized Conditions:

The following are two different chemical conditions (i.e., Condition A and B), which are provided as non-limiting examples. Normally, iron-based chemistries have very short shelf lives (e.g., from hours to days) before the formation of precipitates, which diminishes bath performance. Both Conditions A and B encompass highly stable chemistries with shelf lives of over 2 months. These conditions are described below.

For Condition A, the following chemical process was employed. The plating bath was initially composed of deionized water maintained at a temperature of about 50° C. under stir bar agitation at about 250 rpm. Throughout the deposition process, an $N_2$ bubbler was inserted and maintained in the bath. The following agents were added in the following order: 0.5 M boric acid (an electrolyte); 0.05 M ascorbic acid (an oxygen scavenger); 0.05-0.1 M saccharin sodium salt (a grain refiner); 0.1 M trimethylamine borane (TMAB) (an oxygen scavenger); 0.4 M cobaltous sulfamate (a cobalt source); 0.01 M sorbitol; and about 10 drops of APY-17 (a surfactant) per 400 ml volume. Next, the pH was adjusted to about 2.0 using fluoroboric acid. Finally, 0.08 M iron tetrafluoroborate (an iron source) was added.

For Condition B, the chemical process was similar to that of Condition A, except for the following changes. First, the pH was adjusted to about 2.0 using a 5 vol. % $H_2SO_4$ solution. Second, a different iron source, i.e., 0.08 M ammonium ferrous sulfate, was added to the bath.

Both Conditions A and B were stable (e.g., having a shelf life of over 2 months) and provided metallic films. In addition, both conditions provided films having low oxygen content (e.g., less than about 8 at. % oxygen after EDS analysis). Using the conditions as described herein, the films obtained from Condition B (employing ammonium ferrous sulfate) provided films having higher magnetostrictive behavior, as compared to films obtained from Condition A (employing ferrous tetrafluoroborate as the iron source). Without wishing to be limited by mechanism, the change in the iron source likely changes the phase structure present in the final film, which in turn impacts magnetic properties. A skilled artisan would understand how the conditions described herein (e.g., Conditions A and B) can be modified to obtain films with the appropriate morphology, magnetostrictive behavior, and surface properties.

For both Conditions A and B, the following deposition process was employed. All reagents were sparged using a $N_2$ bubbler for 30 minutes prior to use. In addition, the chemical reagents and bath were maintained under a bed of $N_2$ using the bubbler inserted in the top layer of the plating bath during deposition. During plating, temperature was maintained at about 50° C., and agitation was maintained at about 250 rpm. Plating was performed using a galvanostatic pulse. The "on" portion of the cycle was a cathodic 40 mA/cm$^2$ sweep applied for 2-3 seconds, and the "off" portion was a 0 mA/cm$^2$ current density applied for 3 seconds.

The duration of the "on" and "off" cycles affected the film stoichiometry. For instance, by varying the "on" time between 2-3 seconds, we tailored the stoichiometric ratio of cobalt in the films. The longer the pulse time, the greater percentage of cobalt because deposition of iron is mass transfer limited. In some embodiments, the cobalt percentage can be from about 70 at. % to 80 at. %, and this range demonstrated high magnetostrictive properties in our testing. With a set "off" time of about 3 seconds, the oxygen scavengers can reduce any formed $Fe(OH)_3$ in the bath, and the concentrations at the interface can be restored to bulk concentrations.

The number of cycles can be used to control the film thickness. At 220 cycles, the film thickness was approximately 10 μm, and this thickness can be scaled accordingly with a current efficiency of approximately 98%.

Various plating parameters may be further optimized. For instance, the deposition current and pulsing regime could be altered to adjust the deposition kinetics for a chosen molar ratio of the iron and cobalt sources. In addition, the plating temperature can include a range in which the chosen chemistry can operate. Generally, the composition will change as the temperature changes. For the conditions herein, the composition was approximately constant within a range of 45° C. to 55° C. The order of adding the reagents should ensure proper speciation (or complexation), while avoiding precipitate formation. Finally, pH will also affect chemistry, deposition kinetics, and effective concentration of the proper species. Thus, pH should be chosen to provide the appropriate resulting phase, stoichiometry, and stress of the deposit. A skilled artisan would understand how these parameters could be optimized, tested, and employed to form a desired film.

Accordingly, the chemistry and deposition process described herein can be combined with one or more micropatterning methods to provide a micropatterned resonator having enhanced magnetostriction and multi-frequency signals.

Example 3: Magnetic Characterization of CoFe Magnetostrictive Films

The $Co_xFe_y$ films were prepared, as described in Example 2, and characterized, as described below. Films were either deposited with pulsed current ("Pulsed") or direct current ("DC"). Reagents included iron tetrafluoroborate ("IT") or ammonium ferrous sulfate ("AFS") as the iron source, as described above in Example 2. Magnetization curves were obtained via SQUID for various samples (Table 1).

TABLE 1

| | Magnetization curves | | |
|---|---|---|---|
| No. | Sample | $M_{sat}$ (A/m × 10$^6$) | Coercivity (A/m) |
| Control | Metglas® 2605SA1 | 1.07 | 813 |
| 1 | $Co_{67}Fe_{33}$ (DC, IT) | 0.193 | 13930 |
| 2 | $Co_{68.2}Fe_{31.8}$ (DC, IT) | 0.152 | 12210 |
| 3 | $Co_{80.8}Fe_{19.2}$ (Pulsed, IT) | 0.893 | 2893 |
| 4 | $Co_{64.9}Fe_{35.1}$ (Pulsed, AFS) | 2.05 | 468 |
| 5 | $Co_{77}Fe_{23}$ (DC, AFS) | 2.00 | 2377 |
| 6 | $Co_{80.6}Fe_{19.4}$ (Pulsed, AFS) | 1.61 | 2884 |

* For the $Co_xFe_y$ films, stoichiometric ratios x:y are provided as subscripts.

As seen in Table 1, electroplated samples employing ammonium ferrous sulfate (AFS) possessed higher magnetization values $M_{sat}$. In particular, samples 4-6 possessed enhanced magnetization properties as compared to commercially available material, Metglas® 2650SA1 (a magnetic alloy including 1-5 wt. % boron, 85-95 wt. % iron, and 5-10 wt. % silicon).

Samples were also tested by measuring displacement of the film upon being exposed to a 0.124 T magnetic field from a solenoid. Metglas® samples, with a known magnetostriction of λ=27 ppm, were used as a baseline for magnetic field testing. Solenoid testing of Metglas® provided a displacement of 0.390±0.051 cm. Magnetostrictive materials can be characterized by a magnetostriction constant λ, which is the strain measured in the direction of the magnetization field as the material passes from the demagnetized state to the saturation. A greater λ value indicates a greater change in dimension when exposed to a magnetic field.

Figure 6:
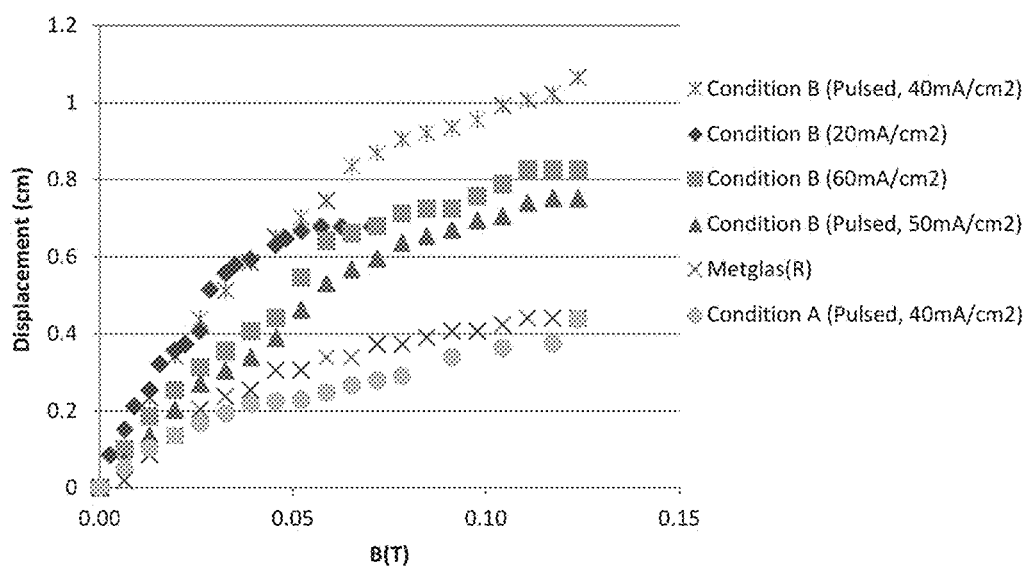
FIG. 6 shows magnetic testing for $Co_xFe_y$ films under various conditions, as described herein. Metglas® data are provided as control. Without wishing to be limited by this example, a sample formed using Condition B, described herein, and a pulsed deposition step (an "on" step of 40 mA/cm² for 3 seconds and an "off" step of 0 mA/cm² for 3 seconds at 220 cycles) provided an approximately 10 µm thick film having improved magnetostriction, as evidenced by a high displacement.
Figure 7:
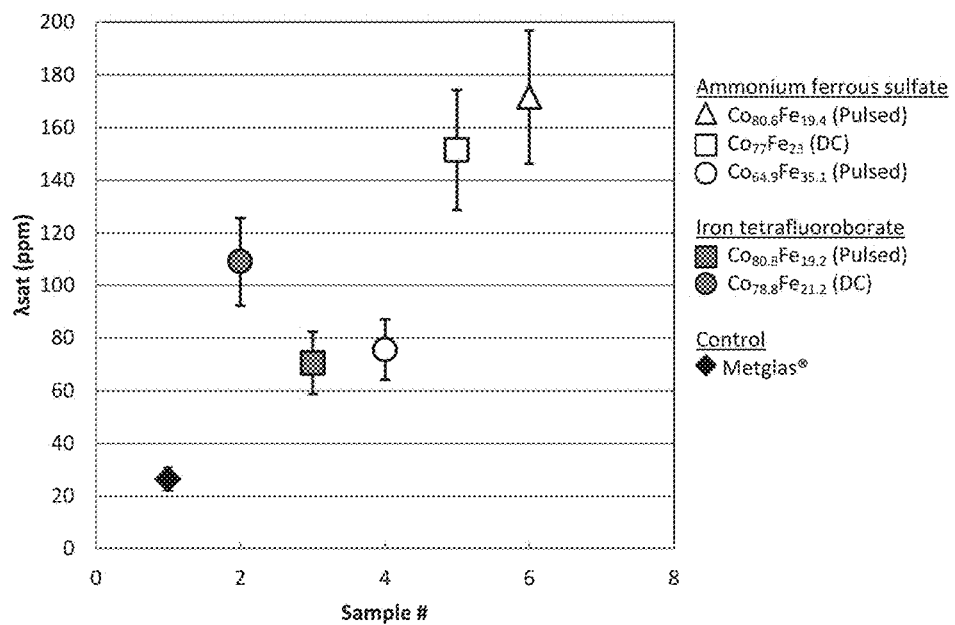
FIG. 7 shows $\lambda_{sat.}$ values for various $Co_xFe_y$ film samples formed using the methods described herein. Metglas® data are provided as control and show $\lambda_{sat.}$ is about at 26±4 ppm within range of manufacturer's specified $\lambda_{sat.}$ of 27 ppm. As can be seen, the highest recorded $\lambda_{sat.}$ for the electrodeposited $Co_xFe_y$ films measured at 172±25 ppm.

Displacement data and λ values were obtained. FIG. 6 provides displacement data for various samples prepared with Condition A or B, as indicated in the legend. FIG. 7 provides $\lambda_{sat.}$ values for $Co_xFe_y$ films prepared with Condition A (using iron tetrafluoroborate) or Condition B (using ammonium ferrous sulfate). Metglas® is provided as control. These data show the enhanced magnetic properties of the materials prepared by the methods herein. In particular, such displacement and $\lambda_{sat.}$ values were obtained prior to any post-deposition step, such as annealing or quenching. The highest recorded $\lambda_{sat.}$ for electrodeposited films was measured at 172±25 ppm (FIG. 7, data for $Co_{80.6}Fe_{19.4}$), which is at least two times better than that provided in Hunter et al., Nat. Commun. 2011; 2: article 518, for an as-deposited sputtered film (i.e., 84±5 ppm).

Example 4: Deeply Embedded Magnetoelastic Smart Sensors

The $Co_xFe_y$ films herein can be employed for any useful purpose. For instance, such films are detectable by magnetic fields and are sensitive to externally applied mechanical stress or strain. A magnetostrictive material provides a detectable response when exposed to a magnetic field, as described herein. Conversely, such a material also provides a response when exposed to a stress or a strain. When such a mechanical stress or strain is applied to the magnetostrictive material in the presence of an established magnetic field, this strain causes a magnetic flux change that is detectable by a microphone or pick-up coil. Thus, magnetostrictive materials can be used as sensors to detect stress, defects, fractures, vibrations, or other mechanical forces.

Figure 3B:
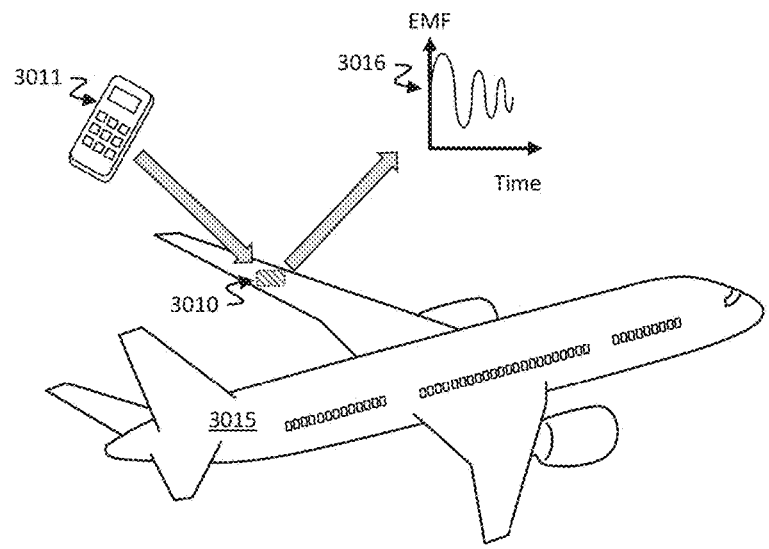

Thus, in one non-limiting embodiment, the electroplated magnetostrictive $Co_xFe_y$ films can be employed as magnetostrictive sensors for covert and wireless monitoring of conditions inside deeply embedded mechanical structures. In one instance, the sensor can include a magnetostrictive film or layer embedded in an epoxy, where this stack is then located between composite fiber glass layers for in situ state-of-health monitoring of the site. Such an embedded sensor could aid in monitoring defects or strain in the composite without the need for costly tear downs and inspections. As shown in FIG. 3B, such an embedded sensor 3010 can be located within the wing structure of an aircraft 3015, which can be interrogated with a hand held unit 3011 to provide an emitted response signal 3016.

Figure 8:
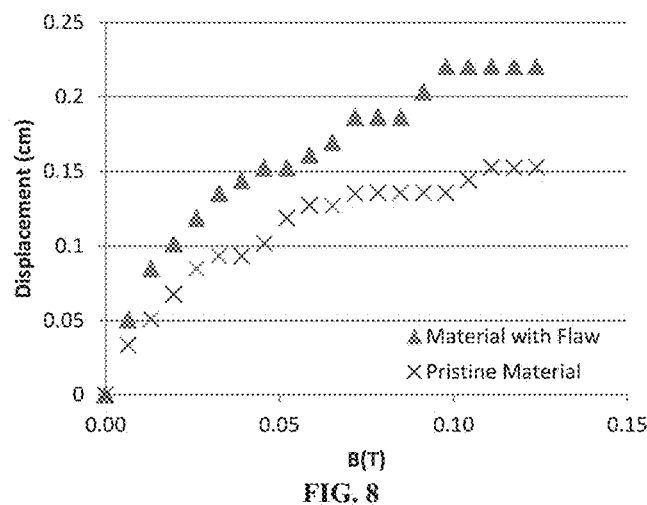
FIG. 8 shows magnetic testing for a $Co_xFe_y$ film on a pristine base structure and on a flawed base structure. As can be seen, with all other parameters constant, the flaw is detectable from magnetostriction measurements of displacement, as a function of an applied magnetic field.

FIG. 8 shows that $Co_xFe_y$ films are indeed sensitive to mechanical stress or strain. Two types of laminates were tested. The first laminate included a pristine surface, which was then masked, seeded with a 60 nm layer of Cu by evaporation, and then coated with an electrodeposited $Co_xFe_y$ layer. The second laminate was treated in the same manner as the first laminate but the initial surface included a flaw. These two laminates were tested to determine whether these surfaces possessed differing measurable magnetostriction values. As shown in FIG. 8, the flawed material displayed a higher displacement value in the presence of a magnetic field, as compared to the pristine material. This trend was observed at every applied external field, from about 0.007 T to about 0.124 T. Accordingly, the present invention also encompasses any use of the alloys herein, such as for the detection of one or more measurable values, such as those associated with stress, strain, structural defects or flaws, displacement, magnetostriction, and/or magnetoelasticity.

Example 5: Electrodeposition of a High Magnetostriction CoFe Film

Abstract

The development of an electrodeposition process for cobalt/iron (CoFe) alloys with minimal oxygen concentration and controlled stoichiometry is necessary for the advancement of magnetostrictive device functionalities. Here, we electrodeposited CoFe alloy films by employing novel chemistry onto copper test structures, thereby enabling magnetic displacement testing for magnetostriction calculations. Using a combination of additives that served as oxygen scavengers, grain refiners, and complexing agents in conjunction with a pulsed plating technique, CoFe films were synthesized at thicknesses as high as 10 µm with less than 8 at. % oxygen at a stoichiometry of 70-75% Co and 25-30% Fe. X-ray diffraction (XRD) analysis confirmed that these films had a crystal structure consistent with a 70% Co/30% Fe wairauite with a slight lattice contraction due to Co doping in the film. A novel characterization technique was used to measure the displacement of the CoFe films electrodeposited, as a function of applied magnetic bias, in order to determine the saturation magnetostriction ($\lambda_{sat.}$) of the material. With this chemistry and a tailored pulse plating regime, $\lambda_{sat.}$ values as high as 172±25 ppm were achieved. This is believed to be one of the highest reported values of magnetostriction for an electrodeposited CoFe film.

Introduction

Materials that exhibit magnetostriction (e.g., a change in size with respect to a magnetic bias) have been popular among microelectromechanical systems (MEMS) as microactuators, bioengineering for directed drug delivery, and unique magnetic sensing applications (see, e.g., Gibbs M R J et al., "Magnetic materials for MEMS applications." *J. Phys. D: Appl. Phys.* 2004; 37(22): R237-44; Quandt E, "Giant magnetostrictive thin film materials and applications," *J. Alloys* Compounds 1997; 258(1-2):126-32; Quandt E et al., "Preparation and applications of magnetostrictive thin films," *J. Appl. Phys.* 1994; 76:7000-2; Bedenbecker M et al., "Electroplated CoFe thin films for electromagnetic microactuators," *J. Appl. Phys.* 2006; 99:08M308 (3 pp.); Bonini M et al., "Nanostructures for magnetically triggered release of drugs and biomolecules," *Curr. Op. Colloid Interface Sci.* 2013; 18(5):459-67; and Amiri S et al., "The role of cobalt ferrite magnetic nanoparticles in medical science," *Mater. Sci. Eng. C* 2013; 33(1):1-8). The magnetostrictivity or strain sensitivity d of the material is the main figure-of-merit for these devices, and the strain ∂e induced in a material for a given magnetic field ∂H can be described by the following equation:

$$d = \frac{\partial e}{\partial H} = \frac{3\lambda_{sat.} H_B}{H_A^2}, \quad \text{(Eq. 4)}$$

where $\lambda_{sat.}$ [ppm] is the saturation magnetostriction, $H_B$ [A·m$^{-1}$] is the magnetic bias field, and $H_A$ [A·m$^{-1}$] is the anisotropy field or the magnetic field needed to saturate the magnetization in the hard direction. The magnetostrictivity or stain sensitivity is a function of the applied field and the saturation magnetostriction of the material. A higher $\lambda_{sat.}$ equates to higher strain at lower magnetic input energy. In addition, the magnetomechanical coupling coefficient of a material is a function of the strain sensitivity and is a basic index of the energy conversion capability of transduction materials (see, e.g., Meeks S W et al., "Piezomagnetic and elastic properties of metallic glass alloys $Fe_{67}CO_{18}B_{14}Si_1$ and $Fe_{81}B_{13.5}Si_{3.5}C_2$," *J. Appl. Phys.* 1983; 54(11):6584-93).

Several magnetostrictive materials have been researched and developed over the years. Terfenol-D is composed of terbium, iron, and dysprosium and exhibits the highest known magnetostriction at about 2000 microstrains ($\lambda_{sat.}$=2000 ppm) (see, e.g., Snodgrass J D et al., "Optimized TERFENOL-D manufacturing processes," *J. Alloys Compounds* 1997; 258(1-2):24-9). Applications for this material are limited by its difficult manufacturing process and the expense of the rare earth materials it contains. Galfenol is another magnetostrictive material composed of a rare earth element, gallium, alloyed with iron. This material though, is difficult to electrodeposit, has large intrinsic stress, and the Ga salts needed for electrodeposition are expensive (see, e.g., Estrine E C et al., "Electrodeposition and characterization of magnetostrictive galfenol (FeGa) thin films for use in microelectromechanical systems," *J. Appl. Phys.* 2013; 113: 17A937 (3 pp.); and Iselt D et al., "Electrodeposition and characterization of $Fe_{80}Ga_{20}$ alloy films," *Electrochim. Acta* 2011; 56(14):5178-83).

A cobalt and iron alloy film (CoFe) provides a rare earth free magnetostrictive material with a price point that makes it applicable for batch manufacturing of sensors or other devices. Cobalt and iron can be formed into a magnetostrictive alloy with common stoichiometries of 50% cobalt with 50% iron or 70 to 75% cobalt and 25 to 30% iron. Research has shown that the cobalt rich stoichiometry displays more promise as a high magnetostrictive material, with a theoretical saturation magnetostriction of approximately 1000 ppm (see, e.g., Hunter D et al., *Nat. Commun.* 2011; 2: article 518; and Bozorth R M et al., "Anisotropy and magnetostriction of some ferrites," *Phys. Rev.* 1955; 99:1788-98).

Hunter et al. reported as-deposited sputtered CoFe films with a measured $\lambda_{sat.}$ of 84±5 ppm (*Nat. Commun.* 2011; 2: article 518). Using an 800° C. anneal step and a water quenching method in order to modify the crystal structure at a particular stoichiometry, this group reported the highest $\lambda_{sat.}$ for a CoFe thin film of 260±10 ppm. While Hunter's result are very promising for this material set, sputter deposition has a restricted application set due to limitations in the thickness of the deposit as well as the high stress induced with large thicknesses. The development of electrodeposited CoFe with high magnetostrictive values will enable the realization of a variety of new device architectures as it is not limited in thickness, can be tailored to possess low intrinsic stress, and can be scaled to a batch fabrication process.

To date, the main difficulty in achieving high magnetostriction in electrodeposited CoFe films has been controlling the amount of oxygen incorporated in the material. The oxidation of $Fe^{2+}$ to $Fe^{3+}$ is the result of two distinct mechanisms. The first is the oxidation of iron at the anode coupled with and promoted by a reaction with dissolved oxygen. This is seen in the following equation:

$$O_2 + 4Fe^{2+} + 4H^+ \rightarrow 4Fe^{3+} + 2H_2O \quad \text{(Eq. 5)}.$$

The second is due to the depletion of hydrogen ions at the electrode/solution interface caused by the hydrogen evolution reaction in parallel with the metal deposition process. This causes a local increase in the pH and promotes the formation and inclusion of precipitating $Fe(OH)_3$. This incorporation of metal hydroxides and the resulting increase in the oxygen content of the film, leads to a decrease in magnetic and mechanical properties and alters the structure of the deposited film (see, e.g., Osaka T et al., "A high moment CoFe soft magnetic thin film prepared by electrodeposition," *Electrochem. Solid-State Lett.* 2003; 6(4):C53-5; Elhalawaty S et al., "Oxygen incorporation into electrodeposited CoFe films: consequences for structure and magnetic properties," *J. Electrochem. Soc.* 2011; 158(11):D641-6; George J et al., "Oxide/hydroxide incorporation into electrodeposited CoFe alloys-consequences for magnetic softness," *Electrochim. Acta* 2013; 110:411-7; and Brankovic S R et al., "The effect of $Fe^{3+}$ on magnetic moment of electrodeposited CoFe alloys-experimental study and analytical model," *Electrochim. Acta* 2008; 53(20):5934-40). Using a combination of oxygen scavenger additives and a pulse plating regime, we have succeeded in electrodepositing a low oxygen alloy film with the highest $\lambda_{sat.}$ reported for an electrodeposited CoFe film.

Experimental

The CoFe electrolyte was prepared from reagent grade cobalt sulfamate and ammonium ferrous sulfate salts. Trimethylamine borane (TMAB) and ascorbic acid were added as oxygen scavengers. Sodium saccharin salt and sorbitol were added as grain refiners and levelers for the deposited films (see, e.g., Lallemand F et al., "Effects of the structure of organic additives in the electrochemical preparation and characterization of CoFe film," *Electrochim. Acta* 2002; 47(26):4149-56; Lallemand F et al., "Kinetic and morphological investigation of CoFe alloy electrodeposition in the presence of organic additives," *Surf Coatings Technol.* 2004; 179(2-3):314-23; and Lallemand F et al., "Electrodeposition of cobalt-iron alloys in pulsed current from electrolytes containing organic additives," *Surf Coatings Technol.* 2005; 197(1):10-7). APY-17 was added as a surfactant and 5% by volume sulfuric acid was added to adjust the pH to 2.0. Full chemistry makeup, concentrations, and operating conditions are recorded in Table 2.

TABLE 2

Bath composition and operating conditions

| Chemicals | Concentration (mol/L) |
|---|---|
| $H_3BO_3$ | 0.5 |
| $Co(H_2SO_3)_2$ | 0.4 |
| TMAB | 0.1 |
| Sorbitol | 0.01 |
| Na saccharin salt | 0.05 |
| Ascorbic acid | 0.05 |
| $Fe(NH_4)_2(SO_4)_2 \cdot 6H_2O$ | 0.08 |
| Bath pH | 2.0 |
| Bath temperature | 50° C. |

All chemistries were sparged with $N_2$ for 30 minutes prior to use and kept under a bed of $N_2$ to minimize $O_2$ absorption and concentration in the bath. To determine the effect of the current density on the stoichiometric ratio of cobalt to iron, initial tests were performed using a Hull cell with a corrugated copper anode and a brass Hull cell plate as a cathode. A Radiometer Analytical PGZ-301 potentiostat was used to apply a constant 1 A current across the Hull cell during testing. The composition of the CoFe films was determined using an Oxford energy dispersive spectroscopy (EDS) system attached to a JEOL 5800 scanning electron microscope (SEM).

After the current density range was determined, the CoFe films were electrodeposited onto 97% Cu and 3% Fe deposit stress analyzer test strips from Specialty Testing and Development Co., Inc. (York, Pa.). Electrodeposition onto these substrates created a bimorph material that allowed for displacement measurements to calculate magnetostriction when placed in a solenoid. The Cu substrate was non-reactive in the applied magnetic field, while the positive magnetostrictive CoFe film elongates. With one end of the test strip fixed, the bimorph cantilever would bend; and the displacement was measured and used to calculate the magnetostriction.

Voltammetry characterization experiments were completed using a Biologic VSP-300 potentiostat and a Radiometer Analytical rotating disk electrode (RDE) cylinder. A gold rotating disk electrode tip, a platinum foil counter electrode and a $Hg/HgSO_4$ (MSE in saturated K2504; 0.654V vs. normal hydrogen electrode) reference electrode were used during voltammetry experiments. The crystal structure was analyzed with x-ray diffraction (XRD) and was performed using a Siemens model D500 θ-θ powder diffractometer (Bruker AXS, Inc., Madison, Wis.) with standard XRD data collection on samples maintained at room temperature (25° C.). Monochromatic Cu Kα (0.15406 nm) radiation was produced using a diffracted-beam curved graphite monochromator. Fixed slits were used, and the instrument power settings were 45 kV and 30 mA. Datascan V4.3 (Materials Data Inc., Livermore, Calif.) soft ware was used to operate the diffractometer. The conditions for scans were as follows: 20-100° 2θ range, step-size of 0.04° 2θ and various count times ranging from 1-20 seconds, depending on sample quantity. The Cu peaks from the underlying substrate material were employed as an internal standard to correct for minor specimen displacement. Jade v9.6 soft ware (Materials Data Inc., Livermore, Calif.) soft ware was employed to model and remove the background/fluorescence signal from the pattern prior to plotting.

Magnetization measurements were collected using a Quantum Design MPMS-7 superconducting quantum interference device (SQUID) magnetometer. Magnetization curves were recorded from −70 kOe to +70 kOe (−5570 kA/m to +5570 kA/m) at room temperature (293.15 K). Samples for magnetometry measurement were cut into 4 mm×4 mm squares and oriented with their surface normal perpendicular to the applied magnetic field (so demagnetization effects would be negligible) by mounting them inside a notched Kel-F® (polychlorotrifluoroethene) rod.

Results and Discussion

Figure 14:
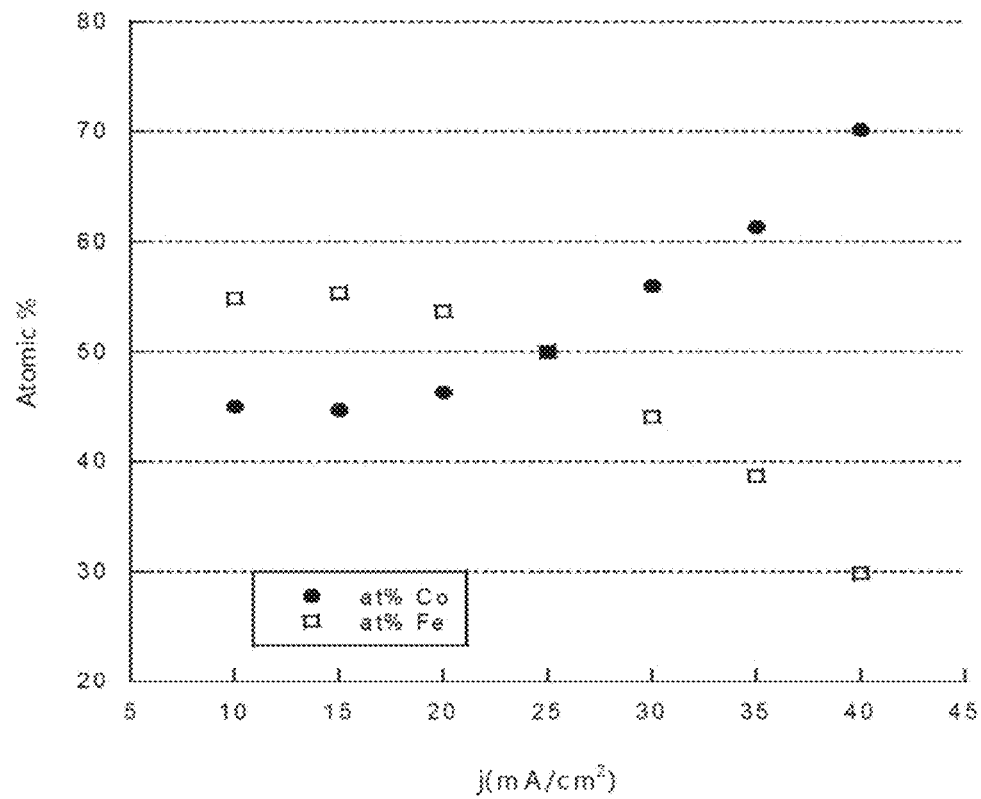
FIG. 14 shows a graph of stoichiometric ratio of cobalt to iron as a function of applied current density.

Initial experimentation was completed in a heated Hull cell at 50° C. to determine the optimal current density range to achieve the desired stoichiometric ratio of 70-75% Co to 25-30% Fe identified by Hunter et al., supra, as optimal for magnetostriction. At this ratio, the crystal structure is close to the (fcc+bcc)/bcc phase boundary where precipitates of a Co rich fcc phase are embedded in an Fe rich bcc phase. EDS results, only looking at Co and Fe, were graphed as a function of the current density as seen in FIG. 14. During DC plating, a current density of 40 mA/cm$^2$ gave the desired stoichiometry with a 0.4 M Co and 0.08 M Fe chemistry. When including the atomic percent of oxygen, the EDS analysis showed over 30 at. % oxygen. This was visibly evident from the dark and rough deposits showing the inclusion of Fe(OH)$_3$.

To control the oxidation of iron and the incorporation of oxygen into the electrodeposited film, oxygen scavengers as additives were incorporated into the chemistry. These additives are readily oxidized and also serve as reducing agents to move any Fe' formed during the on cycle of the pulse back to a Fe$^{2+}$ state during the off cycle of the pulse. Osaka et al., supra, demonstrated good control of the oxygen content in deposited CoFe films using trimethylamine borane (TMAB) as an oxygen scavenger. As the concentration of TMAB was increased, the level of Fe' formed was decreased. Unfortunately, higher levels of TMAB also led to the incorporation of boron into the deposit and a decrease in magnetic properties. Therefore, TMAB provided only a partial solution to the problems of Fe oxidation and the incorporation of oxygen into deposits and it could not be used in concentrations higher than ~100 mM.

An additional oxygen scavenger was used, in the form of ascorbic acid, and was added with the TMAB in the chemistry. This allowed for a lower concentration of TMAB to be used but still controlled the formation of ferric hydroxide during metal deposition.

Samples were DC plated over a range of current densities with the oxygen scavenger additives and the samples were analyzed with EDS. As noted in Table 3, less Fe(OH)$_3$ was formed and incorporated into the film at the lowest current density, but the ratio of Co to Fe could be further optimized. A drop in at. % of oxygen was measured on all films compared with previous deposition without additives, but a pulsed plating technique was needed to restore the cation concentrations and the pH in the interface to their bulk values and to further decrease the oxygen content.

TABLE 3

EDS results of DC plated samples with TMAB and ascorbic acid additives

| Current density (mA/cm$^2$) | At. % O |
|---|---|
| 20 | 8.6 |
| 30 | 17.1 |
| 40 | 15 |
| 50 | 15.3 |
| 60 | 14.3 |

Figure 15A:
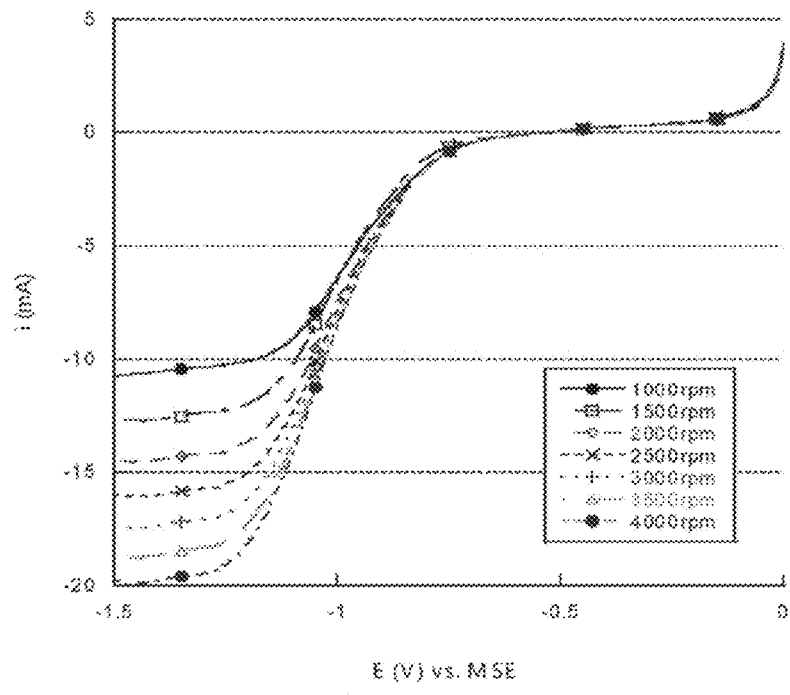
FIG. 15A-15B shows (A) linear potential sweeps and (B) the resulting Levich plot for the full chemistry without cobalt.
Figure 15B:
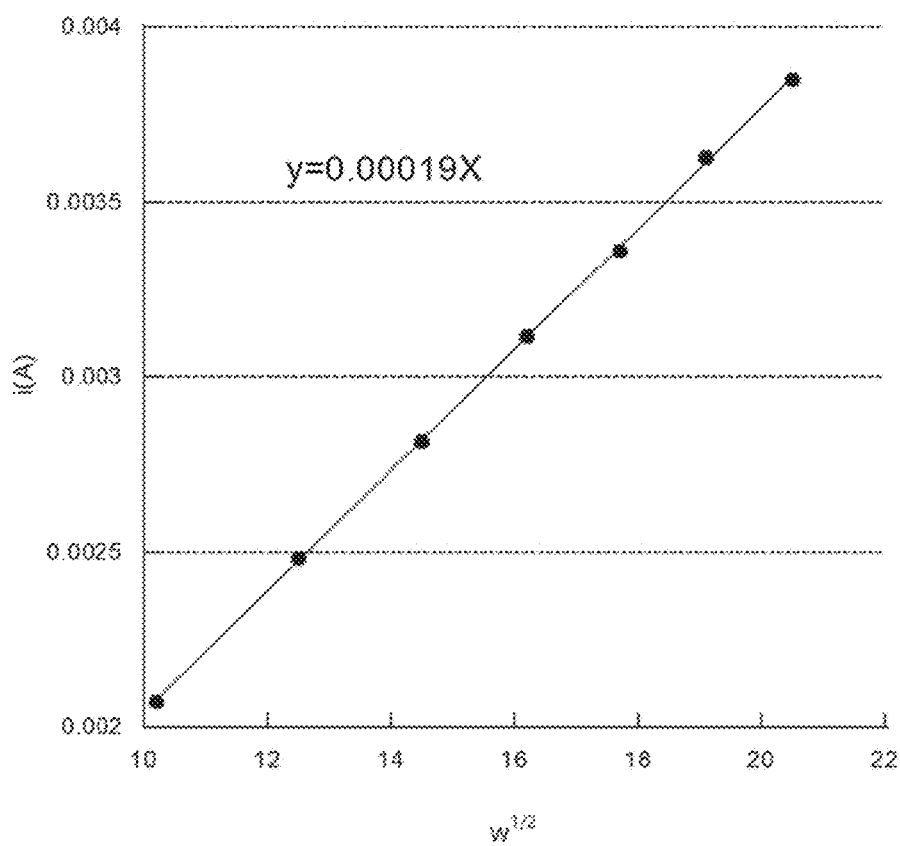

For formulation of the pulsed plating parameters, the mass transfer limitations of the iron system were examined by linear sweep voltammetry and a Levich plot was formulated (FIG. 15A-15B). Using a gold rotating disk electrode (RDE) as the working electrode, the current is measured as the potential is linearly scanned for different rotation speeds. The Levich equation is as follows:

$$i_l = 0.620\, nAFD2_o^{2/3}\omega^{1/2}v^{-1/6}C_o \quad \text{(Eq. 6)},$$

where n is the number of electrons per atom reduced, A is the area, F is the Faraday constant, $D_o$ is the diffusion coefficient, $\omega$ is the rotation speed, $v$ is the kinematic viscosity, and $C_o$ is the bulk concentration (see, e.g., Bard A J and Faulkner L R, "Electrochemical methods: fundamentals and applications, 2d ed., December 2000, Wiley, New York, N.Y.). The kinematic viscosity was calculated using a Canon Instruments ubbelohde viscometer size 25 and found to be 1.40±0.07 mm$^2$/sec. The potential was then swept cathodically at a rate of 50 mV/second as the rotation speed of the RDE was varied from 1000 rpm to 4000 rpm.

The slope from the Levich plot was then used, with the other variables being known and assumed constant, to calculate the diffusion coefficient at 2.35×10$^{-7}$ cm$^2$/sec. This was compared to reported diffusion coefficients for Fe cations that are hydrated but not complexed of 7.19×10$^{-6}$ cm$^2$/sec at 25° C. (see, e.g., Lide D R and Kehiaian H V, "CRC Handbook of Thermophysical and Thermochemical Data," 1994, CRC Press, Boca Raton, Fla.). This is to be expected as the saccharin, with its sulfonamide group, will complex with Fe and the TMAB and sorbitol will also interact with the Fe cations (see, e.g., Lallemand F et al., *Electrochim. Acta* 2002; 47(26):4149-56).

Figure 16A:
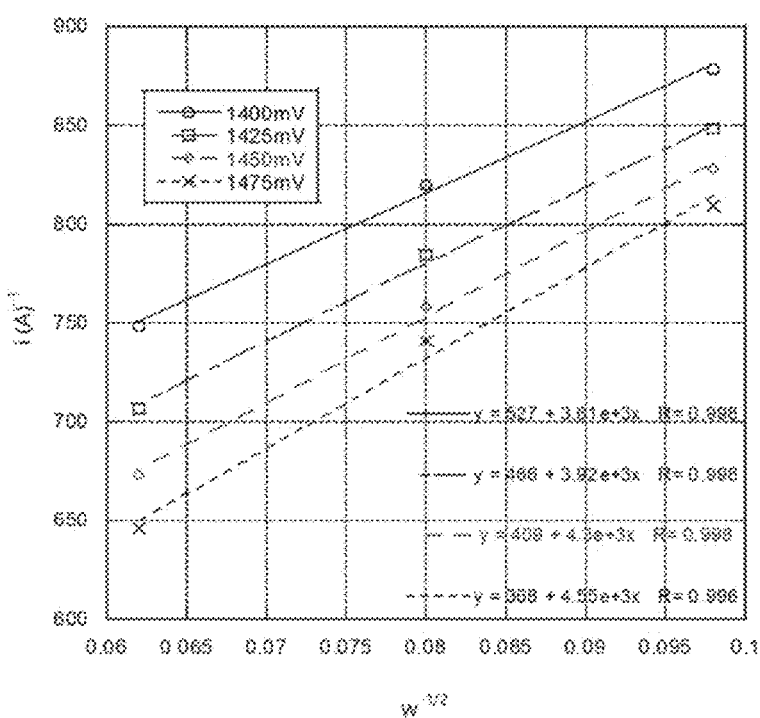
FIG. 16A-16B shows (A) a Koutecky-Levich plot of bath chemistry without cobalt and (B) a plot of rate constants versus overpotential for finding the fundamental rate constant.
Figure 16B:
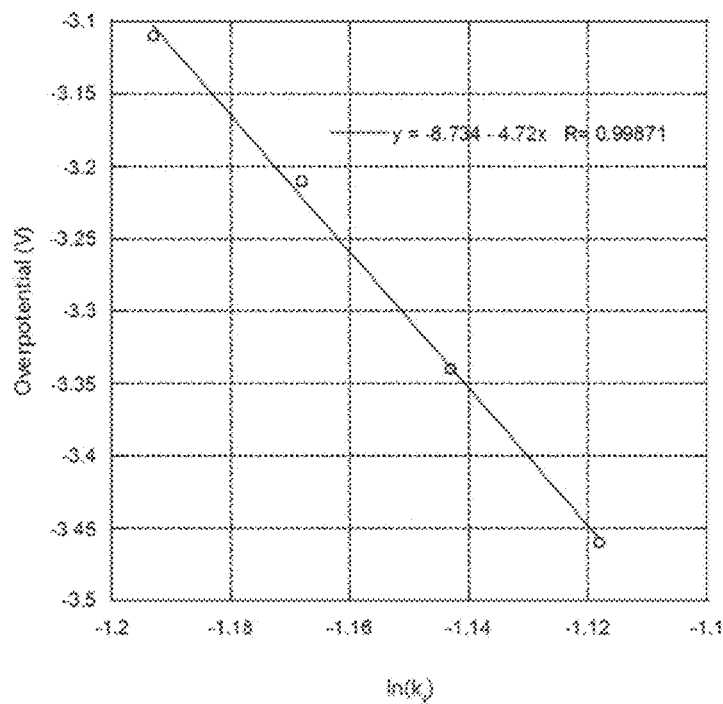

A Koutecky-Levich plot (FIG. 16A-16B) was formulated by plotting the inverse of the current versus the inverse of the square root of the rotation rates from the linear potential sweeps. The Koutecky-Levich equation is as follows:

$$\frac{1}{i} = \frac{1}{i_l} + \frac{1}{i_k}, \quad \text{(Eq. 7)}$$

where $i_l$ is the mass transfer limited current identified by the Levich equation and $i_k$ is the kinetically controlled or activation current. The intercept of the Koutecky-Levich plot is equal to the inverse of the kinetic current at different overpotentials. A rate constant $k_f$, as a function of the overpotential, and a standard heterogeneous rate constant $k_o$ were then calculated as follows:

$$k_f = \frac{i_k}{nFAC_o} \quad \text{and} \quad \text{(Eq. 8a)}$$

$$k_f = k_o e^{-\alpha n \frac{F}{RT}\eta}, \quad \text{(Eq. 8b)}$$

where $\alpha$ is the transfer coefficient, R is the gas constant, $\eta$ is the overpotential, and the other variables have been defined previously (see, herein, as well as, e.g., Bard A J and Faulkner L R, "Electrochemical methods: fundamentals and applications, 2d ed., December 2000, *Wiley*, New York, N.Y.). The natural log of $k_o$ was found by graphing the natural log of $k_f$ (functions of η) vs. η. For the iron system with additives, the standard rate constant was calculated as $k_o=1.45\times10^{-4}$ mol/cm$^2$·sec.

Films analyzed with EDS, with varying "on" pulse times, showed that iron is kinetically faster and with short pulses the films will be iron rich. Due to slow diffusion and lower concentration, the iron is quickly limited in the interfacial region based on the concentration profile at the interface calculated from the diffusion coefficient as a function of time. So a longer pulse time favors a more Co rich film, but the pulse time is limited by formation of Fe(OH)$_3$ due to the local rise in pH from the hydrogen evolution reaction.

While a shorter pulse mathematically will work, a pulsing regime of three seconds "on" at 40 mA/cm$^2$ and three seconds "off" at 0 mA/cm$^2$ was calculated to allow for the concentration of iron and the local pH to restore to the bulk values. An evaluation of the potential as a function of time during pulse plating shows a restoration to the open circuit potential at the end of the 3 second "off" time and EDS analysis of pulse plated samples consistently showed less than 8 at. % oxygen, a reduction of approximately 7-7.5 at. % compared with the DC plated sample at 40 mA/cm$^2$.

Figure 17:
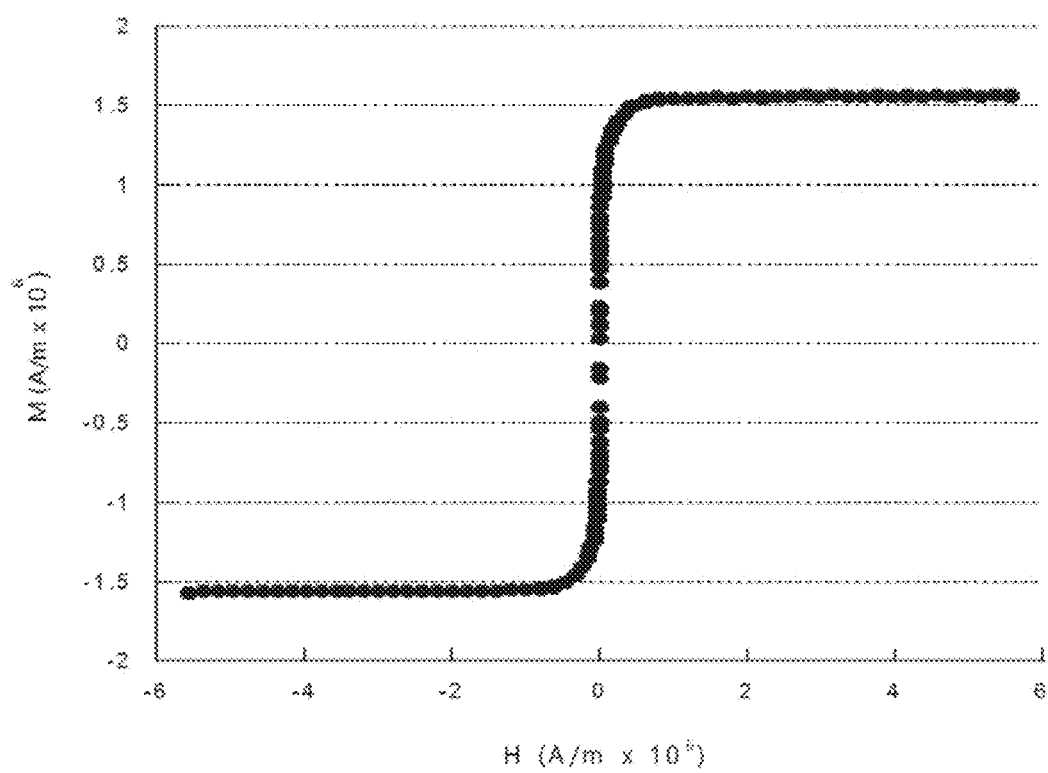
FIG. 17 shows a magnetic hysteresis loop for a pulse plated CoFe film.

A hysteresis loop (FIG. 17) of a pulsed sample was formulated from SQUID measurements to examine the magnetic properties of the CoFe films. A magnetic saturation ($M_{sat.}$) of $1.57\times10^6$ A M$^{-1}$, a low coercivity of 4351 A m$^{-1}$, and an initial permeability of 87.5 were calculated from the asymptotic end point values and the intersection of the x-axis on the hysteresis plot. A low coercivity equates to a low anisotropy field, which will increase the strain sensitivity and the value of the magnetomechanical coupling factor.

Figure 18:
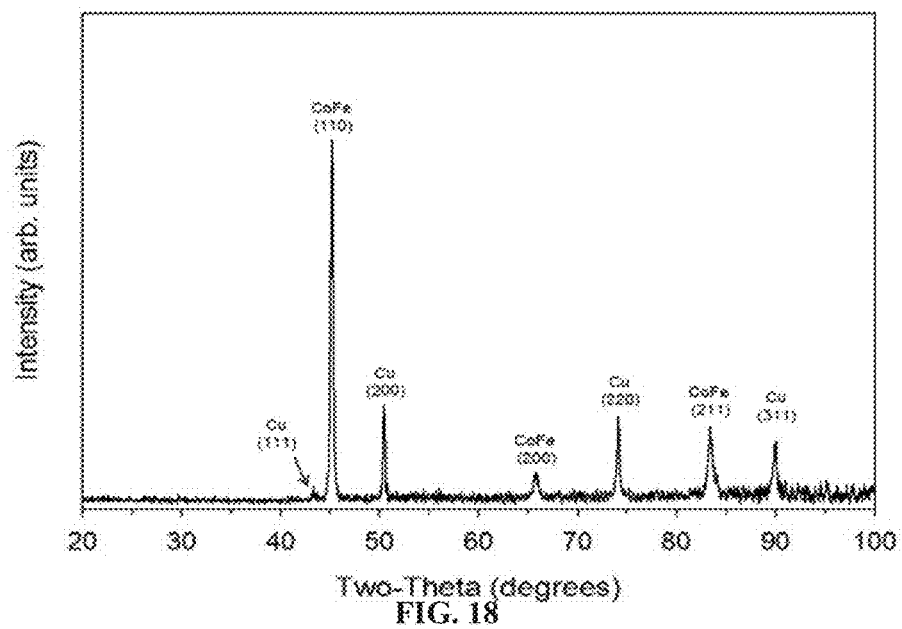
FIG. 18 shows an XRD plot for a pulsed CoFe film.

XRD analysis confirmed that these films had a crystal structure consistent with 70% Co/30% Fe wairauite. FIG. 18 shows two phases, Cu from the substrate and the CoFe BCC alloy, and required some unit cell contraction to align the standard peak locations to that of the observed reflections. The Cu peaks in the data were used to correct for any sample displacement error in the sample. Plotting the lattice parameter for different compositions as a function of the mole fraction of Co in the Co$_x$Fe$_{1-x}$ alloy, the measured lattice parameter of 2.8355 Å for the pulsed film, indicated an alloy of approximately 85% Co by Vegard's Law. EDS analysis measured a composition of 73.5% Co, 18.44% Fe, and 7.98% O.

The observation of a slightly higher Co content for the alloy via XRD as compared to EDS analysis can be explained by the preferential oxidation of Fe during electrodeposition. The formation of a small (likely nanocrystallite) iron oxide and iron hydroxide during synthesis serves to reduce the iron concentration available to form the Co—Fe alloy. This resulted in the biasing of the alloy toward higher molar ratios of Co as observed by XRD in comparison to the Fe:Co ratio obtained from EDS analysis.

Figure 19:
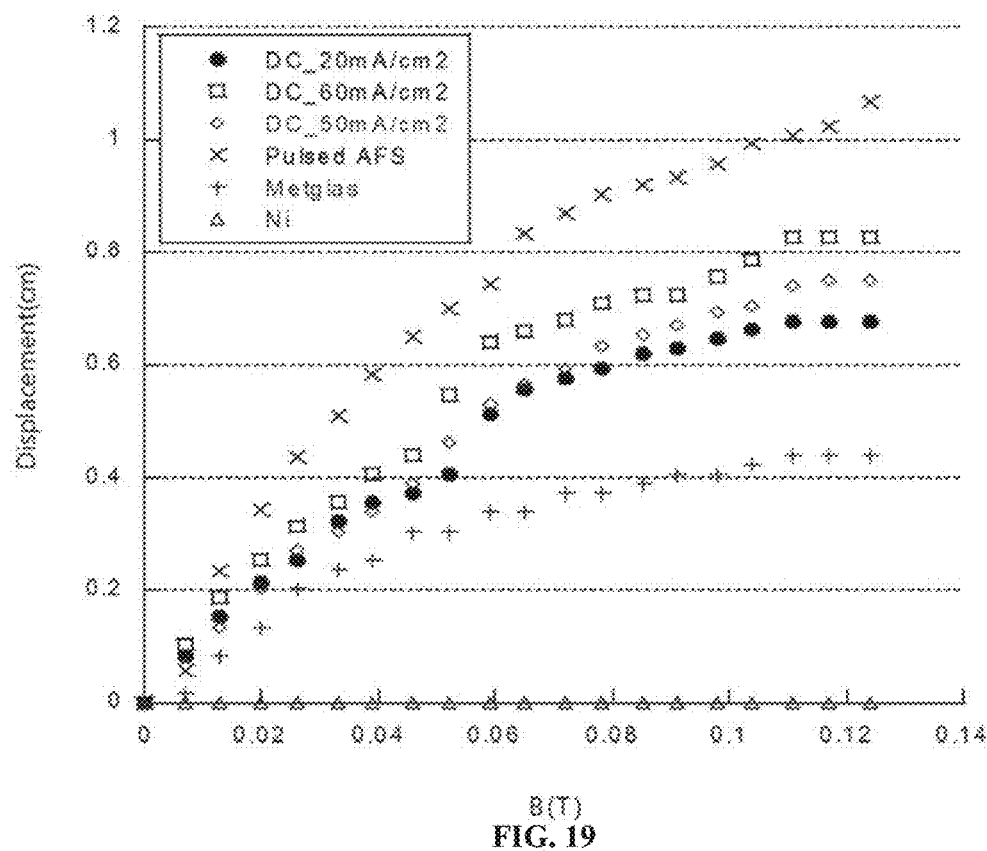
FIG. 19 shows a graph of displacement measurements from solenoid testing.

Next, samples were made for displacement testing in a solenoid using the pulsing regime and chemistry makeup. As a baseline measurement of the solenoid magnetic testing, a Metglas® strip with a known magnetostriction of 27 ppm was tested. Additionally, a 10 μm nickel film was tested to ensure that any displacement seen was due to magnetostriction and not magnetic gradients within the solenoid. The 10 μm of nickel on the copper test strip substrate showed no magnetostriction, i.e., no displacement. The Metglas® showed a displacement of approximately 0.4 cm from applied magnetic fields of just over 0.12 T. A comparison of displacement measurements from representative samples DC plated over different current densities and a pulse plated sample are seen in FIG. 19.

The expression of du Tremolet de Lacheisserie and Peuzin was used to transform the displacement measured into a saturation magnetostriction measurement (see, e.g., du Tremolet de Lacheisserie et al., "Magnetostriction and internal stresses in thin films: the cantilever method revisited," *J. Magn. Magnetic Mater.* 1994; 136(1-2):189-96). The expression of du Tremolet de Lacheisserie and Peuzin is as follows:

$$\lambda_{eff}(D_{sat.}) = \frac{2(D_\| - D_\perp)E_s t_s^2 (1 + v_f)}{9 E_f L^2 t_f (1 + v_s)}, \quad \text{(Eq. 9)}$$

where $D_\|$ and $D_\perp$ equals the displacement under parallel and perpendicular fields, respectively, $E_s$ and $E_f$ are the Young's moduli for both the substrate and film respectively, L is the length, $t_f$ and $t_s$ are the thickness of both the film and the substrate respectively, and $v_f$ and $v_s$ are the Poisson's ratios for both the film and substrate respectively.

An approximation was used to determine the displacement under a perpendicular field, as this measurement was not possible in the solenoid configuration used. $D_\perp$ was approximated as ⅙ of $D_\|$ based on Hunter et al., supra, and this is included in the error listed with the magnetostriction values calculated.

Using the measured displacement for Metglas®, $\lambda_{sat.}$ was calculated as 26±4 ppm. This is within range of the manufacturer's specification of 27 ppm. As noted in Table 4, the DC plated samples displayed good magnetostriction for a CoFe film when compared with Hunter et al., supra, which provided a reported value of 84±5 ppm for as-deposited sputtered thin films. The pulsed sample had a calculated $\lambda_{sat.}$ of 172±25 ppm, and it is believed that this is the highest reported magnetostriction for an electrodeposited CoFe film.

TABLE 4

Saturation magnetostriction calculated from displacement measurements

| Sample | $\lambda_{sat}$ (ppm) |
|---|---|
| Metglas ® | 26 ± 4 |
| DC plated at 20 mA/cm$^2$ | 109 ± 16 |
| DC plated at 40 mA/cm$^2$ | 152 ± 22 |
| Pulse plated | 172 ± 25 |

Conclusion

Electrodeposition of a CoFe alloy film with an oxygen content of less than 8% and a stoichiometric ratio of between 70-75% Co to 25-30% Fe was achieved using a combination of oxygen scavengers and a pulsing regime to allow for the dissolution of ferric hydroxide formed during metal deposition. This combination saw a drop in the oxygen content of over 22 at % and a crystal structure consistent with CoFe bcc wairauite alloy with a slight unit cell contraction. These films had a calculated $M_{sat.}$ of $1.57\times10^6$ A m$^{-1}$ and low coercivity of 4351 A m$^{-1}$. Magnetostriction measurements of as-deposited CoFe alloy films were measured with saturation magnetostriction as high as 172±25 ppm, believed to be the highest reported magnetostriction for an electrodeposited CoFe film.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method of making a microfabricated magnetic resonator, comprising electrodepositing components of a magnetostrictive material comprising cobalt and iron on a surface, thereby providing one or more resonator portions of the microfabricated magnetic resonator, wherein:
   the electrodepositing step comprises applying a plating solution to the substrate; and
   the plating solution comprises:
      i) a cobalt source,
      ii) an iron source,
      iii) one or more oxygen scavengers,
      iv) one or more surfactants,
      v) one or more grain refiners, and
      vi) one or more electrolytes.

2. A method of making a microfabricated magnetic resonator, comprising electrodepositing one or more components of a magnetostrictive material on a surface, thereby providing one or more resonator portions of the microfabricated magnetic resonator, wherein:
   the one or more resonator portions are micropatterned resonator portions;
   the surface comprises a micropatterned mold;
   the micropatterned mold comprises one or more interfaces configured to affix one or more micropatterned resonator portions to the surface;
   the method further comprises, prior to the electrodepositing step, forming a micropattern on the surface;
   the micropattern is configured to receive the one or more components of the magnetostrictive material; and
   the micropattern comprises at least one length dimension L for the one or more micropatterned resonator portions.

3. The method of claim 2, wherein the forming step comprises depositing a photoresist on the surface, exposing the photoresist to a photomask comprising the micropattern, and developing the surface to provide a first area comprising the photoresist and a second area lacking the photoresist.

4. The method of claim 3, wherein the electrodepositing step provides the magnetostrictive material on the second area of the surface, thereby forming the one or more micropatterned resonator portions.

5. The method of claim 3, further comprising removing at least a portion of the surface underlying the second area and removing the photoresist from the first area.

6. A method of making a microfabricated magnetic resonator, comprising electrodepositing components of a magnetostrictive material comprising cobalt and iron on a surface, thereby providing one or more resonator portions of the microfabricated magnetic resonator, wherein:
   the one or more resonator portions are micropatterned resonator portions; and
   the method further comprises etching the substrate to release the one or more resonators portions.

7. The method of claim 6, further comprising affixing the one or more resonators portions on a substrate.

8. The method of claim 7, wherein the substrate comprises an array of plural resonator portions, whereby there is defined an array of microfabricated magnetic resonators on the substrate.

* * * * *